(12) United States Patent
Hutson

(10) Patent No.: US 7,660,967 B2
(45) Date of Patent: Feb. 9, 2010

(54) RESULT DATA FORWARDING IN PARALLEL VECTOR DATA PROCESSOR BASED ON SCALAR OPERATION ISSUE ORDER

(75) Inventor: Maurice L. Hutson, Byron, MN (US)

(73) Assignee: Efficient Memory Technology, Rochester, MN (US)

( * ) Notice: Subject to any disclaimer, the term of this patent is extended or adjusted under 35 U.S.C. 154(b) by 123 days.

(21) Appl. No.: 12/022,421

(22) Filed: Jan. 30, 2008

(65) Prior Publication Data

US 2008/0189513 A1 Aug. 7, 2008

Related U.S. Application Data

(60) Provisional application No. 60/887,708, filed on Feb. 1, 2007.

(51) Int. Cl.
*G06F 17/16* (2006.01)
(52) U.S. Cl. .............................. 712/9; 712/222; 712/225
(58) Field of Classification Search ........................ None
See application file for complete search history.

(56) References Cited

U.S. PATENT DOCUMENTS 4,760,545 A * 7/1988 Inagami et al. .................. 712/4
4,837,730 A * 6/1989 Cook et al. ..................... 712/7

OTHER PUBLICATIONS

K. Asanovic, "Appendix G, Vector Processors", published on the Internet at http://books.elsevier.com/companions/1558605967/appendices/1558605967-appendix-g.pdf (2003).

Wikipedia Encyclopedia, "SIMD" (Single Instruction, Multiple Data), published on the internet at http://en.wikipedia.org/wiki/SIMD,(Oct. 6, 2007).

* cited by examiner

*Primary Examiner*—Kenneth S Kim
(74) *Attorney, Agent, or Firm*—Robert M. Angus; Westman, Champlin & Kelly, P.A.

(57) ABSTRACT

A computer processor is responsive to successive processing instructions in an issue order to process regular vectors to generate a result vector without use of a cache. At least two architectural registers having input-vector capability are selectively coupled to memory to receive corresponding vector-elements of two vectors and transfer the vector-elements to a selected functional unit. At least one architectural register having output capability is selectively coupled to an output, which in turn is coupled to transfer result vector-elements to the memory. The functional unit performs a function on the vector-elements to generate a respective result-element. The result-elements are transferred to a selected architectural register for processing as operands in performance of further functions by a functional unit, or are transferred to the output for transfer to memory. In either case, the order of the result vector-elements is restored to the issue order of the successive processing instructions.

In some embodiments, restore order buffers operate with issue-order codes of result-elements in result registers and architectural registers to restore order to the result vector-elements for output to memory.

35 Claims, 12 Drawing Sheets

RESULT DATA FORWARDING IN PARALLEL VECTOR DATA PROCESSOR BASED ON SCALAR OPERATION ISSUE ORDER

CROSS-REFERENCE TO RELATED APPLICATIONS

The present application is based on and claims the benefit of U.S. provisional patent application Ser. No. 60/887,708, filed Feb. 1, 2007, the content of which is hereby incorporated by reference in its entirety.

Reference is made to my prior patent application No. PCT/US/2005/042107, filed Nov. 21, 2005 and published Jan. 6, 2006 in English as WO/2006/057949, the content of which is hereby incorporated by reference in its entirety.

BACKGROUND OF THE INVENTION

This invention relates to vector processing, and particularly to processors for transferring vector-elements of vectors having a constant address stride between main memory and the architectural registers without a cache.

General purpose processors transfer vectors between main memory and the architectural registers using LOAD and STORE instructions, scalar instructions and/or PUSH and POP instructions. LOAD and STORE instructions access memory via a cache to load operands from memory and store results into memory. Scalar instructions process operands accessed (inputted) from architectural registers to produce results accessed (outputted) into the architectural registers. PUSH and POP instructions access a processor-maintained stack in memory via cache to push (store) operands and results in architectural registers onto the stack and to pop (load) them off the stack back into the architectural registers.

Each processor has a limited number of general purpose architectural registers (ARs), each capable of holding the same amount of data. At any one time each AR can hold a value which can be variously characterized as an operand, a result, an address or any combination of these for different purposes; a result of a scalar instruction in an AR can become a memory-address in the AR for a LOAD instruction, and so on.

Typically, two ARs are needed to access memory with a LOAD or STORE instruction. A typical LOAD instruction designates the AR to receive loaded data from memory via cache and designates the AR having the memory-address used to access (load) the data from memory; a typical STORE instruction designates the AR from which to store data to memory via cache and designates the AR having the address used to access (store) the data into memory. The typical scalar instruction inputs its two operands as those in the two ARs and designates and outputs its result into an AR that it also designates. The PUSH instruction designates the AR from which it pushes (stores) the AR's current data onto the top of the processor's current stack in memory; thereby making the stack larger by one AR's amount of data. The POP instruction designates the AR into which it pops (loads) data from off the top of the stack, thereby making the stack one AR's amount of data smaller.

The LOAD and POP instructions are each executed by one of the functional units; the unit's data-input being received into the designated AR via the cache from memory. Also, the STORE and PUSH instructions are each executed by one of the functional units; the unit's result is sent to memory via the cache as that read from the AR the instruction designates. Each instruction executed by a given functional unit executes in the same fixed amount of time generally beginning immediately after all operands are in the inputs of the functional unit designated by the instruction. The functional unit thereby produces and delivers the instruction's result to its output for delivering to the instruction's designated AR.

If and when the inputs of the needed functional unit are available, each issued instruction is enabled to execute (issued) by the issue unit immediately after the instruction is assured of having all of its operands before the next interrupt. If the required operands are all currently residing in ARs, the time period between issuing the instruction and actually having the operands can be immediate. However, if one or more needed operands of a next to be issued scalar instruction is still being generated by respective functional units as respective results of previously issued scalar instructions, then their arrival is assured but not yet actually present. Any already present operand from an AR must wait for the other operand to also arrive at its AR so that together they cause execution of the instruction to begin. A waiting operand waits in its input of the functional unit, and the instruction begins execution when both operands are in their respective inputs. Usually, each functional unit is pipe-lined, so inputs become available to a following instruction as the former begins execution.

As slightly different from scalar instructions, before being issued a LOAD, STORE, POP or PUSH instruction receives assurance from the cache that the cache holds the memory-data being accessed or from the associative that the cache will assuredly soon hold the data. Thus, the address to be accessed is sent to cache from its AR before the instruction issues, and each of these instructions can be long to issue after being at the point of issuing. Additionally, after issuing, the instruction can thereafter be long to begin execution. Again, once issued, an instruction will eventually execute to completion, but if delayed for issuing because necessary memory-data (LOAD or POP) or necessary memory-space (STORE or PUSH) are not now in physical memory, the instruction will not issue for execution without an interrupt to thereafter allow supplying the missing data or memory space. While interrupted, missing memory-data or missing memory-space is supplied from mass storage into physical memory. After the missing data or memory space is supplied and after a respective return-from-interrupt is executed, the LOAD, STORE, POP or PUSH instruction which caused the interrupt is the first to again try to issue.

The processor's interrupt unit gathers conditions requiring an interrupt, then waits for activity to settle (like waiting for all issued but not yet executed instructions to execute and deliver their results to ARs, memory, etc.). After all is settled, the interrupt unit initiates the occurring and facilitates timing of execution of the processor-state-exchange for resolving that causing the interrupt. Caching techniques are used by LOAD, STORE and related instructions (like POP and PUSH) to access immediately needed data in memory and also to prepare extra amounts of contiguous data from the main memory in anticipation of possible future needs to be thereby more quickly accessed by future LOAD, STORE and related instructions of the processor. If a data element has not previously been acquired into cache memory, a LOAD or STORE instruction causes the cache to acquire a fixed-sized aligned block of contiguous data (a cache-line) that includes the sought-for data. If no existing cache-line has a needed data-element, the instruction causes the cache to acquire a new cache-line from memory and then accesses the needed element from the newly acquired cache-line. Only a limited number of cache-lines can exist in the cache at one time; when the cache reaches its limit, each new line replaces the least-recently-accessed line.

A cache-line contains more data than immediately needed by any one instruction and each cache-line can potentially meet the data needs of any number of future LOAD or STORE instructions. In the case of vector processing, a future instruction to access a vector-element will first access any existing cache-lines for the element. If not found, the instruction will cause the memory to acquire a new cache-line containing the sought for element and then access the element.

A vector in memory comprises orderly located data-elements (herein, vector-elements) having different addresses and possibly having different sizes (data-bits per element). If in memory the amount of non-element-data between a pair of successive vector-elements is small, it is likely that a cache-line containing the first element will also contain the second element. However, caching large aligned blocks of contiguous data to possibly acquire more vector-elements than one often requires also acquiring data that have no elements of the vector. The only exception is where successive vector-elements in memory abut or overlap so that each cache-line is entirely vector-elements.

A stride is a count of the number of same-sized memory-data-amounts from one vector-element to the next, as from point to same respective point in successive vector-elements in the direction of increasing address values. If the number and direction of memory-data-amounts between each of all pairs of successively accessed vector-elements are the same, the stride is constant over the entire vector. In the particular case of a vector whose paired elements abut in memory and are all of one size or data-amount, the vector's stride is constant and either +1 or −1, and except possibly to begin and end the vector, each cache-line thereof comprises entirely vector-elements. Whereas, a vector having a constant stride of +2 or −2 between all successive same-sized vector-elements results in an inefficiency that at least half the memory-data of each so acquired cache-line are not sought-for vector-elements. With each increment of stride value farther from zero beyond ±1, an additional amount of cached data are never vector-data, the extreme condition being a large stride value resulting in cache-lines each containing only one vector-element.

A vector having a constant element size can have a constant or a varying stride. For example a vector having a variable stride might have vector-elements consisting solely of full-words (64-bits), or half-words (32-bits), etc., but different numbers of like memory-data-amounts and/or different directions of address increments between any two pairs of vector-elements in memory (e.g., +1, −2, +3, −4, +5, . . . ). A vector having a varying element size has addresses such that each addresses its respective element located somewhere in memory as aligned respective to the element's size. For purposes of the present invention a vector must have parameters to pre-define its elements' addresses and sizes as defining the vector's location in memory before accessing begins. For purposes of an embodiment of the present invention, a vector having a constant stride and a constant element size is called a "regular vector". Thus, a regular vector can be pre-defined as having a first element address, a constant difference respective to element-size (stride) between memory-addresses of successive vector-elements, and a constant number of bits (size) per element. Different regular vectors may have different strides and/or different element sizes as long as the stride is constant and the element size is constant over each entire vector. Also for purposes of this invention, an irregular vector is a vector that is not entirely regular; namely, the element size varies (such as a mixture of half-words and full-words) or, if the element size is constant (such as all half-words), then the stride value is not always the same between each of all pairs of successive vector-elements.

There is a need for techniques to speed vector processing, and particularly to processing certain vectors in memory with scalar instructions but without a cache, so that the number of encodings and executions of LOAD, STORE and address-support instructions and delays associated with cache processing can be reduced and, where the certain vectors are present, elements of all vectors can be more efficiently read from memory and stored to memory.

SUMMARY OF THE INVENTION

According to one embodiment of the invention, a computer system includes a processor for processing vectors, particularly regular vectors, without use of a cache. The processor includes a plurality of architectural registers, at least two of which have input-vector capability to receive operand data-elements from a memory and at least one of which has output-vector capability for writing result data-elements to the memory. A plurality of functional units are coupled to the architectural registers and responsive to successive scalar processing instructions for serial execution of selected functions on operand data-elements to generate result data-elements. The generated result data-elements may be stored in an architectural register. At least some of the functional units require different periods of execution, and issue-order logic is responsive to the issue order of the successive processing instructions to identify whether a result data-element generated by a selected functional unit is the result of a processing instruction that issued earlier or later than a processing instruction that resulted in any result data-element in a respective architectural register. A plurality of result registers coupled to respective ones of the architectural registers and to the plurality of functional units receive result data-elements from a selected functional unit. Each result register is responsive to the issue-order logic to selectively transfer a result data-element to a respective architectural register, or to a selected functional unit or to the memory.

In some embodiments, the issue-order logic includes a timing chain having an output and a plurality of inputs arranged such that each input is a different time period from the output. The timing chain inserts a code representative of the position in the issue order of each processing instruction that generated a result data-element. The code is inserted at a timing chain input corresponding to the execution period of the respective functional unit. A result-order register is responsive to the timing chain output to identify whether the code associated with a result data-element in a respective architectural register is earlier or later in the issue order than the code associated with a result data-element in the corresponding result register.

In some embodiments, each architectural register is responsive to its respective result-order register identifying that the code associated with a result data-element in the architectural register is earlier than the code associated with the result in the result register to selectively transfer its stored result data-element to a selected functional unit or the memory and write the result data-element from the respective result register to the respective architectural register. If the code associated with the result in the architectural register is later than the code associated with the result in the result register, the result data-element is selectively written from the respective result register to a selected functional unit or the memory.

In some embodiments, a restore-order buffer associated with each architectural register having output-vector capability is capable of storing at least as many result data-elements as may be generated during a time period based on a difference between the longest and shortest execution periods of the plurality of functional units. The restore-order buffer is responsive to the timing chain to organize stored result data-elements in issue order for serially writing to memory.

In some embodiments a cache is coupled to the memory to read and store data-elements of cache-lines from the memory and to write data-elements of cache-lines to the memory. The cache is further selectively coupled to at least one of the functional units to transfer vector data-elements from a cache-line to the at least one functional unit and to receive result data-elements from the at least one functional unit to a cache-line. The processor operates the cache to process vector data-elements, such as of irregular vectors, through designated functional units for execution of functions and write result data-elements to cache-lines for writing to the memory. Alternatively, the processor by-passes the cache by operating designated architectural registers to read and store vector data-elements of regular vectors to and from the memory and to and from designated functional units for execution of functions.

According to another embodiment of the present invention, a computer system comprises a memory, a cache and a processor. The processor has a plurality of functional units capable of performing functions on respective first and second input data-elements as a pair of operands to generate a respective result data-element of a result vector. At least one of the functional units is selectively coupled to the cache to receive data-elements from the cache and to transfer result data-elements to cache-lines in the cache. A plurality of architectural registers, at least two of which have input-vector capability are coupled to the memory to selectively receive respective data-elements. At least one of the architectural registers has output-vector capability and is coupled to the memory to selectively write data-elements to the memory. All of the architectural registers are coupled to the plurality of functional units to transfer data-elements as operands to selected functional units and to receive result data-elements from selected functional units. A plurality of result registers are coupled to respective ones of the architectural registers and to the plurality of functional units to receive result data-elements from selected functional units. Each result register is responsive to the issue order of successive scalar processing instructions to selectively transfer the result data-elements in the issue order either to the respective architectural register for further processing by a functional unit or for output to memory, or to a functional unit for further processing, or to the memory. The processor either (i) operates the cache to process input data-elements, such as of irregular vectors, from cache-lines through a selected functional unit for execution of a function and write result data-elements to a cache-line for writing to the memory, or (ii) by-passes the cache by operating selected architectural registers to read and store input data-elements from the memory for execution by a selected functional unit and operating a selected architectural register to write result data-elements to the memory.

According to another embodiment of the invention, a computer process is provided to process at least one regular vector to generate and store a result vector in a memory. Successive vector data-elements are written from memory to designated first architectural registers without use of a cache. Successive processing instructions are issued in an issue order such that selected successive functions are executed on respective vector data-elements from the respective first architectural registers to generate respective result data-elements. Successive result data-elements are selectively written to the memory in the issue order without use of a cache.

In some embodiments, different functions require different execution periods, and the result data-elements are written to memory by assigning an issue-order code to each generated result data-element representative of the position of the processing instruction producing the result data-element in the issue order. Each result data-element is written to a result register upon generation by the function, and the successive data-elements are selectively transferred to a respective second architectural register or to memory. The issue-order codes of the result data-elements in the result register and in the second architectural register are compared to identify which result data-element has the earlier issue-order code. The earlier result data-element is selectively transferred to a function for further processing or to memory. The later result data-element is either transferred to, or retaining in, the second register.

BRIEF DESCRIPTION OF THE DRAWINGS

FIG. 4, comprising edge-matched

FIG. 9, comprising edge-matched

FIG. 10, comprising edge-matched

DETAILED DESCRIPTION OF ILLUSTRATED EMBODIMENTS

Figure 1:
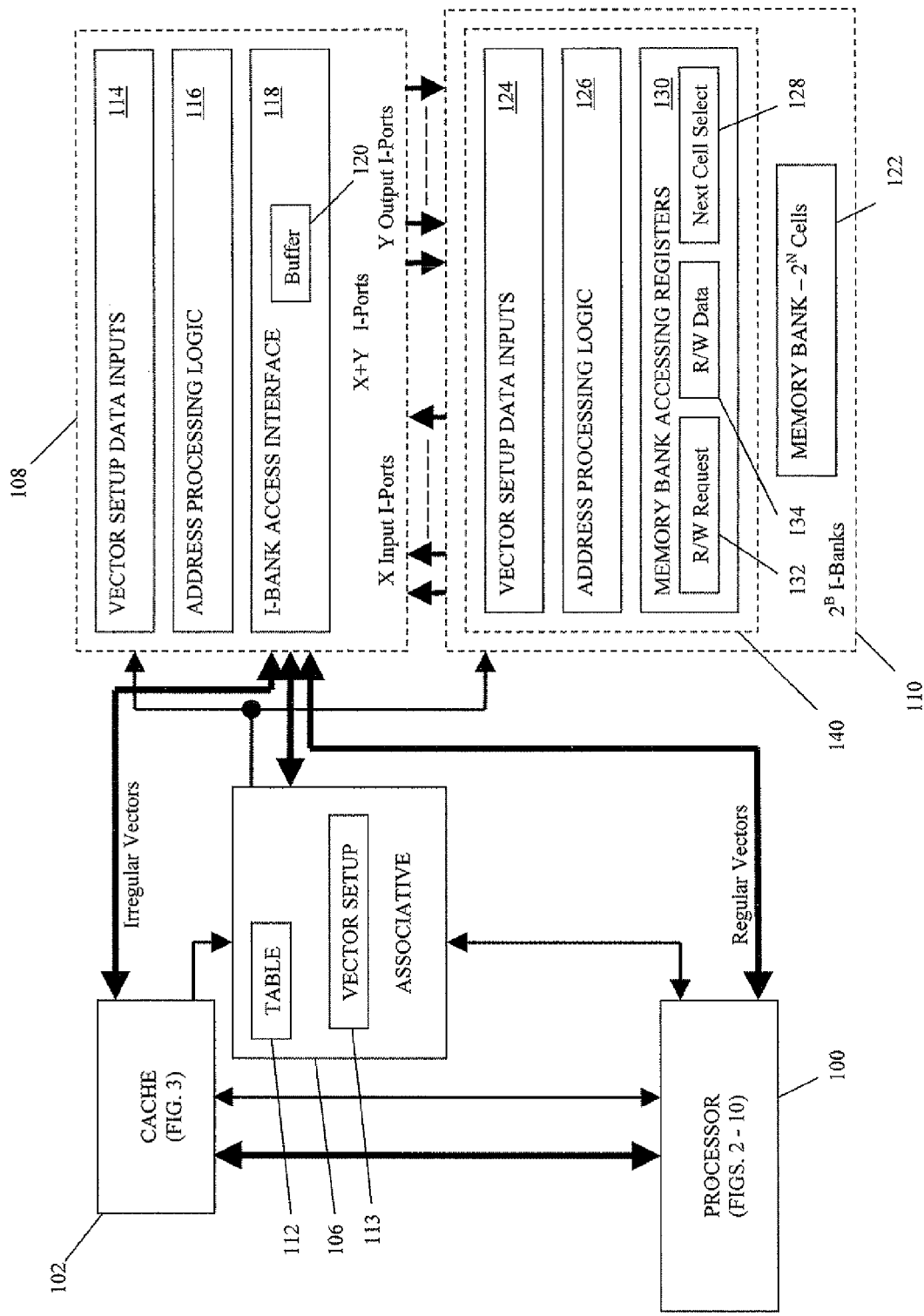
FIG. 1 is a block diagram of a processor system for processing regular and irregular vectors according to the present invention.

In the drawings, labeled items are referenced by 3- and 4-digit reference numerals; the first (left most) numeral (or first two numerals in the case of FIG. 10) identifies the figure where the referenced item is located. Connections between figures have a leading letter, "V" followed by a 3- or 4-digit number corresponding to the reference numeral of the source item; for a source having both, a trailing "T" or "F" identifies connection from true (T) or false (F) output.

FIG. 1 is a block diagram of a single general-purpose processor 100 for parallel processing regular and irregular vectors according to a preferred embodiment of the present invention. Processor 100 includes architectural registers (ARs), functional units, and all shown in more detail in FIGS. 2-10 for register-to-register arithmetic operations and for the register side of register-to-memory and memory-to-register data movement operations. Processor 100 is coupled to cache 102 for staging data moved between the ARs and the memory comprising I-ports 108 and I-banks 110. Processor 100 uses a current data-stack to save and restore AR data for executed software and to save and restore assignments of regular vectors to ARs. The data-stack is a data structure in memory for PUSH and POP instructions to save and restore both data and assignments of ARs, described below. Cache 102 is connected to associative 106 to send virtual-addresses and setup-data to access the memory for cache-line amounts of data for cache-misses and memory-refreshes of executing LOAD, STORE, PUSH and POP instructions of processor 100, as in the prior art. Processor 100 is also connected directly to associative 106 to send virtual addresses and setup data to access assigned regular vectors in the memory according to the present invention. Thus, processor 100 processes irregular vectors via cache 102, as in the prior art, and preferably processes regular vectors directly employing the apparatus of FIGS. 2-10. While processor 100 may process regular vectors via cache 102, as in prior art, the present invention permits more rapid processing of regular vectors using the apparatus of FIGS. 2-10. In any case, processor 100 operates to transfer successive elements of regular and irregular vectors between the architecture registers and the memory cells of I-banks 110 through one or more I-ports 108. Associative 106 includes a table 112 that correlates virtual addresses to physical addresses of the memory cells of I-banks 110.

There are X+Y I-ports 108 accessing data in $2^B$ memory banks 122 of $2^B$ respective I-banks 110, each memory-bank containing $2^N$ data-cells, there being $2^{B+N}$ cells in the $2^B$ memory banks. Each I-port includes vector setup 114 that receives, holds and sets up addressing data for use by address processing logic 116. In like manner for each I-port, each I-bank includes vector setup 124 that receives, holds and sets up addressing-data for use by address processing logic 126. Thus, each I-bank 110 has X+Y copies of the shown pairing of setup 124 and processing 126 for one I-port, and $2^B$ I-banks 110 have (X+Y)·$2^B$ copies of the pairings—one pairing for each I-port 108 in each I-bank 110. For preferred processing of regular vectors using the apparatus of FIGS. 2-10, associative unit 106 receives only a single virtual address from processor 100 for directly accessing all vector-elements of a page of a regular vector as explained in greater detail in my aforementioned prior patent application. Each additional page of the vector requires an additional address be sent. Each additional vector of a total number of pages requires that number of additional addresses be sent. Addresses are sent one at a time, and those of parallel vectors are interspersed in time.

For an assigned regular vector to begin preferred accessing of each of its pages, associative 106 identifies the respective physical address to the vector's register's one particular I-port 108 and to block 140 for that port of each of $2^B$ I-banks 110. For simplicity of explanation, all pages have the same assumable page-size; otherwise, the associative would also identify to processor 100 as well as memory the page-size of the page thereof along with each identified physical address sent just to memory. To access the first element of the first page of the vector, associative 106 receives from processor 100 the first element's virtual address, the vector's stride and any unassumable element-size. Vector setup 113 holds the stride and any element-size while the first element's physical address is constructed for sending physical address, stride and any element size to memory. To construct the physical address, associative 106 finds and concatenates the page's physical page address with the virtual address of the element within the page. The resulting physical address of the element, together with the stride value and any element size value, are supplied as addressing setup data from the associative's vector setup 113 to the port's one vector setup 114 and to its $2^B$ setups 124 to respectively provide initial addressing data to the port's addressing processing logic 116 and $2^B$ logics 126.

In the case of a regular vector, where all vector-elements always have a single assumable size (total bits per element), to access each successive element, logic 116 of the particular I-port 108 increments the address by the assigned vector's stride value adjusted as a count of consecutive memory-data-amounts where each amount is equal in size to that of each element. As explained in conjunction with FIG. 9B, the stride for a 64-bit element-size is shifted $\log_2 64$ bits (6 bits) so its lowest order bit is aligned with the seventh lowest address-bit for each increment. Each increment establishes one of a series of valid physical element-addresses for successive elements of the vector, selecting one I-bank per vector-element accessed from a single I-bank cell. Similarly, logic 126 for the I-port of each I-bank 110 increments similar addressing data to establish a series of valid physical addresses of a cell within a bank to successively address the I-bank's memory bank 122 to access any successive elements therein.

For preferred accessing of memory for a regular vector, the address increments according to the vector's fixed stride and fixed element-size, thus addressing and thereby accessing only desired elements of the vector. Interface 118 of an assigned vector's I-port accesses the successively selected I-banks of the vector's successive elements and successively buffers the elements in buffer 120. If the vector is an input-vector, then the port is an input I-port 108, and buffer 120 handles enough elements read from selected I-banks 110's memory banks 122 via read-data 134 to efficiently allow the issue of vector-update instructions to control (starting and stopping) full rate accessing of elements from memory into the vector's AR via the buffer. If buffer 120 is empty of input-vector-elements when an update-instruction of the vector is otherwise ready to issue, the instruction does not issue until an element is in the buffer ready to enter the AR immediately as the instruction issues. If the vector is an output-vector, then buffer 120 of the vector's output I-port 108 buffers only a single element at a time from (or as if from) the vector's AR. Once sent, each singularly sized output-element passes through one write-data 134 and is written into some one cell of some one memory bank 122.

Each successive element of an output-vector of a vector function is produced by a respective execution of the scalar function thereof and is stored in the AR to which the output vector is assigned. The scalar function has a respective vector-update instruction which, when issued, causes the current output-element to be sent from (or as if from) the AR into memory. The update instruction is not issued if any W data 134 for the vector's I-port of I-banks 110, if the buffer 120 of the I-port 108, or if any of processor 100 between issue and the port is not ready. (Each is ready if it has no not-yet-stored element of another output-vector previously assigned to the same AR.) Otherwise as concerns updating the output-vector, the update-instruction issues immediately because elements of a well interleaved output-vector will not arrive at the same I-bank 110 while the bank's W data register 134 still holding and waiting to store into the memory bank 122 an earlier element of the vector. Thus, buffer 120 of an output port is a minimal buffer, a freely clocked register. Thus, whether an input or an output vector, a vector's successive elements reside one at a time in the vector's AR for successive access (reading) from or (writing) into one addressed cell at a time in the memory banks 122 within a selected plurality of I-banks 110.

All irregular vectors in memory are accessed by LOAD and STORE instructions and thus, via cache 102. Each cache-line is accessed via one of two dedicated simplified I-ports 108 (one an input I-port and the other an output I-port) as vector-elements always having a fixed stride of +1 to access the contiguous memory data thereof. For each cache line, cache 102 is the path from processor 100 into associative 106 for addressing memory and between memory and the processor for elements. Thus, for executing LOAD, STORE, POP and PUSH instructions where a cache miss or a need to restore an altered cache-line to memory causes the need to access memory, the interfaces between cache 102 and associative 106 and between associative 106 and I-ports 108 are simpler than the interface that processor 100 has to directly access memory for preferred accessing of regular vectors.

Each I-bank 110 has one memory bank 122 containing $2^N$ addressable memory cells, the memory cell being the smallest addressable memory unit. All I-banks of a memory are arranged in a plurality of one or more addressable wings, and a given physical address of a given cell within memory comprises the combined physical addresses of a cell within a bank, a bank within a wing and a wing within a memory (where the memory includes multiple wings). For simplicity of explanation, the present invention is described for a memory with a single wing, but is equally applicable to multiple-winged memories described in my prior patent application.

FIG. 1 illustrates the $2^B$ I-banks of one wing; each of any additional implicit wings has an additional set of $2^B$ I-banks. Using the physical address to select the one or more wings to hold each vector-element of a page, only those I-banks of wings to hold the currently accessed page are enabled by addressing setup data sent from associative 106 to all the I-banks of memory to begin accessing the page. Using only the physical address of a cell within a bank to access a cell as all or part of a vector's first vector-element, vector setup 124 receives and holds that setup data as which establishes all the data for the currently accessed page for processing logic 126, which in turn provides inputs for next cell select 128 of a set of accessing registers 130. As one memory cell of memory bank 122 is accessed for one vector, another select 128 of another setup 124, logic 126 and registers 130 of the I-bank generally becomes ready and next to select the next memory cell from the bank for another vector. An update of buffer 120 of an I-port 108 to handle data accessed in any memory bank 122 via the bank's data 134 for the port either is caused by or causes the setting of the bank's 1-bit read/write register 132 for the port to cause either a respective read or write request depending on the I-port type, input or output. Either data reading or writing is performed through a particular R/W data register 134 depending on all within block 140 being respectively for either a particular input or output I-port.

To a memory of I-banks, each cache-line is accessed as a regular vector of a fixed number of elements of stride, +1. So, the write of each cache-line-element from cache 102 into memory is much like a write directly from processor 100 of an element of a regular output vector. Each output vector-element or cache-line-element travels through its respective data buffer 120 and then through the corresponding write-register 134 to be written to the I-bank-addressed cell of the I-port-selected I-bank's memory bank 122. The cell is addressed by the processed address from processing 126 to bank 122 via select 128. The I-bank 110 is selected by the processed address from processing logic 116 to interface 118 to decode the address and select I-banks. Similarly, in a read operation, an element of a regular input vector is read from an addressed memory cell to a read-register 134 of a selected I-bank, and then held ready by the register 134 to be sent when needed to a respective I-port's buffer 120 for input into either processor 100 or cache 102. Where the cache is used for irregular output-vectors or irregular input-vectors, the cache-lines containing vector-elements thereof are respectively read from cache and then written to to memory or are read from memory through cache 102. In any case (read or write, via cache or directly according to the present invention), each next data element after the first of a vector is accessed via the buffer 120 of the same I-port 108 but usually in a different I-bank 110. Generally where more than one vector is being accessed (parallel vectors), successive accesses in time of any one I-bank 110 are for different vectors via their different I-ports 108.

Preferred accessing of a regular vector according to the present invention accesses no more elements than those of one page for each addressing setup from associative 106 to memory 108, 110, and thus also directly from processor 100. For each additional page of a vector, an additional setup of addressing values is sent from processor and then from associative after finding a mapped physical page for the next page's virtual address. Only the addressing setup of the current next page is sent to memory while a page is currently being accessed. The addressing values to be processed for a vector's next page of elements wait in each bank's setup data 124 for the vector's port and in the port's setup data 114 until needed by respective logic 126 and 116. A need of a particular logic 126 occurs soon after it addresses the cell of its particular last element of a page of the vector. Thus, needs of logics 126 of a page occur at successive times respective of successive last elements of the page being accessed in different I-banks. The need of logic 116 of a page occurs respective of the last element of a page being accessed in some I-bank.

The I-banks' next cell selects 128 for an input I-port facilitate pre-reading from memory-cells next-needed vector-elements of an assigned input vector into R data registers 134 and thereafter sending it to buffer 120 of the vector's port, reading and sending each particular element well before it is needed to update the vector's AR. Also, the cell select 128 of the next selected I-bank 110 of an output I-port 108 post-writes the next element of an assigned output vector into the selected cell of the I-bank's bank 122. Each cell is written after the element thereof is sent from the vector's AR toward memory, and thus toward the respective I-port's buffer 120 and the I-bank's register 134 selected by that port.

For preferred accessing of a regular vector and for each page of the vector following the first page, only the correct physical page identification (ID) is supplied by associative 106 for the page's virtual address. For pages following the first page, the first element select within a page of processing logic 116 and logics 126 is correct as calculated from the last element of the previous page using the stride value. Therefore, after the first page, associative 106 needs to supply only the physical page ID, and processor 100 needs to supply only some virtual address of each next page—not necessarily that of the first element or any element of the next page. Thus, the I-ports and I-banks supplement the physical page ID from the associative for producing the entire physical address values for all vector-elements but the vector's first element.

Associative 106 maps pages using a table of page-mappings beginning with the first few mappings in table 112 and generally extending into memory for most mappings of the table, one mapping or table entry per mapped page. Again, for each page but the first for preferred accessing a regular vector, the address mapped is not necessarily the address of the vector's first data-element of the page but is the address of some memory-data within the page. Also, for a started or restarted vector's first page, the address mapped is the initial value of the vector's address parameter, namely the address of the vector's first page's first data-element.

The initial mapping of the first element of the vector supplies the element-select within each page used by the vector's I-port and all I-banks for the vector's data-elements within the first page and all following pages of the vector. Before the initial virtual address (the virtual address of the vector's first data-element) is sent to associative 106 from processor 100, a separate copy of the initial value is held in processor 100 and updated therein according each currently accessed page's size for later sending to associative for mapping each respective following page of the vector. Each update of this separate copy is the address of some memory-data not necessarily the first or any vector-element in each respective next page of the vector.

Successive mappings of pages of a vector by associative 106 keep the latest mapping in setup 114 and setups 124 one page ahead of the currently accessed page having its element-addresses processed in processing logic 116 and logics 126 of the vector's I-port 108. Generally and as for cache and non-cache accesses, associative 106 successively maps addresses of several recently accessed pages using only the few few mappings of table 112 while searching the additional mappings in memory for the mapping of another address of another page not recently accessed. An address not mapped by mappings in table 112 is generally not sought immediately but only after other higher priority addresses are sought and either found or not found. Finally, an interrupt for an address not found does not necessarily occur, and occurs only if necessary to allow processor 100 to continue processing.

FIGS. 2-10 illustrate details of processor 100 for processing regular vectors according to the present invention. The processor of FIGS. 2-10 can issue one instruction with each issue-clock but allows simultaneous arrival of results to different registers. The processor issues instructions to input a result outputted by a previous instruction not yet executed but assured to execute before an interrupt exchanges the state of the processor to that of other processing. Thus, an instruction can issue but wait on a not yet available operand to begin execution. No instruction is issued once before an interrupt and then reissued, or issued again, after a return-from-interrupt. Each instruction issued is issued only once. Instructions are issued serially in the order they appear in code. Each of processor 100's functional units which does not access memory is pipelined, and all functional units share processor 100's one set of ARs for holding both arrived arithmetic results from functional units and input-elements arriving from memory whether via cache or not. Whether originating from memory or from a functional unit, values held in ARs can be inputted as operands into functional units. Values in ARs having output vector capability can be sent to memory as respective elements of respectively assigned output vectors of the ARs. Each functional unit has its own set of input registers for holding an arrived input operand while waiting for any other not-yet-arrived operand. All system registers (all ARs and all other registers) are synchronously clocked by the one system clock.

Figure 2:
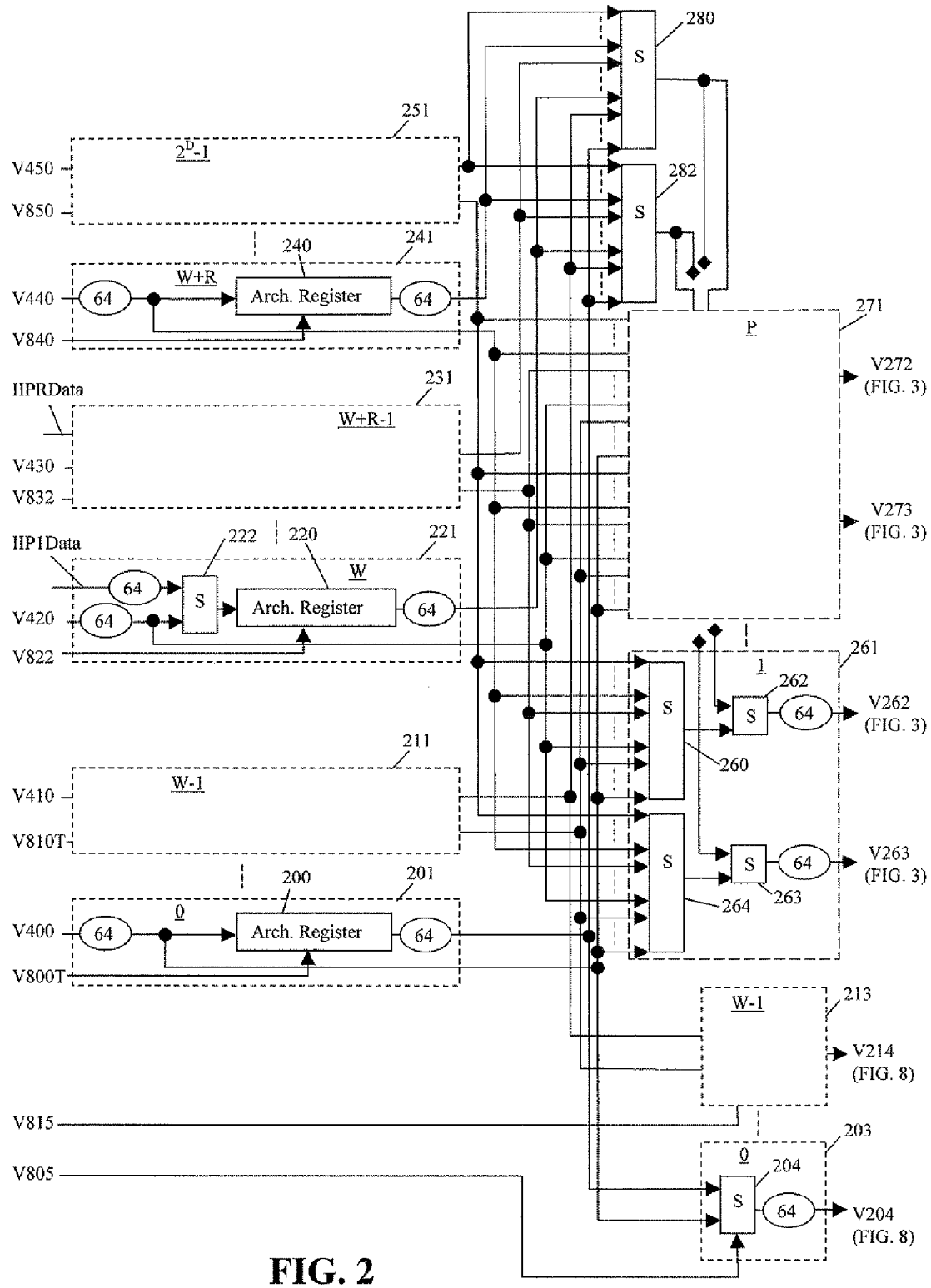
FIG. 2 is a block diagram of architectural registers (ARs) of the processor employing a vector addressing and processing technique for regular vectors according to the present invention.

FIG. 2 is a block diagram of the architectural registers (ARs) of a processor according to the present invention for preferred accessing and processing of regular vectors in the processor's memory. For illustrative purposes, there are 64-bit registers designated 0 through $2^D-1$, where $D \geq 2$. For the preferred accessing and processing, there are W registers having output-vector capability, designated 0, ..., W-1 and consisting of ARs 200, ... of blocks 201, ..., 211. There are R registers having input-vector capability, designated W, ..., W+R-1 and consisting of ARs 220, ... of blocks 221, ..., 231. Finally, the remaining ($2^D-(W+R)$) registers have no vector capability and are designated W+R, ..., $2^D-1$ and consist of ARs 240, ... of blocks 241, ..., 251. As will be more fully understood hereinafter, an instruction can access up to three regular vectors where two ARs receive two input-vectors from memory and one output-vector AR returns a third vector to memory. For any given data processing system, there is some minimal number M of vector-capable ARs required for maximum vector processing, primarily depending on the maximum possible number of instructions issued in parallel. One-third of M should be output-vector ARs and two-thirds should be input-vector ARs. It is additionally preferred that there is at least one AR 240, ... having no vector capability. Thus, $2^D > (W+R)$, $R \geq \frac{2}{3}M$, $W \geq \frac{1}{3}M$ and $M \geq (3$ times the maximum number of instructions issued in parallel). Each AR 200, ..., 220, ..., 240, ... holds a 64-bit value that is a valid possible operand to all instructions issued after the issue of the instruction which put the value into the AR but not after the issue of an instruction to put another, usually different value into the AR. Each AR is capable of receiving a 64-bit value from a respective functional unit's output register 365, ..., 375 via a respective result register (RR) 400, ..., 420, ..., 440, .... In addition, each AR 220, ... having input-vector capability is also capable of receiving a 64-bit value from its respective input I-port buffer 120 via a respective one of R 64-bit input-connections IIP1Data, ..., IIPRData to feed input vector data from a respective input i-port 1, ..., R into a respective one of R selects 222, .... Each 2-way select 222 selects an input-vector-element to its AR 220 from its buffer 120 or a result from some functional unit via the AR's result register.

Each AR 200, 220 or 240 inputs into two 64-bit wide $2^D$-way selects 280 and 282, which respectively input into each two selects of P pairs of 64-bit 2-way selects 262, ... and 263, .... Upon issue of an instruction, select 280 and the one of P selects 262, ... which feeds into the instruction-selected one of P functional units 364, ..., 374 feed any available first operand of the instruction-selected one of ARs 200, ..., 220, ..., 240, ... into the one of P first input registers 362, ..., 372 of the selected functional unit. In like manner and upon issue of the same instruction, select 282 and the one of P selects 263, ... which feeds into the same functional unit feed any available second operand of the instruction-selected one of ARs 200, ..., 220, ..., 240, ... into the one of P second input registers 363, ..., 373 of the functional unit. If both operands are available at issue time, then they enter their respective first and second input registers in parallel and the instruction begins execution immediately, unless the needed functional unit already has an issued instruction still awaiting to begin execution or the instruction updates a not-ready input-vector. If one or both issued operands are not available, then while holding none or any first arriving operand in its input register, the instruction waits for the last to arrive in its input register and thereafter immediately begins execution, unless the result would arrive at its AR at the same time as a result of another already issued instruction arrives at the same AR.

Any first operand that is a result of a prior instruction and is not available in its AR at the operand's instruction's issue-time by-passes the AR and arrives at the functional unit's first input register 362, ..., 372 directly from the AR's RR 400, ..., 420, ..., 440, .... More particularly, any such first operand arrives at the respective block 201, ..., 211, 221, ..., 231, 241, ..., 251 via a respective path V400, ..., V410, V420, ..., V430, V440, ..., V450 (FIG.

2) from the RR for input directly to the respective one of P selects 260, . . . selected by the one of P selects 262, . . . . Similarly, any second operand that is a result of a prior instruction and is not available in its AR at the operand's instruction's issue-time arrives at the functional unit's second register 363, . . . , 373 from the AR's RR, via a path V400, . . . , V410, V420, . . . , V430, V440, . . . , V450 to the respective select 264 and 263. Hence, all issuing and issued operands simultaneously in as many RRs for respective input registers 362, 363, . . . , 372, 373 (i.e., result registers with results from as many functional units of as many prior instructions) are immediately and simultaneously processed through respective selects 260, 264, . . . , and thence through corresponding selects 262, 263, . . . into the input registers. Either or both of the two issuing operands for the two input registers of the functional unit of the issuing instruction that are immediately in either or both ARs (i.e., architectural registers with results from as many functional units of as many prior instructions) are processed through respective selects 280, 282 and thence through respective selects 262, 263, . . . into the unit's respective input registers.

An operand of a particular instruction that is the result of a previously issued instruction appears in its AR's result register (RR) for one clock-cycle before possibly appearing in the AR for one or more of the next cycles. If it is not selected from the RR during the singular clock cycle, then during some one cycle afterwards it is selected from the AR. If it never appears in the AR, then the result-become-operand is always selected from the RR during the singular cycle. An instruction's result becomes a following instruction's operand either from the RR as the following instruction's awaited operand (the slow to arrive result of the previously issued instruction) or from either the RR or the AR as the currently issuing following instruction's not awaited operand (the just arriving or the previously arrived result of the previously issued instruction). Preferred accessing of a regular input-vector causes successive elements to be in one of the input-vector ARs 220, . . . but not in the AR's RR. Thus the elements are always selected as always available from the AR (and not from the AR's RR), selected as already explained because an element-become-operand is thereafter handled as such without additional distinction. If one operand is neither an input-vector-element nor available in its AR or RR at issue, then the other operand as possibly an input-vector-element waits in its functional unit's input register until the one arrives from its AR's RR into its input register to thereafter immediately cause the instruction to begin execution except to avoid simultaneous same AR arrivals.

Selects 280 and 282 to select from ARs 200, . . . , 220, . . . , 240, . . . are for all functional units 364, . . . , 374, whereas each pair of selects 262 and 263, . . . and selects 260 and 264, . . . to select from RRs 400, . . . , 420, . . . , 440, . . . are only for a particular functional unit. Simultaneous selecting by selects 280 and 282 occurs only when the two operands selected are in their ARs at the time of instruction issue. If one or each of the required operands is not yet in its AR or RR but is assured of arriving therein before an interrupt occurs, then the instruction issues if any input- or output-vector it updates is ready to be updated and if the needed functional unit is not already reserved by a previous instruction waiting to begin execution. The processor can have multiple identical functional units to avoid some such delay of issue. Finally, each pair of the P pairs of selects 260, 264, . . . is for a designated function unit. Each select 260, 264, . . . selects any awaited result just arriving at an AR's RR as the normal output of a functional unit, simultaneously selecting any so-arriving results as operands to as many first and second input registers 362, 363, . . . , 372, 373 of the P functional units 364, . . . , 374 which await them. Thus, there are no restrictions on simultaneously arriving results from functional units except that no two can arrive at the same AR at the same time. Each select of the P pairs of selects 262, 263, . . . is a slave of the two selects feeding into its two inputs, and the two cannot compete to use the select 262 or 263, . . . at the same time. Selects 262 and 263 of block 271 feed into a longest functional unit 374 and selects 262 and 263 of block 261 feed a shortest functional unit 364, etc. Thus, the set of two $2^D$-way and two 2-way selects of each of P blocks 261, . . . , 271 selects operands for one of the P functional units 364, . . . , 374.

The current values in the output-vector ARs 200, . . . and the current values in the respective RRs 400, . . . are also respectively supplied to 64-bit 2-way selects 204, . . . , which respectively select either the contents of the AR 200, . . . or the contents of the AR's RR 400, . . . for input into the respective w-data registers 8012, . . . respectively for the AR's restore-order buffers 8010, . . . in respective blocks 801, . . . , 811 for eventual writing of any thereto assigned output-vector's elements to memory. AND gates 805, . . . respectively select either RRs 400, . . . when set or output-vector ARs 200, . . . when clear, each selecting one or the other through its select 204, . . . of respective block 203, . . . , 213.

The clock-gatings for ARs 200, . . . are supplied by the true outputs V800T, . . . , V810T from respective AND gates 800, . . . in blocks 801, . . . , 811; clock-gatings for ARs 220, . . . are supplied by outputs V822, . . . , V832 from respective OR gates 822, . . . in blocks 821, . . . , 831; clock-gatings for ARs 240, . . . are supplied by outputs V840, . . . , V850 from respective AND gates 840, . . . in blocks 841, . . . , 851. A set or clear gate respectively allows its AR to be thereafter clocked or not clocked.

Figure 3A:
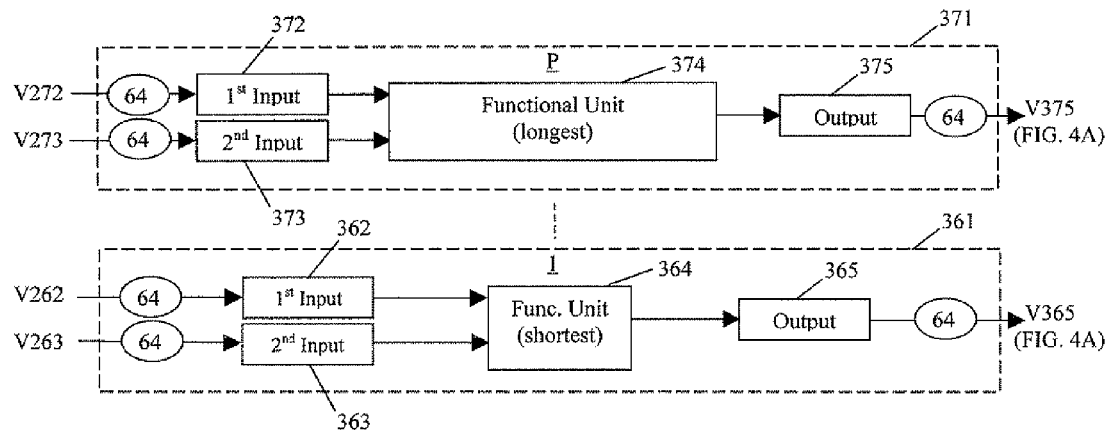
FIG. 3A is a block diagram of the processor's functional units for computing results destined to the ARs of FIG. 2.
Figure 3B:
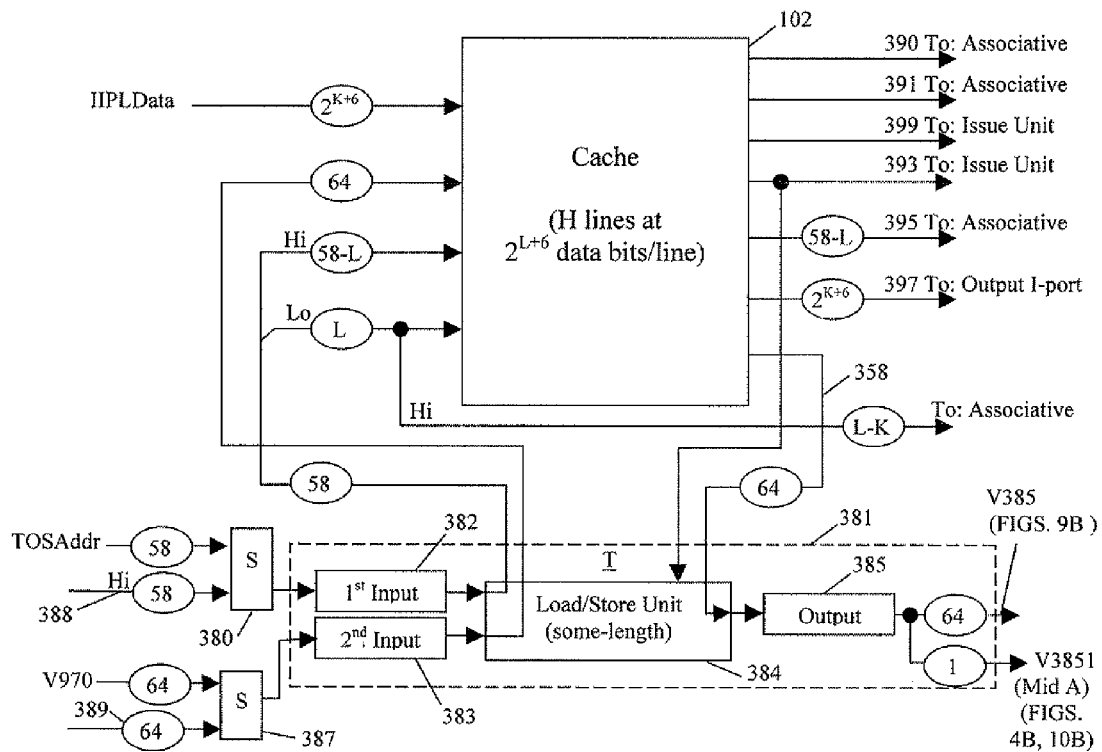
FIG. 3B is a block diagram of a functional unit, as in FIG. 3A, having results processed through a cache.

FIG. 3A is a block diagram illustrating the pipe-lined functional units for using and producing values in the architectural registers (ARs) of FIG. 2. Each of a plurality of P blocks 361, . . . , 371 contains a respective functional unit 364, . . . , 374, a first input register 362, . . . , 372, a second input register 263, . . . , 373 and an output register 365, . . . , 375. Ordinarily, each functional unit 364, . . . , 374 is capable of performing any of a plurality of respective functions on operands to produce a result in some respective fixed period of execution time. Thus all functions performed by any given functional unit requires the same fixed period of execution time, but the execution times to perform functions by different functional units may be different. The units are arranged in an order based on their respective fixed-periods of execution, from the longest (functional unit 374) to the shortest (functional unit 364). In some embodiments, some functional units may be identical, in which case one is used for one occasion and another is used for another occasion, both for executing separate occurrences of the same instruction. To execute one of its instructions, each functional unit's first input register 362, . . . , 372 receives the first operand (possibly an input-vector-element) and second input register 363, . . . , 373 receives the second operand (possibly an input-vector-element). The two operands are received respectively from the paired selects 262,263 within a one of the P blocks 261, . . . , 271 via the respective pair of connections V262, . . . , V272 and V263, . . . , V273 into the functional unit. If necessary for the instruction executed, an output register 365, . . . , 375 passes a single 64-bit result (possibly an output-vector-element) from the respective functional unit to one of $2^D$ RRs (result registers) 400, . . . , 420, . . . , 440 . . . . Each RR provides output into a respective one of $2^D$ ARs 200, . . . , 220, . . . , 240, . . . .

The two input registers of each functional unit receive one or two operands and possibly hold one or both for more than one clock-cycle, receiving each operand any time that is not before the issue-time of one of the unit's instructions and holding each operand until beginning execution of the instruction. A unit begins execution of an instruction immediately after receiving the necessary one or two operands, except possibly to avoid simultaneous arrivals of results at the same AR as is explained in greater detail in conjunction with FIG. 5. Each functional unit 364, . . . , 374 delivers a result to its output register 365, . . . , 375 at a fixed amount of time after beginning execution, an amount of time that is the same for all the unit's instructions.

One of blocks 361, . . . , 371 is block 381 (shown separately in FIG. 3B) that operates with cache 102. Block 381 contains a load/store unit 384 which is the corresponding functional unit 364, . . . , 374, except that load/store unit 384 has a two-part time of execution, the first part being variable and the second being fixed. Load/store unit 384 is usually one of the shorter functional units if not the shortest because its fixed or second part of execution time is desirably short. Block 381 contains the respective first and second input registers 382 and 383, corresponding to the respective register 362, . . . , 372 and 383, . . . , 373 and contains an output register 385 corresponding to the respective register 365, . . . , 375. Connection 388 is the respective one of connections V262, . . . , V272, and connection 389 is the paired respective one of connections V263, . . . , V273. Connection V385 is the respective output connection V365, . . . , V375 that outputs to any one of registers 400, . . . , 420, . . . , 440 . . . and additionally outputs to update 904 (FIG. 9B). Select 380 selects an operand into input register 382 either from an instruction-designated AR via connection 388 or from the current top of memory stack via connection TOSAddr as an operand for POP and PUSH instructions. Select 387 selects an operand either from an instruction-designated AR via connection 389 or from connection V970 as an operand of a vector-PUSH instruction; the parameters of a thereby deactivated vector of the designated AR are saved to the stack from select 970. Select 970 selects the parameters of the thereby deactivated vector of any particular vector-capable-AR as described in further detail in connection with FIG. 9.

In addition, load/store unit 384 does LOAD and STORE instructions. A STORE instruction receives an address value into input register 382 and receives the value to be stored into memory at the respective address into input register 383, both from respective connectors 388 and 389 selected through respective selects 380 and 387, each from an instruction designated AR. A LOAD instruction receives nothing significant into input 383, but receives an address into input 382. When executed, a LOAD instruction reads a value, possibly an irregular vector-element, from cache 102 at the virtual address as if addressing memory 110 via associative 106. If necessary, cache reads memory through input I-port 108 at the virtual address's physical address as mapped by associative 106. In any case, the loaded value enters into output register 385 (respective output register 365, . . . , 375) on its way via respective connection V365, . . . , V375 to the instruction-designated AR. On the other hand, a STORE instruction supplies nothing significant into output 385, but its output is into cache at the virtual address from the AR the instruction designates, and some later time through output I-port 108 into memory 110 at the address's physical address as mapped by associative 106.

Cache 102 receives, holds and supplies the data of H cache-lines of memory's data for LOAD, STORE, POP and PUSH instructions. A line is an aligned certain-sized block of contiguous memory data. In the example of FIG. 3, each cache-line contains $2^L$ data amounts, with each amount containing 64 bits. The cache has two modes for accessing its lines: a cache-word mode for accessing 1 of $2^{L-K}$ $2^{K+6}$-bit aligned amounts (cache-words) per line per clock-cycle and an element-mode for accessing 1 of $2^L$ 64-bit aligned amounts (amount is equivalent to that of one AR or element) per cache line per clock-cycle. At any one time, no more than two lines are being accessed, each either being read or written, either in word- or element-mode but no more than one line is accessed at a time in a particular mode.

The 58 most-significant (high) bits of a 64-bit virtual address addresses a particular 64-bit element in virtual memory. Input register 382 outputs into cache 102 holding the address operand of a LOAD, STORE, scalar-POP or scalar-PUSH instruction during the variable or first part of the instruction's execution. Input register 383 outputs into cache 102 holding the operand to be stored by a STORE or scalar-PUSH instruction into cache also during the variable part. The high 58-L bits of the 58 bits from input 382 supply cache 102 with the virtual address of the line to be accessed by which cache detects if the line is presently held by it. If held, 1-bit connection 399 from cache to the issue unit of processor 100 pulses set for one cycle during the one clock-cycle after execution begins to signal that the instruction is assured of being fully executed before an interrupt occurs. Until assured by the signal on connection 399, the issue unit does not allow the instruction following the one currently being executed by the load/store unit 384 to attempt to issue. Also, if held, 1-bit connection 393 pulses set for one cycle either at the same time or later. If the instruction is a STORE or scalar-PUSH instruction, then connections 399 and 393 pulse together. If the instruction is a LOAD or scalar-POP instruction, they either pulse together or 399 pulses later depending on there being a zero issue-order-code in the instruction-designated result-AR's future-timing-chain rank before the entry-rank of the load/store unit 384 as will be explained in more detail in connection with FIG. 5. For the LOAD or scalar-POP instruction, pulsing of connection 393 waits to pulse the cycle after the zero code was in the rank before the entry rank to avoid having two results arrive at the AR at the same time. At the same time connection 393 pulses, the result is into freely clocked output register 385 from cache via 64-bit connection 358. Connection 393 also provides a signal to the issue unit to allow the issue unit to permit issuance of another LOAD, STORE, POP or PUSH instruction to load/store unit 384. The signal from connection 393 allows the issue unit to establish the timing signals (T1 and T2 pulses) for the apparatus of FIGS. 9 and 10 for timing the sending or receiving of vector parameters for respective vector-PUSH and vector-POP instructions, the IssueUPopXT1 and IssueUPopXT2 signals where X=0, . . . , 3 and the select gate signals for selects 9011, . . . of blocks 910, . . . , 911, 921, . . . , 931.

As will be more fully explained in connection with FIG. 5, a result to an AR in an output register 365, . . . , 375 of a respective functional unit 364, . . . , 374 must have its issue-order-code in the output rank of the designated AR's respective future-timing-chain 500, . . . , 520, . . . , 540, . . . at the same time. Thus, the entry rank of the load/store unit 384 is the output rank of the respective future-timing-chain as for the shortest functional unit 364. Connection 393 from cache connects into load/store unit 384 to signal the unit to stop holding the executing instruction's operands in input registers 382 and 383 and to allow any next LOAD, STORE, POP or PUSH instruction's operands to enter the input registers. A LOAD, STORE, POP or PUSH instruction accesses cache in element-mode, and the L–K most-significant bits of the L least-significant (low) bits into cache from input 382 address the word accessed of any line so accessed. Also, in element-mode, the K low bits into cache from input 382 address the element accessed of the word accessed.

If the access in element-mode is for a STORE or PUSH instruction, then the access is a write into cache and the element written is into cache from input 383 one cycle before connection 393 pulses, but the write occurs during the cycle connection 393 is set, the cycle just before load/store unit 384 releases the instruction's operands from inputs 382 and 383. A vector-POP or vector-PUSH instruction accesses cache twice with connection 393 pulsing twice, but connection 399 only pulses once at the same time as the second pulse of connection 393, at the same time for vector-POP because results are vector-parameters from cache into parameter registers of FIGS. 9, 4B and 10B, and not into any AR. The first of a vector-POP or PUSH instruction's two pulses from connection 393 into load/store unit 384 causes inputs 382 and 383 to release the instruction's first operands and to immediately receive the second operands. As already explained, a POP and PUSH instruction receives its address operand into input 382 from connection TOSAddr through select 380. For a vector-POP or vector-PUSH instruction, the address is updated twice. Connection 393 pulsing from cache into load/store unit 384 causes each update of address on connection TOSAddr with the second address operand of a vector-POP or vector-PUSH instruction being the result of the first update. For a vector-PUSH instruction, the first and second operands into input 383 are from the parameter registers of FIGS. 9, 4 and 10 selected through select 387 from connection V970, the address parameter is the first operand and the others are the second. The reverse parameter-order for first and second results is seen at output 385 for a vector-POP instruction, address is second and others first.

If an element-mode access of cache is to a line not currently in cache, then neither connection 399 nor 393 pulses set but either connection 390 or 391 do pulse set for one cycle. Any element write-mode access into a line in cache alters the line with respect to what is in memory for it. Such an access marks it so that if it is chosen to be evicted from cache to make room for a new line, then connection 390 pulses instead of connection 391 when neither connection 399 nor 393 set. On the other hand, if the chosen line for eviction has not been altered, then instead of connection 390 pulsing if neither does, connection 391 pulses. Each of connections 390 and 391 outputs into associative 106 from cache, 390 so that when pulsed it causes both the input and output I-ports of cache to be setup to access a cache line in memory, whereas, pulsing connection 391 causes only the input I-port to be setup. When connection 390 pulses, the virtual address of the evicted line is from cache to associative via connection 395 during the pulse, and the address of the new line is the next cycle via connection 395. When connection 391 pulses, the virtual address of the new line is seen the same cycle on connection 395. The cache-word-order of accessing memory by the dedicated I-ports of cache matches that done by cache for word-order of accessing itself with the word of the element needed first being accessed first both in memory and in cache for the needed element-mode access to immediately follow. Thereafter, successive reads of additional cache-words of the new line from memory are done for writing them into cache. If necessary for restoring an altered evicted cache line to memory from cache, immediately before each new cache-word overwrites it, a read of a cache-word of the evicted line from cache is done for writing it back into memory. Cache can use the I-ports in parallel, restoring a word and replacing it, same word by same word until all words in a line of storage in cache are restored and/or replaced. Also, the I-ports can pause anytime to allow cache to access in element mode for the instruction causing the new line and for following instructions—all while allowing a number of other cache lines to be accessed in element-mode while the new line is being written into cache in word-mode. Reading of evicted and writing of new vector cache-line data are each in word mode with data from the input I-port into cache from memory being via a $2^{K+6}$-bit connection IIPLData, and with data from cache into the output I-port being via $2^{K+6}$-bit connection 397. Finally, the L-K bits from input 382 to associative 106 allow associative to setup the I-ports to first access the first needed word of a new line (input I-port) and of an evicted line (output I-port).

Figure 4A:
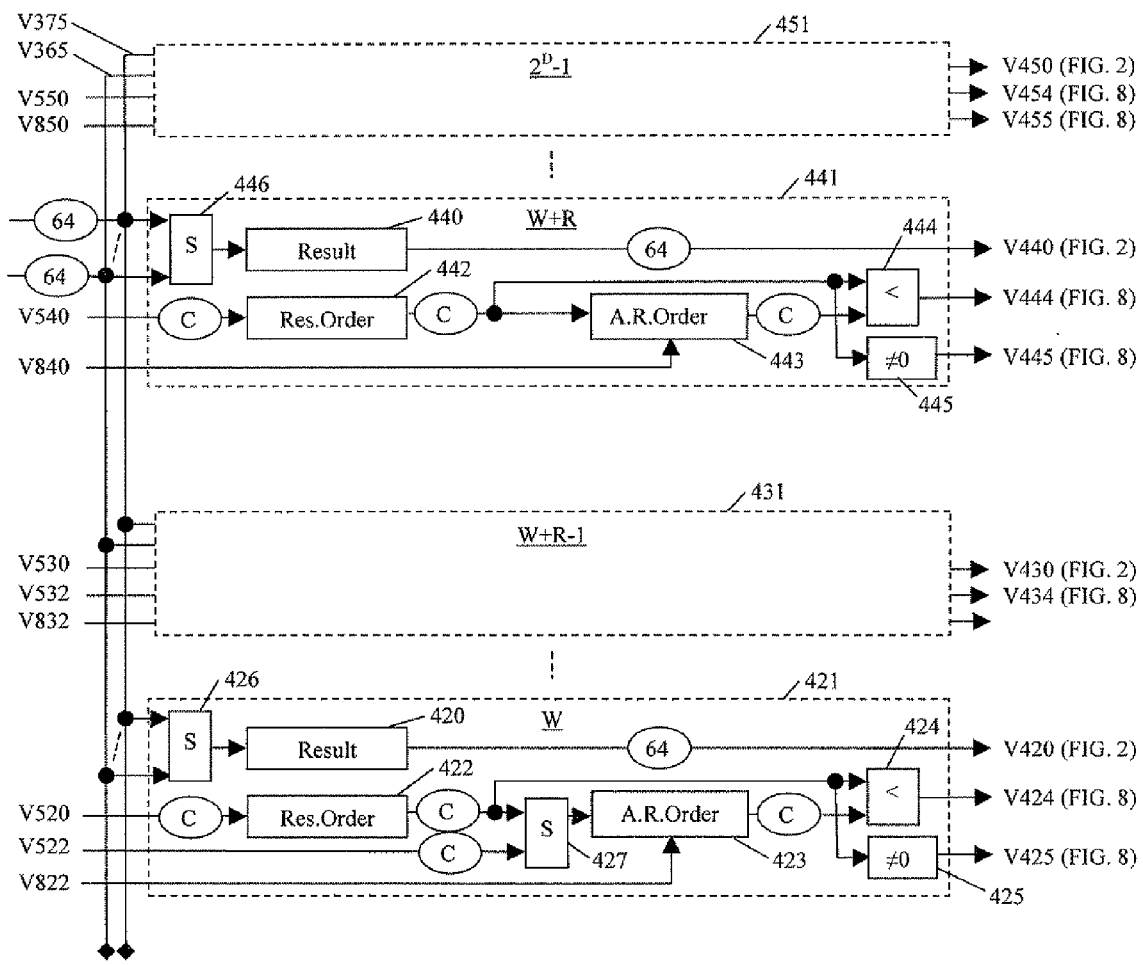
FIGS. 4A and 4B, is a block diagram of result registers to receive results from functional units and select latest results to the ARs.
Figure 4B:
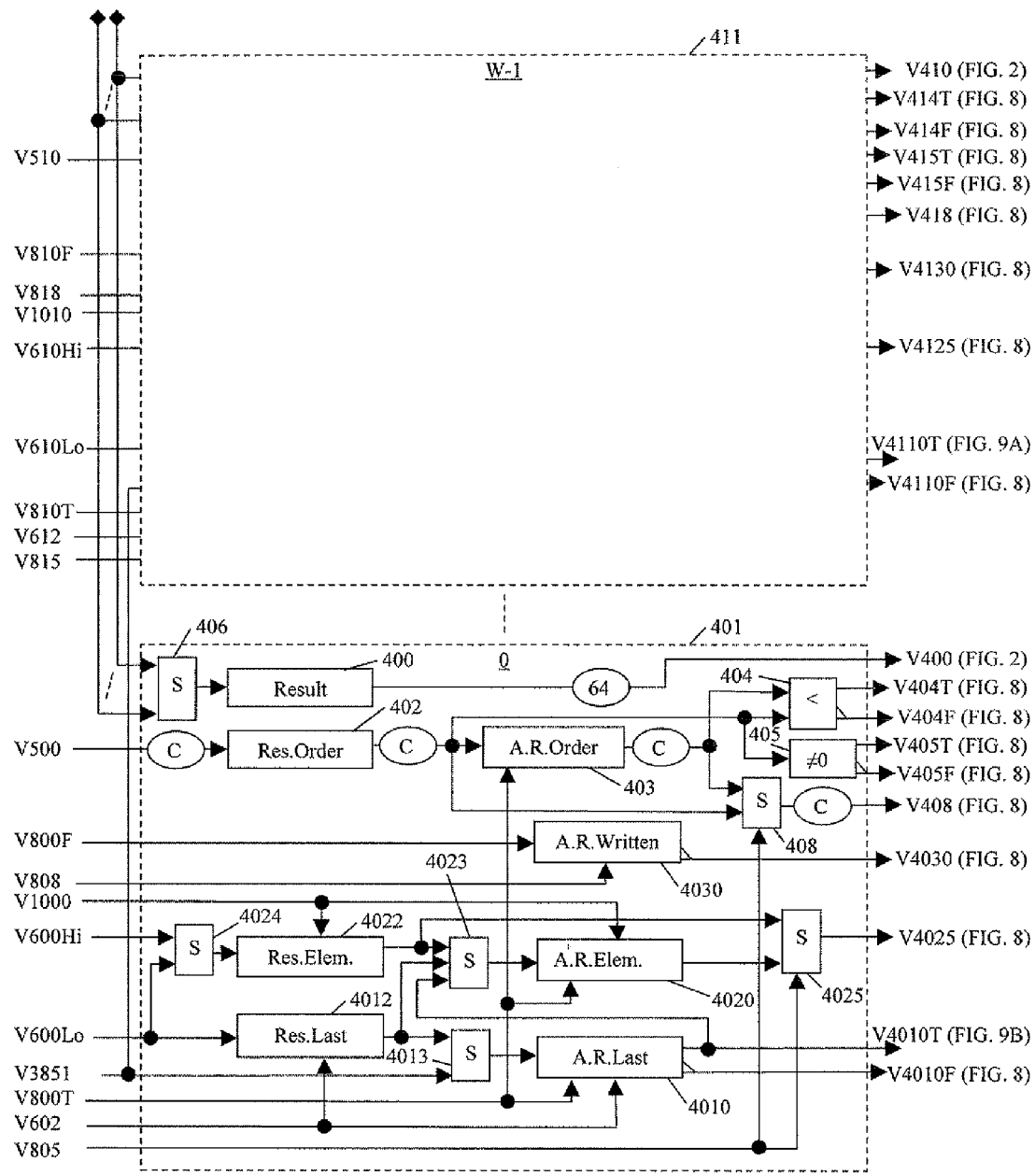

FIG. 4 illustrates $2^D$ blocks 401, ..., 411, 421, ..., 431, 441, ..., 451 each containing a 64-bit result registers (RRs) 400, ..., 420, ..., 440, .... Each RR is associated to a respective one of the $2^D$ 64-bit architectural registers (ARs) 200, ..., 220, ..., 240, .... Thus each AR has its particular RR for receiving results from the P functional units 364, ..., 374; receiving no more than one result from a functional unit at a time (one clock-cycle). A 64-bit P-way select 406, ..., 426, ..., 446, ... selects one of P possible 64-bit results from the P functional units 364, ..., 374 for input to the respective RR based on the instruction designation of a respective AR, and hence the associated RR. Each result is thus buffered for one clock-cycle in the RR 400, ..., 420, ..., 440, ... for possible delivery into (a) the respective AR 200, ..., 220, ..., 240, ... (b) one or more inputs 362, 363, ..., 372, 373 of one or more functional units 364, ..., 374, and/or (c) into the w-data register 8012, ... respective of the respective restore-order-buffer 8010, ... if the result is in an RR 400, ... associated with a output-vector AR 200, ....

During each clock-cycle, each RR 400, ..., 420, ..., 440, ... is capable to hold a different single 64-bit result from any one of the functional units; each select 406, ..., 426, ..., 446, ... is responsive to the instruction to route the result to the correct register. The RRs are freely clocked each clock-cycle, and the only cycle that each result is in the AR's RR is the first cycle that the result is no longer future, but is possibly awaited and only now first available for use as an operand. If the result is already updated to an element as part of an output-vector to be written to memory, then the element is routed from its RR 400, ... (of an output-vector AR 200, ...), and through the respective select 204, ... into w-data register 8012, ... of restore order buffer 8010, ... for eventual writing to memory. If the result is updated to an element after being in its RR 400, ..., then it is updated while residing in the respective AR 200, ... and is sometime thereafter routed from the AR through the respective select 204, ... into w-data register 8012, ... for eventual writing to memory.

Figure 5:
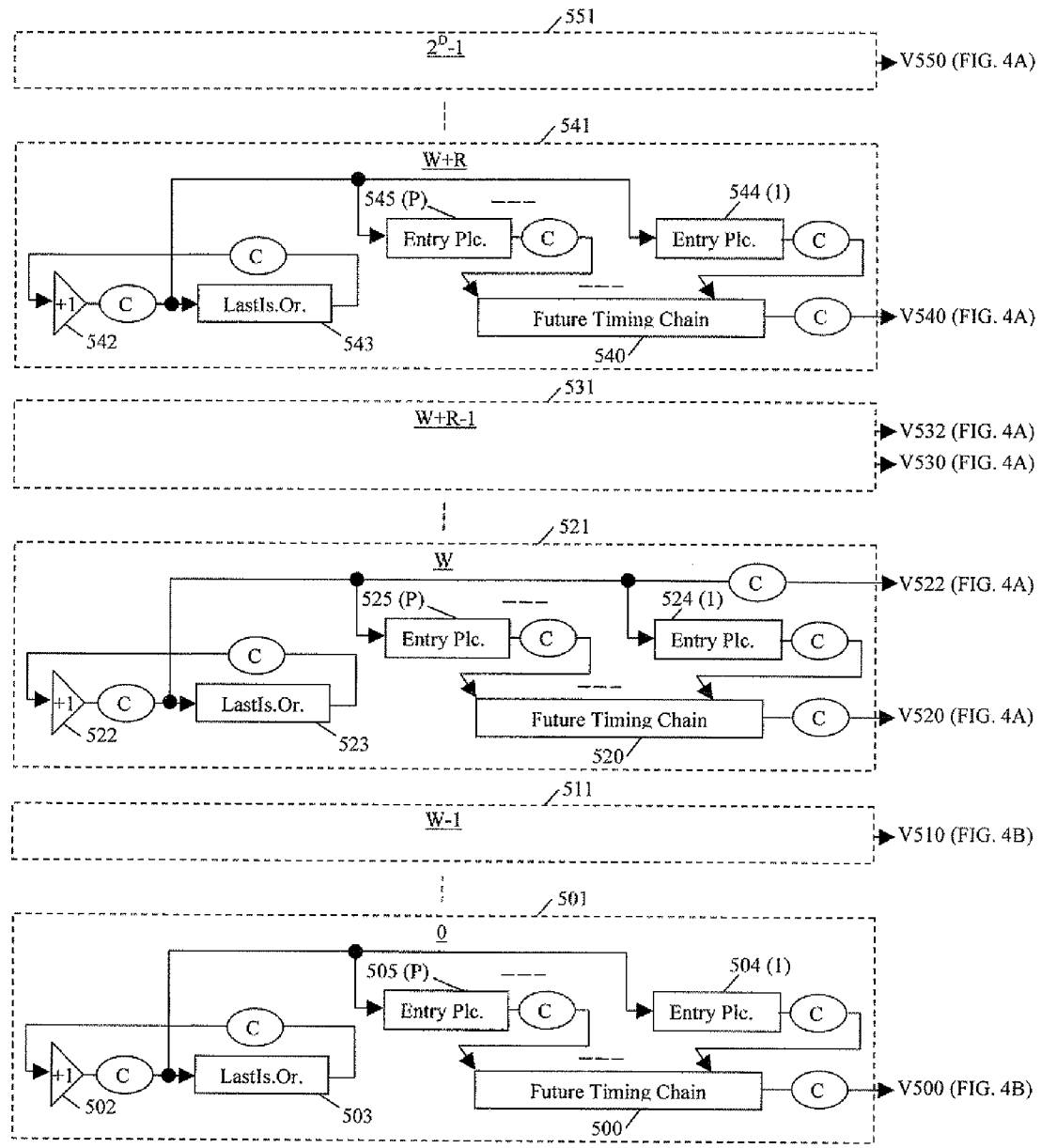
FIG. 5 is a block diagram of issue order code timing chains of the future buffer.
Figure 6:
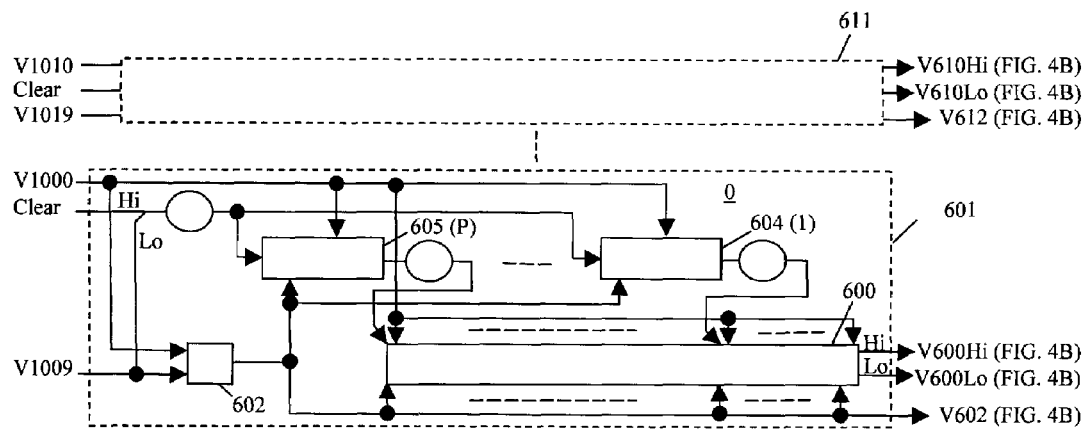
FIG. 6 is a block diagram of second timing chains for the future buffer for handling last bits and element bits.
Figure 7:
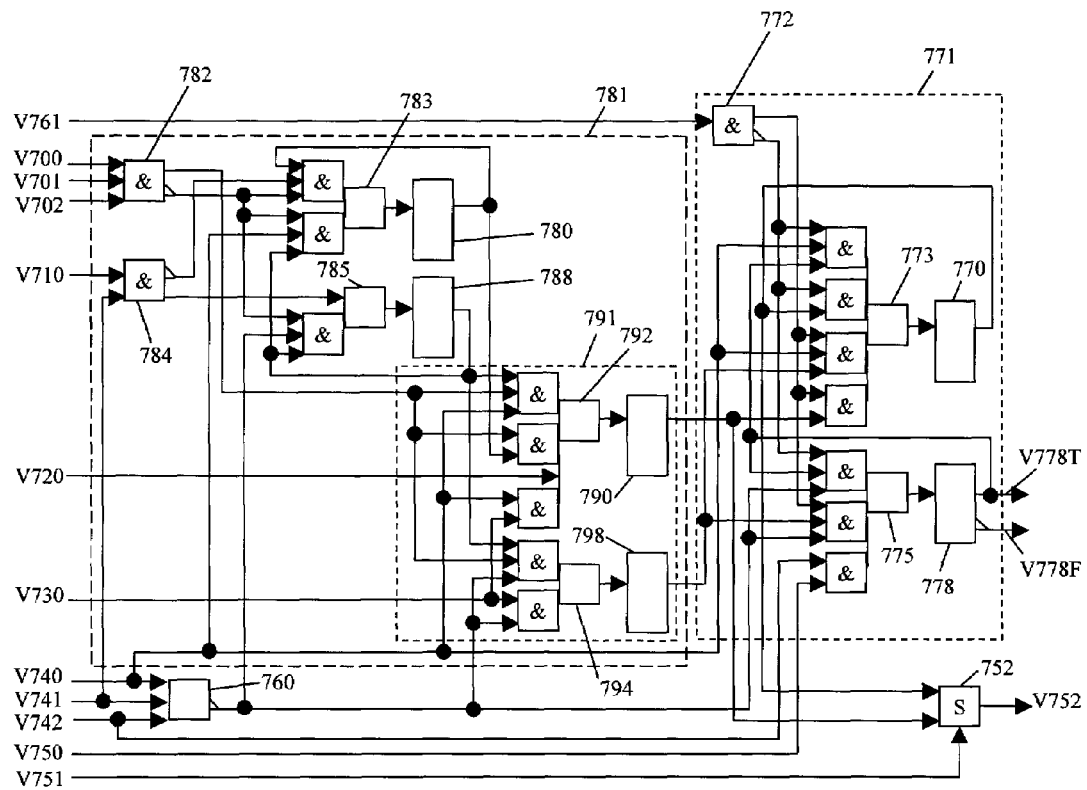
FIG. 7 is a logic diagram for each second timing chain of FIG. 6 and for each result register of FIG. 4 from the chain.

The processor's future buffer for issued future results of functional units is illustrated in FIGS. 5, 6 and 7. The future buffer has needed information is concerning each issued instruction's not-yet-existing result for an architectural register (AR) of an instruction executing or waiting to begin execution in a functional unit, and such yet-to-exist result is identified as not yet available to be an operand until first available from the respective RR. A timing chain 500, ..., 520, ..., 540, ... supplies a C-bit issue-order code into result-order register 402, ..., 422, ..., 442, ... via the respective connection V500, ..., V510, V520, ..., V530, V540, ..., V550 as the code for the newly existing result first in the respective result register (RR) 400, ..., 420, ..., 440, .... The result-order registers 402, ..., 422, ..., 442, ... are freely clocked so an order code in a result-order register for a result in an RR is also there for only a single cycle. Immediately after the single cycle, the result and code that were in the respective RR 400, . . . , 420, . . . , 440, . . . and result-order register 402, . . . , 422, . . . , 442, . . . during the cycle possibly become the result and code in the respective AR 200, . . . , 220, . . . , 240, . . . and AR-order register 403, . . . , 423, . . . , 443, . . . if both are clock-gated via the respective connection V800T, . . . , V810T, V822, . . . , V832, V840, . . . , V850.

As a result from an RR feeds into the corresponding AR, the code from the corresponding result-order register feeds into the corresponding AR-order register. The code from result-order 402, . . . , 442, . . . into the respective AR-order register 403, . . . , 443, . . . is direct, but the code from result-order 422, . . . into the respective AR-order register 423, . . . is through a respective select 427, . . . . Select 427, . . . selects different codes while select 222, . . . selects a result or input-vector-element. A result from RR 420, . . . through select 222, . . . and into AR 220, . . . has a code parallel in time from result-order register 422, . . . through the select 427, . . . and into the AR-order register 423, . . . . An input-vector-element from the one of R input-I-ports 108 via IIP1Data, . . . , IIPRData through select 222, . . . and into AR 220, . . . has a code parallel in time from incrementor 522, . . . via V522, . . . through select 427, . . . and into the AR-order register 423, . . . .

The code in the AR's RR's order register 402, . . . , 422, . . . , 442, . . . and the code in the AR's order register 403, . . . , 423, . . . , 443, . . . feed respective C bits into a C-bit comparator 404, . . . , 424, . . . , 444, . . . which delivers a set output via V404T, . . . , V414T, V424, . . . , V434, V444, . . . , V454 if a comparison of the RR's and AR's codes indicate the RR's result was issued after the AR's result (RR code is circling ahead of the AR code). In the case of the comparator 404, . . . associated with a output-vector AR 200, . . . , the comparator delivers a set output via V404F, . . . , V414F indicating the RR's result was issued before the AR's result. The RR's code also feeds into the respective not-zero-check 405, . . . , 425, . . . , 445, . . . which outputs as set via V405T, . . . , V415T, V425, . . . , V435, V445, . . . , V455 if the RR code is not zero, thereby indicating that the result in the RR is a valid result. (A result in an architectural register (AR) is always valid, and its code in AR-order register 403, . . . , 423, . . . , 443, . . . is never zero.) The check 405, . . . (associated with an output-vector AR) also outputs set via V405F, . . . , V415F to FIG. 8 if the RR's code is zero, indicating an invalid result in the RR.

Also for and parallel in time with that in an output-vector AR 200, . . . and in the respective AR-order register 403, . . . are three 1-bit values: AR's written-bit in AR-written register 4030, . . . , AR's element-bit in AR-element register 4020, . . . and AR's last-bit in AR-last register 4010, . . . . Likewise for and parallel in time with that in RR 400, . . . and in the respective result order register 402, . . . are two 1-bit values: RR's element-bit in result-element register 4022, . . . and RR's last-bit in result last register 4012, . . . . A set element-bit means the result in its respective RR or AR is also an output-vector-element to be written directly to memory and not via cache. A set last-bit means the result in its RR or AR is the last issued result to the respective AR and is not yet an output-vector-element. As will be explained more fully with FIGS. 6 and 7, no more than one future or arrived result issued to an AR has a set last-bit. Only a result having a set last-bit can be updated to also be an output-vector-element; updating a result to also be an output-vector-element clears it last-bit as its element-bit sets. Thus, after an element-bit sets there is no set last-bit until another result is for the AR.

As already discussed, a result that is also an output-vector-element (has a set element-bit) is sent toward memory via its respective select 204, . . . either immediately from its RR or some time thereafter from its AR. A result that is an output-vector-element in its respective AR 200, . . . and has been sent toward memory has its written-bit (in respective AR-written 4030, . . . ) set to prevent the element from being sent more than once; the bit sets in the respective AR-written 4030, . . . immediately after sending from the respective RR if also immediately entering the respective AR or immediately after sending from the respective AR if thereafter remaining therein.

AND gate 800, . . . receives input from the respective output-vector AR's comparator 404, . . . (set—indicative that the result in the corresponding RR is from an instruction later than that of the result in the respective AR) and comparator 405, . . . (set—indicative that the result order code is not zero) to clock-gate a new result into respective AR 200, . . . via respective V800T, . . . , V810T while outputting a clear via respective V800F, . . . , V810F to respective AR-written 4030, . . . to clear or keep clear the AR's written-bit as respective OR gate 808, . . . clock-gates 1-bit AR-written register 4030. (OR gate 808 clock-gates the written-bit when the AR is clock-gated and also when both the AR's last-bit is clear and the respective RR is not valid (order code is zero), setting and clearing the written-bit according to the not updating of the AR.) The AR-written 4030, . . . being clear outputs a set signal via the respective V4030, . . . , V4130 to respective AND gates 803, . . . and 804, . . . which output to a respective OR 806, . . . to set the respective 1-bit w-enable register 8016, . . . of the respective restore-order-buffer 8010, . . . if either the AR is clock-gated (AND gate 800, . . . providing a set output to AND 803, . . . ) or both the AR's last-bit is clear (V4010F, . . . , V4110F providing a set output to AND 804 . . . ) and that in the respective RR is not valid (respective order code=0 and V405F, . . . , V415F providing a set output to AND 804 . . . ). At the same time that AND gate 805, . . . operates select 204, . . . to select a result in either AR 200, . . . (AND 805, . . . is clear) or RR 400, . . . (AND 805, . . . is set) for input into 64-bit w-data register 8012, . . . of the respective restore-order buffer 8010, . . . , AND gate 805, . . . also operates select 408, . . . to select either the AR's order code in result order 403, . . . or the RR's order code in result order 402, . . . for input to w-address 8032, . . . of the same restore-order-buffer 8010, . . . , and AND gate 805, . . . also operates select 4025, . . . to select either the AR's element-bit in AR-element register 4020, . . . or the RR's element-bit in result-element register 4022, . . . for input to w-element register 8022, . . . of the same restore-order-buffer. When AR-last 4010, . . . is set it outputs a set bit-value via V4010T, . . . , V4110T into the last-bit (MidA) of respective select 9011, . . . to send vector-PUSH-instruction designating the respective AR or interrupt data to the processor's push unit through select 970. In addition, a clear AR-last 4010, . . . outputs a set bit-value via V4010F, . . . , V4110F to both AND gate 804, . . . and AND gate 807, . . . . Thus, if a result in an AR is from an instruction issued later than that of a result in the AR's RR, the arrival order being opposite the issue order, the arrival order is corrected using the issue order code.

As is explained in more detail with FIG. 7, the 1-bit result-element register 4022, . . . is set (else it clears) through respective select 4024, . . . by a V600Hi, . . . , V610Hi signal from the element-bit of the respective future timing chain 600, . . . being set, or a V600Lo, . . . , V610Lo signal from the last-bit being set and a V1000, . . . , V1010 update-signal to update any lone set last-bit into a set element-bit from the respective AND gate 1000, . . . . Further details concerning the update-logic are described in connection with FIG. 7. The 1-bit result last register 4012, . . . is set (else it clears) by a V600Lo, . . . , V610Lo signal from the last-bit of the respective future timing chain 600, . . . being set but is cleared while a V602, . . . , V612 signal from respective OR 602, . . . is set to indicate updating of the respective output-vector or issuance of a new last result to the respective AR. The 1-bit AR-element register 4020, . . . is set (else it clears) through select 4023, . . . by either the result-element 4022, . . . being set or conditionally either by the 1-bit result last register 4012, . . . being set or by the 1-bit AR-last register 4010, . . . being set. Thus, register 4020 is also set by the respective result last being set and a V1000, . . . , V1010 set signal to indicate the respective vector-update while the clock-gate is set. Register 4020 is also set without the clock-gate by a set condition of both the respective AR-last register 4010, . . . and the respective vector-update signal V1000, . . . , V1010. Once set, the AR-element register remains set until the clock-gate sets without one of the register setting conditions being present.

The 1-bit AR-last register 4010, . . . is either set or cleared through select 4013, . . . depending on both the connector V3853 from the processor's load/store unit for vector-POP-instructions and return from interrupt and on an instruction or interrupt timing signal shown in FIG. 7. Register 4010 is also set or cleared by the respective result last register 4012 being set or cleared when the respective clock-gate V800T, . . . , V810T is set but setting only if respective V602, . . . , V612 is not set. Register 4010 is always cleared when respective V602, . . . , V612 is set for updating the respective vector or for issuing a new last result to the respective AR. As shown in FIG. 7, the paired last-bit and element-bit of each result to an AR wherever respective chain, RR or the AR—are never both set, but all other state combinations may occur.

FIG. 5 illustrates the processor's future-buffer's apparatus for generating C-bit issue order codes for results for architectural registers (ARs) 200, . . . , 220, . . . , 240, . . . ; apparatus of blocks 501, . . . , 511 for ARs 200, . . . , blocks 521, . . . , 531 for ARs 220, . . . and blocks 541, . . . , 551 for ARs 240, . . . . Logic items within each block 501, . . . , 511, 521, . . . , 531, 541, . . . , 551 generate, hold, time and supply the issue order codes. One block with its separate sequence of codes is for each AR of FIG. 2. One set of logic items is within each block 501, . . . , 511, 521, . . . , 531, 541, . . . , 551. Block 501, . . . , 511, 521, . . . , 531, 541, . . . , 551 has the last-issue-order register 503, . . . , 523, . . . , 543, . . . that holds the latest (last) generated issue order code value of the current latest (last issued) result residing in or destined for the respective AR 200, . . . , 220, . . . , 240, . . . . The respective next needed code value within the last-issue-order register 503, . . . , 523, . . . , 543, . . . is generated when the current value is incremented by +1 by respective adder 502, . . . , 522, . . . , 542, . . . . The value in the register is for the current latest issued result either in or destined for the respective AR 200, . . . , 220, . . . , 240, . . . while the value from the adder is for the next such result whenever issued. Each issuance gated by AND 1063 of FIG. 10A of a scalar instruction also issues its result and thereby starts the gestation of a future result to become an arrived result at one of the respective ARs 200, . . . , 220, . . . , 240, . . . . Each issuance respective of result's AR clock-gates and thereby updates the respective latest issued code value within the respective last-issue-order register to the next value (previous value+1). The respective adder 502, . . . , 522, . . . , 542, . . . is an end-around-carry adder so it never produces zero (a code value reserved for no result destined for the AR). Additionally, the issue order register 523, . . . in block 521, . . . , 531 is updated for each respectively issued input-vector update respective of the input-vector AR 220, . . . to which the vector is assigned. The input-vector update is clock-gated by the respective AND 1020, . . . of FIG. 10A.

Chains 500, . . . , 520, . . . , 540, . . . each have the same number of register-ranks ordered from left to right, each rank being a C-bit register, each rank being freely clocked, each but the last (right most) supplying its value to the next rank to its right. C-bit values within the chain flow rank-to-rank left-to-right, the right most rank supplying the output of the chain. The number of ranks of each chain equals the number of cycles of the longest to execute a scalar function from input of operands into functional unit 374 to output of result from output 375 and is the number of cycles through unit 374 and output 375 but not through inputs 372,373. Each chain has P places to enter a C-bit value into the chain respectively supplied by P entry-place registers, one entry place for each different length of one or more different scalar functions performed by the functional units 364, . . . , 374. Thus, the respective chain 500, . . . , 520, . . . , 540, . . . for timing successively issued issue-order-codes of issued results destined for AR 200, . . . , 220, . . . , 240, . . . has the respective P entry-places (504(1), . . . , 505(P)), . . . , (524(1), . . . , 525(P)) . . . , 544(1), . . . , 545(P)) . . . where place-1 is for the codes of results from the shortest functional unit 364, place-P is for the codes of results from the longest functional unit 374; each functional unit of length between longest and shortest has its respective entry place. The entry-place 1, . . . , P of a chain enters the rank as far from the chain's last rank (in ranks) as the length (in cycles) of functional unit 364, . . . , 374 such that the chain's last rank holds the code of the result in the unit's freely clocked output register 365, . . . , 375.

From the issue of an instruction and its future result, the issue-order-code parallels the instruction, paralleling any waiting for operands to arrive into the respective two inputs (362,363), . . . , (372,373) of the instruction's functional unit 364, . . . , 374 by the code also waiting in its entry-place 1, . . . , P of its chain 500, . . . , 520, . . . , 540, . . . , paralleling the entry of the two operands into the functional unit to thereby begin execution by the code also entering its chain, paralleling the cycles through the functional unit by the code traveling its chain from the rank entered to the last (right most) rank, paralleling the still-future but fully calculated result being in its functional units respective output register 365, . . . , 375 by the code also being in its chain's last rank, paralleling the no-longer-future fully calculated available-to-be-an-operand result being in its respective AR's RR 400, . . . , 420, . . . , 440, . . . for one cycle by the code also being for one cycle in the respective result-order register 402, . . . , 422, . . . , 442, . . . via the respective connector V500, . . . , V510, V520, . . . , V530, V540, . . . , V550 outputting from its respective chain 500, . . . , 520, . . . , 540, . . . , and paralleling if the result/operand is in its respective AR 200, . . . , 220, . . . , 240, . . . for the next one or more cycles by the code then also being in the respective ar-order register 403, . . . , 423, . . . , 443, . . . for the same one or more cycles.

Additionally for results to output-vector ARs 200, . . . , the parallel continues whether the result is also an output-vector-element or not: the code parallels its result/element when sent either from its AR 200, . . . or respective RR 400, . . . through respective 64-bit select 204, . . . into respective 64-bit w-data register 8012, . . . of respective restore-order-buffer 8010, . . .

by the code also being sent either from the AR's respective AR-order register 403, . . . or result-order register 402, . . . through respective C-bit select 408, . . . into the respective w-address register 8032, . . . of the buffer.

The last code value into any of the entry-places 1, . . . , P of the chain 500, . . . , 520, . . . , 540, . . . enters into the respective last-issue-order register 503, . . . , 523, . . . , 543, . . . at the same time and remains until the next code value also does so. If the current code value in the last-issue-order register 503, . . . , 523, . . . , 543, . . . equals that in the respective result-order register 402, . . . , 422, . . . , 442, . . . then any issuing instruction designating the respective AR 200, . . . , 220, . . . , 240, . . . for an operand accesses the operand from the respective RR 400, . . . , 420, . . . , 440, . . . . On the other hand, if the code value equals that in the respective AR-order register 403, . . . , 423, . . . , 443, . . . then the operand is accessed from the AR. If neither equals the code in the last-issue-order register then the issuing instruction samples and keeps the last-issue-order register's to code as the desired value for its operand, sampling and keeping the value that was in the last-issue-order register at instruction-issue so as to keep comparing it with that in the result-order register until an equaling causes the result in the RR to become the no longer awaited operand.

Adder 522, . . . provides the current next-to-be-issued issue-order code value (as incremented from the current last-issued code value in respective last-issue-order register 523, . . . ) to respective connector V522, . . . , V532 to supply next-to-be-issued value to respective select 427, . . . for possible direct input into respective AR-order register 423, . . . as the now issued code value of the input-vector-element entering at the same time into the respective input-vector AR 220, . . . .

A code value of zero occurs within the chain 500, . . . , 520, . . . , 540, . . . to indicate an empty result-position or rank having no result destined for the chain's respective AR 200, . . . , 220, . . . , 240, . . . . A zero code value enters each chain's far left rank each clock-cycle a non-zero code value for a future-result of the longest functional unit 374 does not enter the rank from the respective entry-place register 505, . . . , 525, . . . , 545, . . . . Each zero code getting into the chain travels right its entire length until exiting into the respective RR 400, . . . , 420, . . . , 440, . . . , except that before exiting it is replaced as not selected into any chain-rank to instead receive a non-zero code from one of the chain's entry-place registers 1, . . . , P. A non-zero code otherwise ready to enter the chain does not enter but waits in its entry-place register, except when replacing a zero code traveling the chain. Each cycle of such waiting avoids two results arriving at the AR at the same time by causing the code's two paralleling operands to also wait and not enter the functional unit until the code enters the chain by replacing the next zero code at the code's entry-place. Each zero code reaching and entering into the RR does not enter the AR but instead is discarded as if earlier issued. Thus, feeding into each rank of a chain is the rank before, except feeding into each rank for entry of a non-zero code is a C-bit two-way select selecting between the prior C-bit rank and the respective C-bit entry-place register 1, . . . , P.

FIG. 6 illustrates the purpose-level items representing more detailed logic illustrated in FIG. 7 for handling the last-bits and element-bits for issued future results from the functional units, namely future results that are destined for only the W output-vector architectural registers (ARs) 200, . . . as possible elements of output-vectors. There are no such bits and no corresponding apparatus for future results destined for ARs 220, . . . , 240, . . . . Items of block 601, . . . , 611 catch, hold, time and timely supply the last-bit and the element-bit for each issued result destined for the respective AR 200, . . . from the future result being issued until it is no longer future as arrived at the AR as in the AR's respective KR 400, . . . .

Each pair of bits (last-bit and element-bit) of the result enters and flows down the respective chain 600, . . . by exactly paralleling the result's order code in respective chain 500, . . . . As an issue order code value for a result of one of P functional units 364(1), . . . , 374(P) destined for one of W ARs 200, . . . enters the respective one of W•P entry place registers (504(1), . . . , 505(P)), . . . for entry into the respective one of W chains 500, . . . , so also does the result's last-bit value (initially set) and element-bit value (initially clear) enter the respective one of W chains 600, . . . through the corresponding one of W•P entry place registers (604(1), . . . , 605(P)), . . . . Each time an instruction issues which designates the AR 200, . . . as the destination for a result, the corresponding AND 1009, . . . provides a set output. AND 1009, . . . is applied via V1009, . . . , V1019 both to one input of OR 602, . . . to thereby clear any former set last-bit anywhere it may be within chain 600, . . . or within the chain's entry-place registers 604(1), . . . , 605(P), . . . and to the Lo input of each of the chain's entry-places 1, . . . , P to thereby initially set the last-bit of the respective entry-place 1, . . . , P according to the instruction's functional unit 364(1), . . . , 374(P). The other input to OR 602, . . . to clear any set last bit within chain 600, . . . or within the chain's entry-place registers 604(1), . . . , 605(P), . . . is the update output-vector signal provided by respective AND 1000, . . . via respective V1000, . . . , V1010. AND 1000, . . . provides a set output to indicate and thereby cause an update of the vector assigned to the corresponding AR 200, . . . ; an update sets the element-bit paired with any being cleared last-bit.

Since any issued instruction can update any combination of input-vectors of ARs 220, . . . and output-vectors of ARs 200, . . . , any combination of from none to all of the update signals from AND 1000, . . . , 1020, . . . of FIG. 10 can be set at the same time. Thus, the issue of an instruction to also update some combination of vectors (in addition to its normal function) causes the corresponding ANDs 1000, . . . , 1020, . . . to output set vector-update signals (by reason of its vector-updating) and, if outputting to one of the output-vector ARs 200, . . . , causes (by reason of its normal output) a set last-bit and a clear element-bit to be in the one of P entry-places 1, . . . , P (respective of the functional unit of the normal output) for entering the one of W chains 600, . . . (respective of the normal output's designated output-vector AR). Thus, the set output of an OR 602, . . . clears any already set last-bit of its block 601, . . . , 611 for a result already issued, but does not prevent the one last-bit for a newly last-issued result to the chain's AR from being initially set at the same time.

As shown in FIG. 4, result-element register 4022, . . . selectively receives both bits of the pair of bits (Lo is last-bit and Hi is element-bit) from the last 2-bit rank of respective chain 600, . . . , and the result-last register 4012, . . . receives only the last-bit. Bach bit pair represents the state of any parallel result as being an output vector-element (set element-bit) or being a result only possibly being an element (set last-bit) or not being an element only possibly being a result (both bits clear). Both of a pair being set does not occur. Both being clear is selected into the left rank of a chain if the entry-place into that rank is not being selected. A set last-bit or a set element-bit occurs only for a valid result (a result whose issue order code is not zero), whereas both the last-bit and element-bit may be clear when the result is valid because only a zero order code indicates not-valid. This allows an initially set last-bit to be its own validity, allowing it alone to permit the element-bit to set.

AND-OR logic of FIG. 7 feeds each bit of each rank of a chain 600, . . . . FIG. 7 is a block diagram of typical logic for setting and clearing the last-bit and element-bit of each thereof two-bit rank of the timing chain 600, . . . and of each of the chain's entry-place registers 1, . . . , P. In addition, FIG. 7 illustrates the setting and clearing of the last-bit in respective AR-last 4010, . . . and element-bit in respective AR-element 4020, . . . of AR 200, . . . as well as in respective result-last 4012, . . . and in respective result-element 4022, . . . of the AR's respective RR 400, . . . . The logic within block 781 (which includes block 791) is typical of the chain for each entry-place register of only block 781 and its entry-rank register of block 791 for thereby entering the chain.

The first or left-most rank and entry-place register for the longest functional unit are illustrated as logic in block 781 with EP 780 (element-bit) and LP 788 (last-bit) being of the entry-place register, ET790 (element-bit) and LT790 (last-bit) being for the rank. Input V700 to AND 782 is held set if the issued instruction's first operand is in the first input 372 of the longest functional unit 374. Input V701 also to AND 782 is held set if the issued instruction's second operand is in the second input 373 of the longest functional unit 374. Input V702 is not used for the left-most rank and biased set. Input V710 to AND 784 is held set when the to-be-issued instruction uses the entry-place's functional unit. Inputs V720 and V730 are not used for the left-most rank and either each is biased clear or the bottom two inputs into OR 792 and the bottom input into OR 794 are removed to supply a clear element-bit and a clear last-bit to the rank when those of the entry-place are not entering the rank. EP, LP, ET and LT are each a freely clocked JK flip-flop to output data arriving before the clock pulse (otherwise, EP, LP, ET and LT are each a latch and clock arrangement to not allow data of a rank to reach the rank two ahead during the clock pulse).

Inputs V740, V741, V742 and V750 are common to all ranks of the chain and to those of the AR and RR. Input V740 is fed by V1000, . . . , V1010 of FIG. 10 (set one cycle for each output-vector update). Input V741 is fed by V1009, . . . , V1019 (set one cycle for each issue of normal result). Input V742 is fed by PopU0T1, . . . , PopU1T1 (set one cycle at time-one of a vector-POP-instruction). Input V750 is fed by V3851 (value at time-one of last-bit parameter popped by the load/store unit from data-stack in memory).

As for other ranks of the chain, any rank of the chain anywhere right of the left-most is the same as the left-most if it has an entry-place respective of length of functional unit, except that:
    input V700 is held set if the issued instruction's first operand is in the first input of the particular functional unit,
    input V701 is held set if the issued instruction's second operand is in the second input of the particular functional unit,
    input V702 is held set each cycle the issue-order-code for the rank before is zero, and
    input V710 is held set when the to-be-issued instruction uses the particular functional unit.

On the other hand, if the rank has no entry-place, then the two top ANDs to OR 792 and the top AND to OR 794 are removed, together with their dedicated logic and inputs (thus, inputs V700, V701, V702, V710 and the logic of block 781 not also of block 791 are removed). In any case (entry-rank or not) as for ranks after the left-most including that of RR 400, . . . , ET 790 and LT 798 of the prior rank output via connections V720 and V730 into the respective OR 792 and bottom ANDs of ORs 792 and 794.

For any rank of a chain including the first, once EP 780 sets, the top AND of OR 783 holds EP 780 set until AND 782 sets to begin execution of an instruction from this entry-place or until AND 784 sets to issue an instruction into this entry-place. The bottom AND of OR 783 sets EP 780 if LP 788 is already set and both AND 784 is not set (because no instruction is issuing into this entry-place) and AND 782 is not set (because no instruction is beginning execution from this entry-place). LP 788 sets via the singular top input of OR 785 if AND 784 sets for issuing an instruction into this entry-place. The bottom input of OR 785 holds LP 788 set (if already set) if both AND 782 is not set for no instruction beginning execution from this entry-place and OR 760 is not set for not updating the output-vector and not issuing an instruction to any entry-place of the chain and not time-one of vector-POP instruction. If not removed, the top input of OR 792 sets ET 790 if LP 788 is already set and AND 782 is set for instruction beginning execution from this entry-place and V740 is set as updating the output-vector. If not removed, second from top input into OR 792 sets ET 790 if EP 780 is already set and AND 782 is set for beginning execution of an instruction from this entry-place. If not removed, the third from top singular input into OR 792 sets ET 790 if V720 is set for the before-rank's ET 790 being already set. If not removed, the bottom input into OR 792 sets ET 790 if V730 is set for the before-rank's LT 798 being already set and V740 is set for updating the output-vector. If not removed, the top input into OR 794 sets LT 798 if LP 788 is already set and AND 782 is set for beginning execution of an instruction from this entry-place and OR 760 is not set for not updating the output-vector and not issuing an instruction to any entry-point of the chain and not time-one of a vector-POP instruction. Finally, if not removed, the bottom input into OR 794 sets LT 794 if V730 is set for the before-rank's LT 798 being already set and OR 760 is not set for not updating the output-vector and not issuing an instruction to any entry-point of the chain and not time-one of a vector-POP instruction.

The output of the last rank of the chain 600, . . . inputs into the rank for the respective result register (RR) 400, . . . . The rank of the RR is exactly as for a rank of the chain which has no entry-place with the last rank of the chain serving as its rank before. The rank for the respective architectural register 200, . . . is shown within block 771. Input V761 is fed by connection V800T, . . . , V810T for update of respective output-vector AR 200, . . . . Input V750 is fed by a signal on connection V3851 representing a value at time-one of a last-bit parameter popped by the load/store unit 384 from the current data-stack in memory. The top input into OR 773 sets ER 770 if V761 is not set for not updating respective AR, V740 is set for updating output-vector, and LR 778 is already set. Once ER 770 is set, the second top input into OR 773 holds it set if V761 is not set. The third top input into OR 773 sets ER 770 if V761 is set for updating respective AR, V740 is set for updating output-vector, and LT 798 as of the respective RR is already set. The bottom input into OR 773 sets ER 770 if V761 is set for updating respective AR and ER 790 as of the respective RR is already set. Once LR 778 is set, the top input into OR 775 holds it set if V761 is not set and OR 760 is not set. The second top input into OR 775 sets LR 778 if V761 is set, OR 760 is not set, and LT 798 is already set. Finally, the bottom input into OR 775 sets LR 778 if V742 sets for time-one of a vector-POP instruction and V750 is set for the last-bit parameter popped from the current data-stack in memory.

Outputs from the AR's rank are V778T, respective of V4010T, . . . , V4110T and V778F, respective of V4010F, . . . , V4110F. Select 752 outputs either the output of the respective result register's ET 790 or the output of the architectural register's ER 770. ET 790 is output when V751 is set, indicating that a respective output V805 is selecting the value in the RR as the operand selected as from the AR. Thus, FIG. 7 defines the inputs, outputs and logic of all ranks of any chain 600, . . . and the chain's respective RR 400, . . . and AR 200

Figure 8:
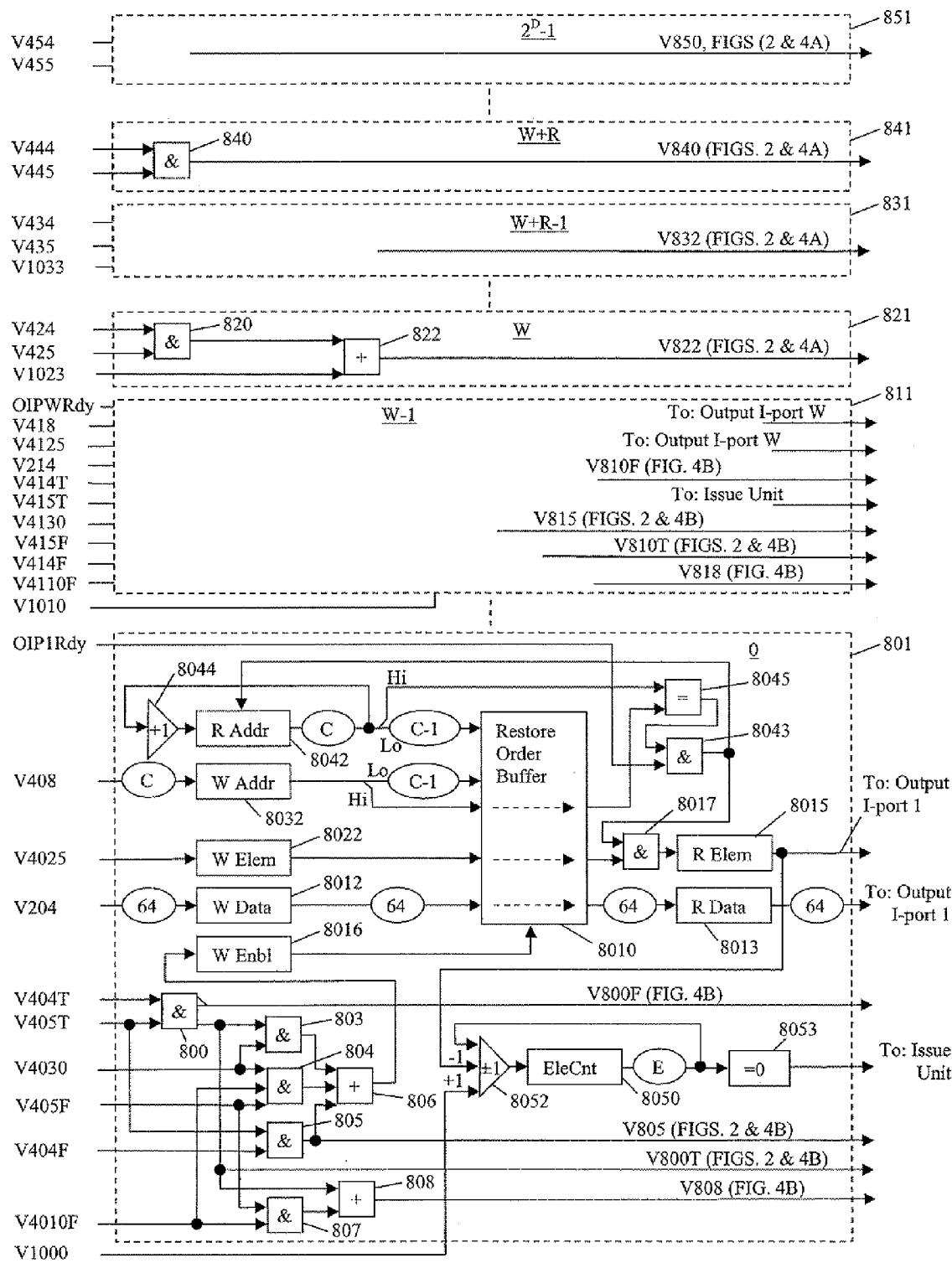
FIG. 8 is a block diagram of apparatus to restore order of output-vector-elements for writing to memory and to update ARs and order-codes.

FIG. 8 is a block diagram of control logic to update data (latest to arrive results—some already elements and others perhaps to become elements) residing within the registers of FIG. 2 (ARs 200, . . . , 220, . . . , 240, . . . ). Additionally, FIG. 8 illustrates logic to handle output-vector-elements already sent directly from the output-vector ARs 200, . . . (not via cache 102) toward output-I-ports 108 for memory 110 while not yet into the port. Blocks 841, . . . , 851 contain the control logic for ARs 240, . . . having no vector capability. AND gate 840, . . . for each respective register 240, . . . receives outputs from respective comparators 444, . . . and 445, . . . via respective connections V444, . . . , V454 and V445, . . . , V455 and applies its output, via respective connection V840, . . . , V850, to the clock-gating input of the corresponding register 240, . . . . Hence, gate 840, . . . produces a set output when the issue order code in result order register 442, . . . of the respective AR's RR, 440, . . . is not 0 (zero) and when the non-zero issue order code compares as later-issued than that in the AR's respective ar-order register 443, . . . . Thus, register 240, . . . is clocked as gated by respective AND 840, . . . to be updated and thereby receive and store the corresponding result from the result register 440, . . . within respective block 441, . . . , 451. In addition, AND 840, . . . clock-gates the corresponding AR-order register 443, . . . to update the issue order code of respective AR 240, . . . to keep the code parallel with its result thereby also updated into the AR.

Blocks 821, . . . , 831 contain the control logic for updating respective input-vector AR 220, . . . to receive the result from one of functional units 364, . . . , 374 arrived in the AR's RR 420, . . . . In addition the control logic of blocks 821, . . . , 831 alternatively receive input-vector-data (elements), via the respective one of R connections IIP1Data, . . . , IIPRData, from the respective one of R of X input-I-ports 108 (FIG. 1) to read an input-vector in memory assigned to the AR. AND gate 820, . . . receives, via respective connection V424, . . . , V434 and V425, . . . , V435, outputs from respective comparators 424, . . . and 425, . . . and provides its output to respective OR gate 822, . . . . Gate 822 also receives, via respective connection V1023, . . . , V1033, a vector update signal from respective AND 1023, . . . for causing the inputting into the corresponding AR 220, . . . from the AR's input-I-port of the next element of any input-vector in memory assigned to the AR. The output of gate 822, . . . clock-gates the corresponding AR 220, . . . and its result-order register 423, . . . both via the corresponding connection V822, . . . , V832.

Blocks 801, . . . , 811 contain control logic for updating corresponding architectural registers (ARs) 200, . . . , including control logic, data paths, various registers and one respective restore-order buffer 8010, . . . for sending data (elements) to memory, via the ARs' output-I-ports 108, as output-vector data of any output-vectors in memory assigned to the ARs. AND gate 800, . . . receives, via respective connections V404T, . . . , V414T and V405T, . . . , V415T, the outputs from the corresponding comparators 404, . . . and 405, . . . . Comparator 404, . . . identifies by being set when the issue order code value in the respective result-order register 402, . . . is later issued than code value in respective AR-order register 403, . . . . Comparator 405, . . . identifies by being set when the issue order code value in the respective result-order register 402, . . . is not zero signaling a valid result is currently in respective result register (RR) 400, . . . . The TRUE output of gate 800, . . . provides, via respective connection V800T, . . . , V810T, clock-gating to the respective AR 200, . . . , AR-last register 4010, . . . , AR-element register 4020, . . . and AR-order register 403, . . . to update the architectural register (AR). The TRUE output of gate 800 additionally provides an input to respective AND 803, . . . and to respective OR 808, . . . . OR 808, . . . is also inputted by respective AND 807, . . . which has a first input via respective connection V405F, . . . , V415F from the output of respective comparator 405, . . . indicating the order code of respective result-order register 402, . . . is zero, and a second input via the corresponding connection V4010F, . . . , V4110F from the output of respective AR-last register 4010, . . . indicating that the result currently in corresponding AR 200, . . . is no longer a last-issued non-element (it may still be last-issued but if it is then it is also a output-vector-element). OR 808, . . . outputs via respective connector V808, . . . , V818 into the clock-gate of respective AR-written register 4030, . . . enabling the clock each update of respective AR 200, . . . and each cycle that the result therein is not a last-issued non-element and there is no valid result in the AR's respective RR 400, . . . . As previously explained, the data input of 1-bit register AR-written 4030, . . . from the NOT-TRUE or FALSE output of respective AND gate 800, . . . , via respective connection V800F, . . . , V810F, is set only when the AR 200, . . . is not being updated. AND 803, . . . receives the output of the AND 800, . . . , and also, via the respective connection V4030, . . . , V4130, the output of the respective AR-written 4030, . . . indicating that the result-perhaps-element currently in respective AR 200, . . . is not yet sent from the AR to be written into the respective restore order buffer 8010, . . . . Thus, AND 803, . . . signals into the respective OR 806, . . . the last possible chance to write that not yet written to the restore order buffer currently from the AR 200, . . . but to be replaced in the AR next clock. AND 804 signals the first earlier opportunity to so write by signaling into OR 806, . . . according to its three inputs previously explained. AND 805 signals an input to OR 806 indicating the only opportunity to write a result-perhaps-element currently in the respective RR 400, . . . for just one clock-cycle but never to reside in the AR 200. AND 805, . . . has two inputs, the first via respective connection V405T, . . . , V415T previously explained and the second via respective connection V404F, . . . , V414F from the output of respective comparator 404, . . . which sets when result-perhaps-element in respective RR 400, . . . is not later-issued than the current other in respective AR 200, . . . . Each issue-order comparator 404, . . . , 424, . . . , 444, . . . is a logical compare that determines the issue order of two circulating issue order code values. Each comparator's TRUE output is set when its C-bit input from the AR-order register is of an earlier issued code value than the (later issued) code value into its other input from the result-order register. The three AND gates provide input to OR gate 806, . . . to provide a write enable bit to the respective restore order buffer 8010, . . . for the respective architectural register. Gate 806, . . . thus provides a write enable signal indicative of an opportunity to write data either from the architectural register or from the result register so as to write each result once without losing any.

The three inputs into OR gate 806, . . . are the signaling for writing of all results designated for respective AR 200, . . . into respective restore order buffer 8010, . . . , each result being perhaps an output-vector-element. For writing, the gate 806, . . . outputs into respective 1-bit write-enable register 8016, . . . which outputs into respective restore order buffer 8010, . . . . As already explained, AND gate 805, . . . outputs via respective connection V805, . . . , V815 for making selections into three 2-way selects:

AND 805, . . . being set selects that result-perhaps-element in respective result register (RR) 400, . . . through respective select 204, . . . into respective write-data register 8012, . . . for writing as data into respective restore order buffer 8010, . . . . AND 805, . . . being clear selects the result-perhaps-element in respective architectural register (AR) 200.

AND 805, . . . selects the issue-order-code of the result-perhaps-element selected by select 204, . . . . More particularly, AND 805 being set selects that in respective result-order register 402, . . . through respective select 408, . . . into respective write-address register 8032, . . . for addressing the writing of data into respective restore order buffer 8010, . . . . AND 805 being clear selects the order-code in respective ar-order register 403, . . . .

AND 805, . . . also selects the element-bit of the result-perhaps-element selected by select 204, . . . . More particularly, AND 805 being set selects that in respective result-element register 4022, . . . through respective select 4025, . . . into respective write-element register 8022, . . . as one bit of the data of each write into respective restore order buffer 8010, . . . . AND 805 being clear selects the element-bit in respective AR-element register 4020, . . . .

Restore order buffer 8010, . . . is large enough to accommodate the results of the largest number of encodings of a longest-to-execute instruction that can begin execution but the first result of which might not arrive at the respective architectural register 200, . . . before the result of a latest-issued shortest-to-execute instruction can arrive at the architectural register. Buffer 8010, . . . is also large enough to accommodate the largest number of results of quickest-to-execute instructions each later issued but all arriving at the respective AR 200, . . . before the arrival of the result of the earlier issued slowest-to-execute instruction to the AR. Assuming the shortest and longest functional units are pipelined, and each can begin execution of one instruction per clock-cycle, each requirement results in the same storage size for each restore order buffer.

The buffer 8010, . . . is large enough to hold up to $2^{(C-1)}$ results of as many consecutive code values 1 through $2^C-1$ where the next value after $2^C-1$ is 1 again and so on (as for an end-around-adder to reserve the zero code value for invalid results), where the range is greater than the difference in clock-cycles between the longest and shortest to execute instructions. This assures that comparators 404, . . . , 424, . . . , 444, . . . will properly compare code values within any half of the total range of code values.

Buffer 8010, . . . has separate read and write-addressing so one address can be read while writing another. Each result-perhaps-element from the architectural register 200, . . . or its respective result register 400, . . . is written into the respective buffer 8010, . . . at the address equal to the result's issue-order-code-value. Each result-perhaps-element in the buffer 8010, . . . is read sometime after being written possibly not in consecutive address order as for codes not arriving in such order, but reading in consecutive address order. A read result that is not an element is skipped for writing into memory but each that is an element is written as the next element of the output-vector in memory. In this manner, buffer 8010, . . . restores the consecutive vector-order of elements for sequential writing into memory. Buffer-data at an address that is read for a result that also reads a set element-bit at the same time at the same address causes the result to be written to memory as an element, whereas the element-bit being clear causes no write to memory with the result being discarded as no longer needed.

Buffer 8010, . . . is written and then read at the same address for writing and then reading a result, the same address which is the lowest C−1 bits of the result's issue-order-code. The lowest C−1 bits of respective C-bit read address register 8042, . . . address the buffer 8010, . . . . The lowest C−1 bits of respective C-bit write address register 8032, . . . also address the buffer 8010, . . . . The high-order bit of the read address register 8042, . . . is one input to respective equal-compare 8045, . . . . The high-order bit of the write address register 8032, . . . does not address the buffer but is another data-bit written into the respective buffer 8010, . . . at the accompanying (C−1)-bit address. Each dashed arrow within buffer 8010, . . . indicates a horizontal alignment between pairs of input- and output-connections of the buffer for a same address reading the same data (outputted to the right) that was last written (inputted from the left) at the same (C−1)-bit address.

The one high-bit from respective write address register 8032, . . . , the one element-bit from respective write element register 8022, . . . , and the 64-bit result from respective write data register 8012 together make up the 66 bits of data written at the low (C−1)-bit address from respective write address register 8032, . . . if the 1-bit enable from write enable register 8016 is set, all via respective connections into buffer 8010, . . . . The enable-bit causes the respective 66 bits of data to write into the respective buffer 8010, . . . at the buffer address equal to the low order C−1 bits of the respective write address 8032, . . . . A number of writes, each writing a different result to a different buffer 8010, . . . from a different output-vector AR 200, . . . for a different output-vector in memory, can occur each minimum period of time to issue as many instructions to produce as many results. The writes can be written up to as quickly as simultaneously during a single particular clock-cycle of the minimum period. Thus the present invention can take advantage of parallel issue of instructions. Moreover, since a number of writes, each writing a different result to the same buffer from the same AR for the same output-vector in memory, can occur each minimum period of time to issue as many instructions serially to produce as many results even if parallel issuing is possible. Reads of buffers 8010, . . . necessarily occur each respective same period of time in the same numbers as for writes; so reads and writes of both different buffers and the same buffer can occur simultaneously always at the same rate for the same buffer for the same period where period for reads occurs later than for respective writes. Data, written to buffer 8010, . . . at any one address by the address being in write address register 8032, . . . for one clock-cycle, can be read from the same address by the address being in read address register for one clock-cycle no sooner than one clock-cycle later and no later than during the cycle of the next write to the address. One clock-cycle is the minimum time to issue each of a number of serially issued instructions.

The low order C−1 bits of read address register 8042, . . . output into respective restore order buffer 8010, . . . to read the buffer-address thereof, whereas the one high-bit from the read address register outputs into respective comparator 8045, . . . along with the high-bit value of the write address register formerly written into the buffer at the address being read also outputting into the comparator. Comparator 8045, . . . provides one input to respective AND gate 8043, . . . whose other input is the OIP1Rdy, . . . , OIPWRdy (I-Port Ready) signal from the respective one of W of Y output-I-Ports 108. Thus, the comparator signals set each read of valid data from the respective buffer 8010, . . . , and the AND gate signals set if the output-I-Port is also ready to receive the valid data for writing into memory. Each read address value in read address register 8042, . . . is incremented consecutively by respective adder (+1) 8044, . . . each time the output of respective gate 8043 is set into the clock-gate of the read address register. Like adder 502, . . . , 522, . . . , 542, . . . , adder 8044, . . . has an end-around carry so as to never output an all zero-bits value. Thus, restore order buffer 1080, . . . requires no data-storage at address zero. AND 8043, . . . also outputs to one input of respective AND 8017, . . . to set (or clear) the respective 1-bit read element register 8015, . . . with the set or clear element-bit value formerly written into buffer 8010 from the write element register 8022 at the address being read if reading and writing are of the same respective pass through all the buffer's addresses where read follows write of same address. Finally, each setting of read element register 8015, . . . accompanies that (the element-bit's result or data value of the write data register formerly written into the buffer at the address now being read) from respective buffer 8010, . . . to enter the respective 64-bit read data register 8013, . . . .

At processor boot-time the same non-zero value (for example: "1") is forced into read address register 8042, . . . , write address register 8032, . . . , AR-order register 403, . . . , 423, . . . 443 . . . and last issue order register 503, . . . , 523, . . . , 543, . . . . Additionally, "0" is forced into entry place register 504(1), . . . , 505(P), . . . , 524(1), . . . , 525(P), . . . , 544(1), . . . , 554(P), . . . , each rank of future timing chain 500, . . . , 520, . . . , 540, . . . and result order register 402, . . . , 422, . . . , 442, . . . . Also, forced set are 1-bit AR-last 4010, . . . and high-bit at each address of each restore order buffer 8010, . . . . Forced clear are 1-bit result-element 4022, . . . , 1-bit result last 4012, . . . , 1-bit AR-written 4030, . . . , 1-bit AR-element 4020, . . . , 2-bit entry place 604(1), . . . , 605(P), . . . , each 2-bit rank of future timing chain 600, . . . , 1-bit write element 8022, . . . and 1-bit write enable 8016, . . . .

Thus, after boot-time, a last-issued result is in each architectural register (AR) 200, . . . , 220, . . . , 240, . . . . Each AR 200, . . . is neither yet an element nor yet written, but after becoming an element or no longer last, the AR 200, . . . is written with a clear high-bit into its respective restore order buffer 8010, . . . at address one to cause it to be read one cycle later and cause incrementing the read address to a two value with high-bit clear. The output from comparator 8045, . . . is a logical "1" only when, as written from respective C-bit write address register 8032, . . . , the high-bit from respective buffer 8010, . . . equals the high-bit from respective C-bit read address register 8042, . . . for the read and write addresses being on the same pass addressing all addressed addresses (all but zero). Thus, reads follow the changing high-bit in the buffer, stopping at any address not changed until changed.

Each pair of parallel values in read element register 8015, . . . and respective read data register 8013, . . . is a 64-bit output vector-element and its 1-bit element-bit used as valid-bit (set for element and valid) to cause when set the paired 64-bit value to be received via their connections by the respective output-I-port 1, . . . , W for storing into memory to update the output-vector. If the respective bit in read element 8015, . . . does not set for AND 8043 having been set to cause respective read address 8042, . . . to increment to the next buffer read address, then the paired non-element result is in the respective read data 8013, . . . is discarded.

The output of comparator 8045 is the respective buffer's read-data-valid, an indication that the read and write are on the same rotation values in respective read 8042, . . . and write 8032, . . . address registers. Thus, a buffer's read address stays on the same value until the same address is written for the same rotation where high order bits have the same value because both toggle each rotation leaving the last rotation's high-bit value as residue in the respective buffer.

Each buffer 8010, . . . can be initialized by writing all its addresses at processor boot time. This initial writing of all addresses initializes the residue high order bit of the buffer to the opposite value different from common value in respective read address 8042, . . . and write address 8032, . . . from which after boot time they start to read or write the buffer to search for valid data to either discard or send to the buffer's output I-port.

All result-elements of the AR 200, . . . or its RR 400, . . . are written into their respective restore-order-buffer 8010, . . . at the address that equals the AR's or RR's issue-order-code value. The results enter one at a time in serial order, but not necessarily issue-order. All successively issued results to the AR, both those updated to also be elements and those established as non-elements, are restored one at a time to issue-order when read one at a time in buffer-address order. Thereby, buffer 8010, . . . sends all elements into the data-input of the AR's output-I-port and discards all non-element results. Non-element-results are necessary in the buffer for reading consecutive addresses searching for elements and for writing consecutive addresses for toggling all addresses each rotation. Thus, elements of an output-vector are sent to I-banks to be post-written into memories 122, sending in the order read out of respective buffer 8010, . . . , but post-writing into each memory 122 as scheduled by the respective I-bank 110 according to my prior application. Successive elements are sent from consecutive buffer-read addresses in the order that their contents (elements and non-element-results) were issued.

When the initial element is written, the valid-bit is toggled from not valid to valid to indicate the first element of the vector has been written to respective buffer 8010, . . . . Before the writing, the vector's initial buffer-address is read and re-read as long as the valid-bit indicates not-written, but the first read to follow the write of the vector's initial element accesses the element as written and sends it to the output I-port 108.

A respective data-select 204, . . . selects into respective write data register 8012 any established element (set element-bit) or established non-element-result (clear last-bit, clear element-bit and non-zero issue order code) output either from respective result register 400, . . . or respective architectural register 200, . . . so as not to lose any, as previously explained.

Finally, the E-bit element count register 8050, . . . holds the count of the total number of output-vector-elements currently issued to the respective output-vector AR 200, . . . but not yet sent to the AR's respective output-I-port. Register 8050, . . . is freely clocked and inputted by respective adder (±1) 8052, . . . , which in turn is inputted by the current count in the E-bit register. The adder receives, via respective connection V1000, . . . , V1010, a 1-bit signal from respective AND 1000, . . . (FIG. 10) to increment when set the count by +1 in register 8050, . . . for the issue of an update instruction of the output-vector assigned to respective AR 200, . . . , and receives a 1-bit signal from respective read element 8015, . . . to decrement when set the count by −1 in register 8050 for an element entering the respective output-I-port on its way to memory 110. Register 8050 also outputs into respective comparator 8053, . . . which in turn outputs into the processor's issue unit (not shown) to indicate, when set, that no issued elements are still to be transferred to the output-I- port. The issue unit also receives a set ready signal from the I-port to allow the next output-vector assigned to respective AR 200, . . . to begin being updated, thus assuring that no I-bank of memory 110 can not receive an element without losing it because the bank still has not stored its last element of the I-port's prior output-vector. Except to issue the first update of an output vector of AR 200, . . . , a "ready" from the respective output-I-port and that from the respective comparator 8053, . . . are ignored.

Figure 9A:
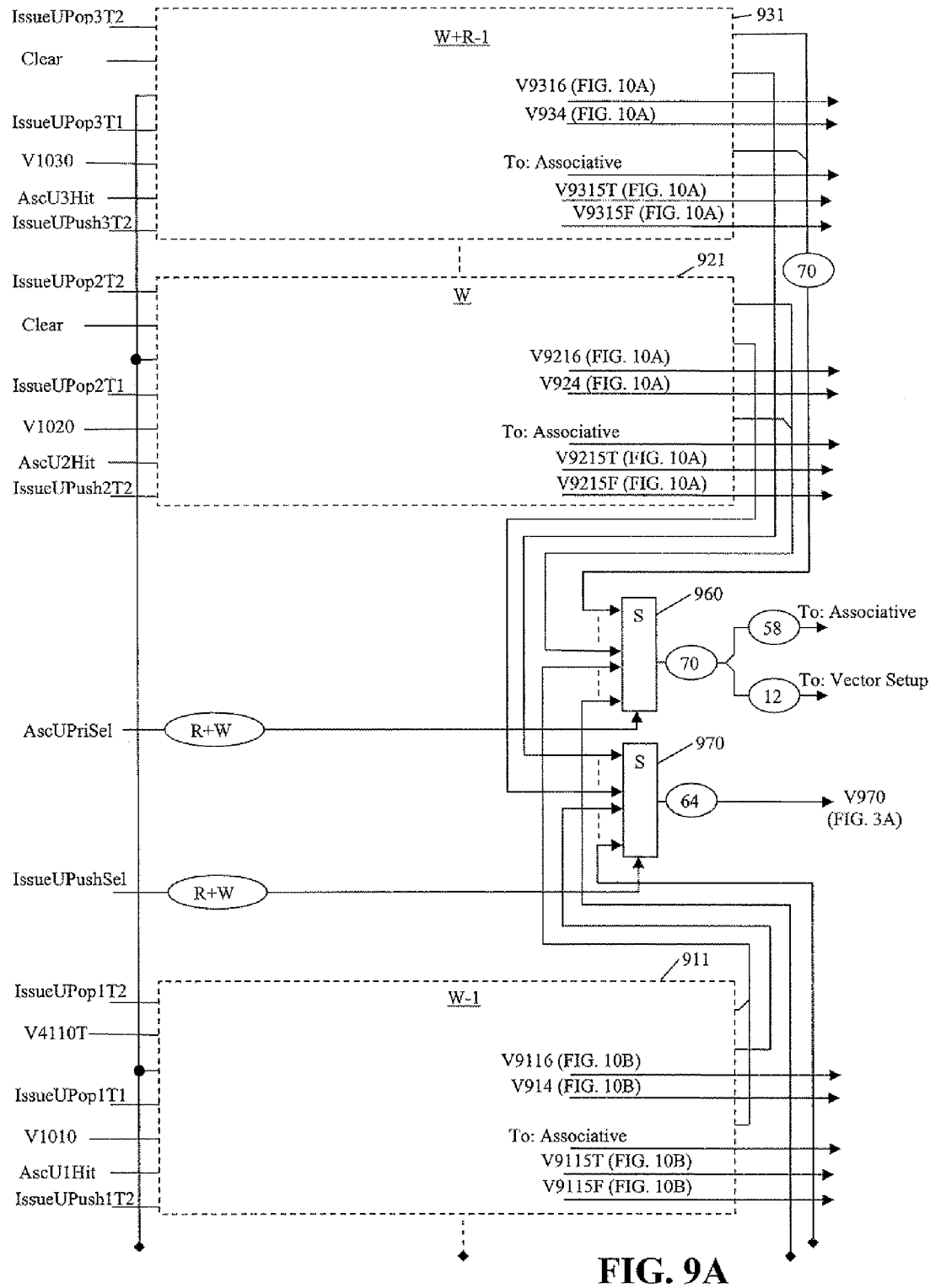
FIGS. 9A and 9B, is a block diagram of apparatus to receive vector parameters for ARs and use and update vector parameters for memory.
Figure 9B:
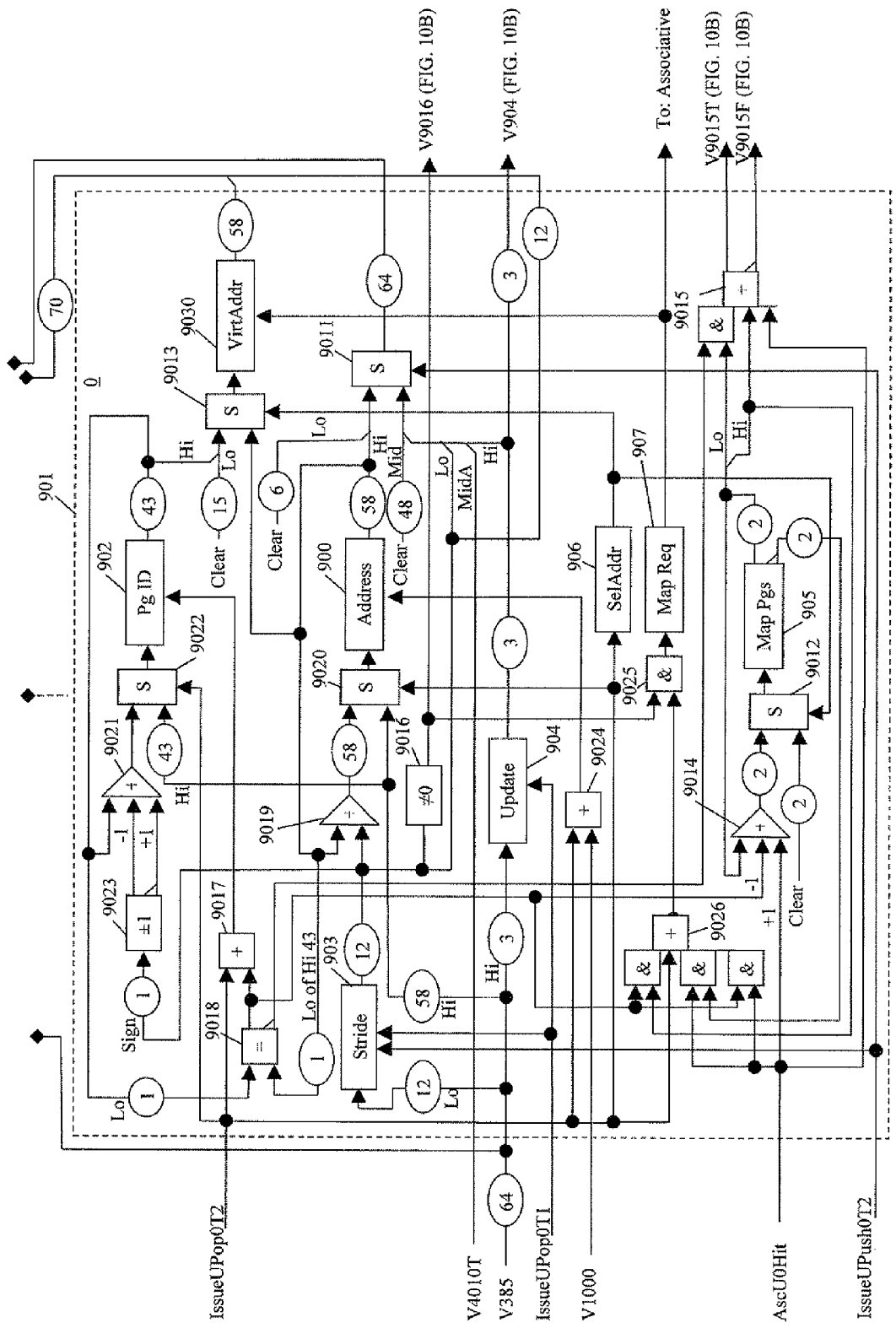

FIG. 9, consisting of edge matched FIGS. 9A and 9B, is a block diagram of control logic for the vector parameters of assigned vectors of architectural registers (ARs) 200, . . . and 220, . . . and for addressing memory for the vectors. The logic of block 901 (FIG. 9B) illustrates the vector-parameter control logic of 200, . . . , 220, . . . or any one of the architectural registers having vector capability. No control logic of FIG. 9 is required for architectural registers having no vector capability, ARs 240, . . . .

For purposes of the present description, the vector addressing and control logic of the general purpose processor 100 is described for the processor having Z virtual address bits, a virtual address which counts from 0 to $2^Z-1$ to numerically label and thereby address each of the $2^Z$ data-bits in a virtual memory data-space. Where $2^A \geq Z$, the virtual address of a bit in virtual memory occupies the low (least significant) Z bits of the $2^A$ data bits of an AR 200, . . . , 220, . . . , 240, . . . when the address is residing as data in the AR. Thus, when a $2^A$-bit aligned data-amount is residing in virtual memory, the data-amount to entirely occupy the AR when residing there has a (Z-A)-bit virtual address which when held in the AR, occupies the high (most significant) Z-A bits of the low Z bits of the AR's $2^A$ data bits. For processor 100, A=6 for having ARs 200, . . . 220, . . . , 240, . . . , operands, results and vector-elements each be 64 bits. Also, $Z=2^6$ for 64-bit virtual memory addresses each of which occupies an AR 200, . . . , 220, . . . , 240, . . . entirely. It is further assumed that the processor has a single page size for mapping same sized bit-address-aligned blocks (virtual pages) of virtual memory into bit-address-aligned blocks (physical pages) of physical memory. In the present case, each single page holds $2^{15}$ or 32K 64-bit memory-data-words and is virtually addressed by the upper (58-$\log_2$32K) or 43 bits of the 64-bit virtual address.

The memory address operand of a LOAD or STORE instruction resides in the 64-bit AR 200, . . . , 220, . . . , 240, . . . designated by the instruction. The current stack's current top-of-stack memory-address of a PUSH or POP instruction does not reside in an AR and is supplied without being designated from logic (not shown) within the load/store unit 384 as the top-of-stack address-operand. A LOAD or scalar-POP instruction uses its memory address to load or pop a 64-bit word from memory into the AR 200, . . . , 220, . . . , 240, . . . it designates, and a STORE or scalar-PUSH instruction uses its address to store or push into memory the 64-bit value from the AR 200, . . . , 220, . . . , 240, . . . it designates. The 64-bits of each AR is the amount of data popped from or pushed onto the top of a stack. Thus, the top-of-stack address addresses only such amounts where the next address (current address +1 or −1) addresses memory's next word (stack's next top word of a one word larger or smaller stack). A word being pushed onto the stack afterwards updates the current top-of-stack address by +1 for use by a following PUSH or POP instruction; whereas, a word being popped from the stack afterwards leaves the top address changed by −1. A vector-PUSH or vector-POP instruction respectively pushes onto the stack or pops from the stack two 64-bit data amounts from or into logic of FIG. 9, changing the top of stack address by respective +1 or −1 after each 64-bit amount pushed or popped.

The stack-data popped or pushed by a vector-POP or -PUSH instruction are the vector-parameters of a vector in memory thereby being respectively assigned or un-assigned as thereafter or there-before currently assigned to the AR 200, . . . , 220, . . . which the instruction designates. When popping a new assignment, the parameters formerly held in the logic of FIG. 9 for the vector thereby replaced as assigned and active are discarded. When pushing a former assignment, the logic of FIG. 9 thereafter holds the parameters of a null-vector (any with stride parameter=0) not accessing any vector in memory. The logic of FIG. 9 holds the parameters of the currently assigned vector (null or not) of AR 200, . . . , 220, . . . , either using and updating them as necessary to cause each next element in the AR to become that of the vector in memory or not if a null-vector. Thus, the logic of FIG. 9 supplies or receives the data respectively pushed onto or popped from the top of the stack by a vector-PUSH or -POP instruction, and the load/store unit 384 (which is also the push/pop unit whether scalar or vector) supplies the top-of-stack address for all POP or PUSH instructions whether scalar or vector.

For a vector-POP instruction's second or fixed part of execution for each of the instruction's two reads of the top-of-stack in memory by reading from cache 102, the issue unit of processor 100 is signaled once for each reading by two respective successive one-clock-cycle setting-pulses from cache on its connection 393. Timed by these, the issue unit produces two similar timing signals or pulses, each respective of the instruction's designated vector-capable AR, the first signal from the issue unit being on the respective one of R+W connections IssueUPop0T1, . . . , IssueUPop1T1, IssueUPop2T1, . . . , IssueUPop3T1 and by the second signal being on the respective one of connections IssueUPop 0T2, . . . , IssueUPop1T2, IssueUPop2T2, . . . , IssueUPop3T2. Also, for a vector-PUSH instruction's second or fixed part of execution for each of the instruction's two writes of the top-of-stack in memory by writing into cache 102, the issue unit is signaled once for each writing by two successive pulses on connection 393. Timed by the second of these pulses, the issue unit produces one similar timing signal or pulse for the instruction's designated vector-capable AR on the respective one of R+W connections IssueUPush 0T2, . . . , IssueUPush1T2, IssueUPush2T2, . . . , IssueUPush3T2. The vector-POP T1 and T2 connections and the vector-PUSH T2 connections are input to the logic of FIG. 9 to time selecting of selects and/or gating of clocks of registers; by such selecting and gating, vector-parameters are moved between cache 102 and registers of FIG. 9, and parameter-values moved into registers are made ready for serving the thus activated vector.

The logic within block 901 also represents that within block 921. The connection IssueUPop0T1, . . . , IssueUPop1T1, IssueUPop2T1, . . . , IssueUPop3T1 is input into the clock-gate of respective stride register 903, . . . and the clock-gate of respective update register 904, . . . to cause each register to catch and hold its respective parameter value, vector-stride and vector-update-selector, as not changing while the vector is active. Stride register 903, . . . receives the least-significant (low) 12 bits of the 64 bits from load/store unit's output 385 via connection V385. Update register 904, . . . receives the most-significant (high) 3 bits thereof. When the vector is deactivated sometime later, connection IssueUPush0T2, . . . , IssueUPush1T2, IssueUPush2T2, . . . , IssueUPush3T2 pulses the respective 64-bit 2-way select 9011, ... to select the bottom 64-bit input, thereby providing a 64-bit output comprising the stride value from respective register 903, ... at the 12 low bit-positions, the update value from respective register 904, ... at the 3 high bit-positions, the last-bit-parameter value via respective connection V4010T, ..., V4110T from the TRUE output of respective AR-last register 4010, ... at the midA bit-position and a logical clear value at the remaining 48 mid bit-positions (between the high 3 and low 12 bits, but not midA). The T2 pulse sends the second word of all the deactivating vector's parameters but address pushed onto the stack by the vector-PUSH instruction, sending it through select 9011, ..., else the address parameter for the first word pushed onto the stack is continually sent through select 9011, ..., as is explained later. Each of the R+W Selects 9011, ... outputs into 64-bit (R+W)-way select 970 which outputs via connection V970 to 2-way select 387 to input 383 of load/store unit 384. Respective of the designated AR of the vector-PUSH instruction, select 970 is operated by the setting of a single bit of the (R+W)-bit control signal from the issue unit on connection IssueUPush-Sel, with each bit exclusively setting to select the parameters of a vector of a respective AR 200, ..., 220, .... Additionally, connection IssueUPush0T2, ..., IssueUPush1T2, IssueUPush2T2, ..., IssueUPush3T2 pulses into respective stride register 903, ... to clock-clear the thereafter held value to zero, the value for a null-vector.

Connection IssueUPop0T2, ..., IssueUPop1T2, IssueUPop2T2, ..., IssueUPop3T2 inputs into six logic items.

The connection inputs into respective 43-bit 2-way select 9022, ... to select, when pulsed set, the bottom input from the high 43 bits from connection V385 through the select. The activating vector's first address's page-address is selected into respective page ID register 902, ... because the clock-gate into the register pulses set at the same time.

The connection inputs into respective OR gate 9017, ... which outputs into the clock-gate of respective page ID 902, ....

The connection inputs into respective OR 9024, ... which outputs into the clock-gate of respective address register 900, ....

The connection pulses into respective 58-bit 2-way select 9020, ... to select the bottom input having the high 58 bits from connection V385. Select 9020 outputs into respective address 900, .... When pulsed through, the bottom input supplies the address of the activating vector's first element to respective address register 900, ... because the register's clock-gate is pulsed at the same time.

The connection, when pulsed, sets freely clocked respective select-address register 906, ..., setting the register for one clock-cycle to select for one cycle that just into respective address 900, ... through respective select 9013, ... into respective virtual address register 9030, .... When select-address 906, ... sets, if the stride-value in respective stride register 903, ... is not zero, then respective map-request register 907, ... also sets to clock-gate that selected through the bottom input of respective select 9013, ... into respective virtual address 9030, .... For checking if the stride value is not zero, the 12 bits from stride 903 ... feed into as many 1-bit inputs into respective check 9016, ..., and the 1-bit output from check inputs respective AND gate 9025, .... Check 9016, ... also outputs on respective connection V9016, ..., V9116, V9216, ..., V9316 into respective AND gate 1002, ..., 1022, ... to enable updates to the respective vector to be issued as further explained in connection with FIG. 10.

Finally, the connection pulses into the OR input of respective AND-OR gate 9026, ... to cause the gate's output to pulse set into respective AND gate 9025, ... which outputs into freely clocked respective map-request register 907, ..., setting it for one cycle. The output of register 907, ... inputs into the clock-gate of respective virtual address register 9030, ... and is sent to associative 106. The sending to the associative eventually causes the value in respective virtual address 9030, ... to be mapped successfully or unsuccessfully for the associative sending or not sending the requested page-setup to the activating vector's respective one of R+W of X+Y I-ports 108 and all $2^B$ I-banks of memory 110 as explained in my prior patent application. Each of the R+W 58-bit virtual address registers 9030, ... outputs into its respective 58-bit input into 70-bit (R+W)-way select 960. Also, each of the R+W 12-bit stride registers 903, ... outputs into its respective 12-bit input into select 960. Thus, virtual address 9030, ... is paired with its respective stride 903, ... to form the 70 bits into their respective input to select 960. If element size is a parameter of regular vectors for an embodiment of this invention, then its value for an active vector is in a register much like stride 904, ... and is sent into its bits of its respective input into select 960. Select 960 outputs all bits to associative 106, the 58 for mapping to a physical address and the 12, plus any for element size, to setup 113 within associative where they wait to be sent to the I-port and all I-banks with a successfully mapped physical address. Associative 106 receives a request for a mapping and setup of a page for a vector from map-request 907, ..., and thereby is informed that all values necessary are at their respective input into select 960. When requested, associative may be busy doing other mappings and setups (including for cache 102 for LOAD, STORE, POP and PUSH instructions). Accordingly, associative determines when to do (attempt) the requested. The selection input into select 960 is from associative via (R+W)-bit connection AscUPriSel for selecting which mapping and setup is attempted next, only one being selected at any one time.

If associative 106 accomplishes the mapping, then as the setup is being sent to the I-port and all I-banks, associative sends a signal indicating success for the last request via connection AscU0Hit, ..., AscU1Hit, AscU2Hit, ..., AscU3Hit which inputs into three logic items, one being respective AND-OR gate 9026, ... where two of the gate's ANDs are fed and the second being the +1 input into respective adder 9014, .... These two are discussed next but the third, an input into respective AND-OR 9015, ..., is discussed farther on.

The −1 input into adder 9014, ... is from the TRUE output of respective comparator 9018, ... which is set for one cycle the clock-cycle after the last vector-update for an element of a page. Any combination of the +1 and the −1 inputs can be set or clear at one time with neither or both adding zero to that of the other input of the adder. The other input of adder 9014, ... is from the true output of respective 2-bit mapped-pages register 905, ... to hold the current number of pages mapped and setup which are still being accessed or next will be. The count in register 905, ... is either 0, 1 or 2 pages being or next to be accessed. The output of adder 9014, ... is into the top input of 2-bit 2-way respective select 9012, ..., and bias clear is into the bottom input. Select-address register 906, ... outputs into respective select 9012, .... When the register is pulsed set, the bottom input (bias clear) is selected through and into respective mapped-pages register 905, . . . . Thus, a vector just being activated starts with a zero value in its respective mapped-pages 905, . . . . However, as already explained, the vector starts also with a mapping and setup being requested. If the first requested mapping is successful, then the setup occurs and a one-cycle set-pulse from associative arrives on connection AscU0Hit, . . . , AscU1Hit, AscU2Hit, . . . , AscU3Hit to have the vector's first mapping counted by 1 becoming the value in respective mapped request register 905, . . . .

The FALSE outputs of both bits of mapped-requests register 905, . . . feed into one (the second from bottom in the drawings) of the two ANDed inputs into respective gate 9026, . . . into which respective connection AscU0Hit, . . . , AscU1Hit, AscU2Hit, . . . , AscU3Hit also feeds. Thus, associative signaling a successful mapping and the counting of each arrived and not yet exhausted (subtracted) such signaling being zero causes (through gates respective 9026, . . . and respective 9025, . . . ) map request 907, . . . to set to both gate the ID of next page into respective virtual address 9030, . . . and send the next request for a mapping to associative 106.

The other (bottom) ANDed input into respective gate 9026, . . . into which connection AscU0Hit, . . . , AscU1Hit, AscU2Hit, . . . , AscU3Hit feeds is additionally fed by the TRUE output from respective comparator 9018, . . . which also feeds into the −1 input into respective adder 9014, . . . . Thus, each time both the −1 and +1 inputs into the adder are pulsing set to keep the count within freely is clocked respective mapped-pages register 907, . . . the same, 1-bit map-request register 907, . . . is pulsed set through gates respective 9026, . . . and respective 9025, . . . for one cycle another time to sample the respective vector's next page's virtual ID into the high 43-bits of respective 58-bit address register 9030, . . . from the top input into respective 58-bit select 9013, . . . . This occurs because the bottom input into the select is not selected except just after the vector's initial 58-bit address parameter to address the vector's first element is first in respective address 900, . . . , as already explained.

The top input into 58-bit select 9013, . . . receives the high 43 bits from respective 43-bit page-ID register 902, . . . and the low 15 bits from a bias clear. The TRUE output from comparator 9018, . . . feeds into respective OR gate 9017 along with the respective connection IssueUPop0T2, . . . , IssueUPop1T2, IssueUPop2T2, . . . , IssueUPop3T2 as already explained. Therefore, the TRUE output from comparator 9018, . . . to −1 input into respective adder 9014, . . . , when pulsed set, pulses the clock-gate into respective page-ID register 902, . . . , doing so through respective OR gate 9017, . . . as does a vector-POP T2 pulse on the OR's other input as already explained.

The inputs into comparator 9018, . . . set its TRUE output when its two 1-bit inputs are equal, one input being the low bit from 43-bit respective page-ID register 902, . . . and the other input being the low bit of the high 43 bits from 58-bit respective address register 900, . . . . The embodiment shown is for the maximum possible absolute value of the stride parameter not being more than the size of the page currently being accessed by the vector. Successive values for address 900, . . . include at least one address value for each successive virtual page ID value. Thus, OR 9017, . . . is set each time the value in respective address register 900, . . . is of the value in respective page-ID register 902, . . . where the next ID value is a +1 increment of the former value. Except for its initial value as already explained, the value in page-ID register 902, . . . is through the top input into respective select 9022, . . . which is fed from respective adder 9021, . . . to add either +1 or −1 to each former value to have the next ID value in the register depending on the sign of the value in respective stride register 903, . . . . Stride 903, . . . outputs its sign bit into respective gate 9023, . . . having TRUE and FALSE outputs into respective adder 9021, . . . , the sign being positive causing the FALSE output to be set for the +1 input into the adder and conversely, the sign being negative causing the TRUE output to be set for the −1 input into the adder. The input of adder 9021, . . . other than the one inputting the +1 and −1, inputs the 43-bit output from respective page-ID register 902, . . . for incrementing or decrementing the value in the register.

Incrementing and decrementing is adequate for the shown embodiment because the maximum stride is less than the minimum page size. An embodiment having more than one page size would receive from associative the size found within table 112 and memory, for each pulse of respective connection AscU0Hit, . . . , AscU1Hit, AscU2Hit, . . . , AscU3Hit to indicate a successful mapping for the respective vector. Each incrementing or decrementing of the current value in page-ID register 902, . . . to the next value would be adjusted according to the page size for the current value. On the other hand, for an embodiment allowing stride value to be larger than currently access page size, comparator 9018, . . . would compare the number of the high bits of the current value in respective page-ID 902, . . . that are all the ID-bits according the value's page size with as many high bits of the value in respective address 900, . . . , and the top input into respective select 9022, . . . would be the high bits from respective adder 9019 with inputs and the output of adder being otherwise as shown. Each of gates 9023, . . . and each of adders 9021, . . . would have no use and thus, would not exist.

As shown, adder 9019, . . . outputs into the top input into respective 58-bit 2-way select 9020, . . . and is inputted by the output from respective address 900, . . . for one input and by the output from respective stride 903, . . . for the other input, low bits of one input aligning with low bits of the other input. Address 900, . . . outputs into the high 58 bits of the usually selected top input of respective 64-bit 2-way select 9011, . . . . As already explained, the usually selected value is taken by a vector-PUSH instruction to send the address value for the next to be updated element as the address parameter of the respective vector being pushed onto the stack. The low 6 bits into the top input of select 9011, . . . are from bias clear. Connection V1000, . . . , V1010, V1020, . . . , V1030 into the other input into respective OR 9024, . . . is pulsed set for each issuing of an update of the respective vector to cause a value in respective address 900, . . . to be the address of the next element to be updated, i.e., the next address equals the current address plus stride. For the final condition to cause a set pulse from AND-OR gate 9026, . . . to request a mapping of associative, the TRUE output from respective comparator 9018, . . . is one input into the top AND of the gate, and the high bit from respective mapped-pages 905, . . . is the other input. Thus, gate 9026, . . . pulses set as the −1 input into respective adder 9014, . . . pulses set for being done updating elements of a particular page when the current count in respective mapped-pages 905, . . . is two. Thereby, through respective AND 9025, . . . , the set pulse from gate 9026, . . . causes respective map-request 907, . . . to pulse set to associative 106.

The 3 bits from update register 904, . . . are sent into respective connection V904, . . . , V914, V924, . . . , V934 for selecting an issuing instruction to cause (to also issue in parallel) an update of the respective vector. AND-OR gate 9015, . . . has a TRUE output to respective connection V9015T, . . . , V9115T, V9215T, . . . , V9315T and a FALSE output to respective connection V9015F, . . . , V9115F, V9215F, . . . , V9315F, both for purposes explained in connection with FIG. 10. The ANDed input (top) of gate 9015, . . . receives the FALSE output from respective comparator 9018, . . . and the low bit from respective mapped-pages register 905, . . . . Gate 9015, . . . has two additionally ORed inputs from the high bit of respective mapped-pages 905, . . . and from respective connection AscU0Hit, . . . , AscU1Hit, AscU2Hit, . . . , AscU3Hit. The gate's TRUE output is set if the next possible update to the respective vector for the element at the current virtual address in address register 900, . . . is to a page that has been mapped to physical memory, else it is clear and the FALSE output is set.

Figure 10A:
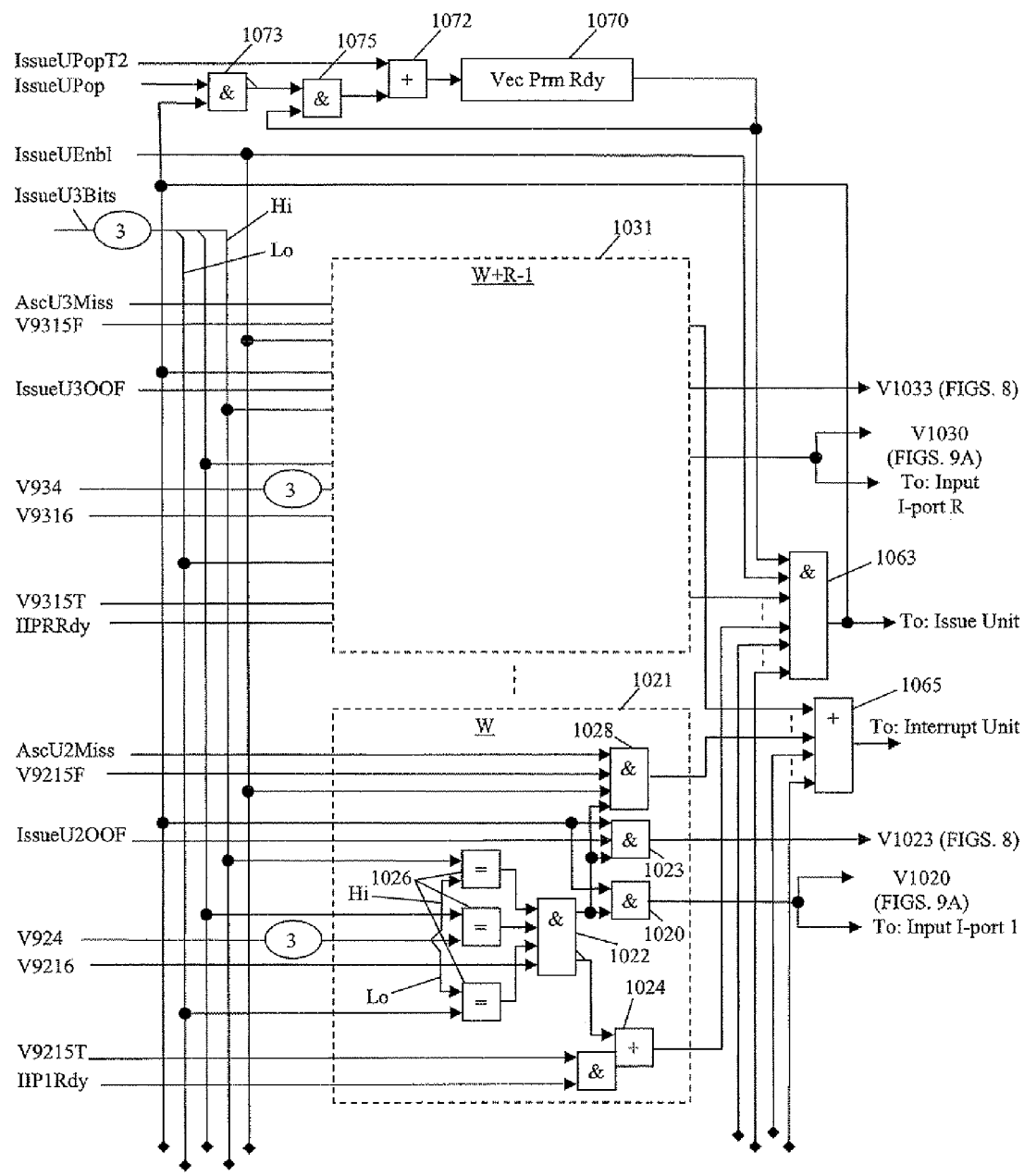
FIGS. 10A and 10B, is a block diagram of apparatus to update vectors for next respective elements in the ARs of FIG. 2.
Figure 10B:
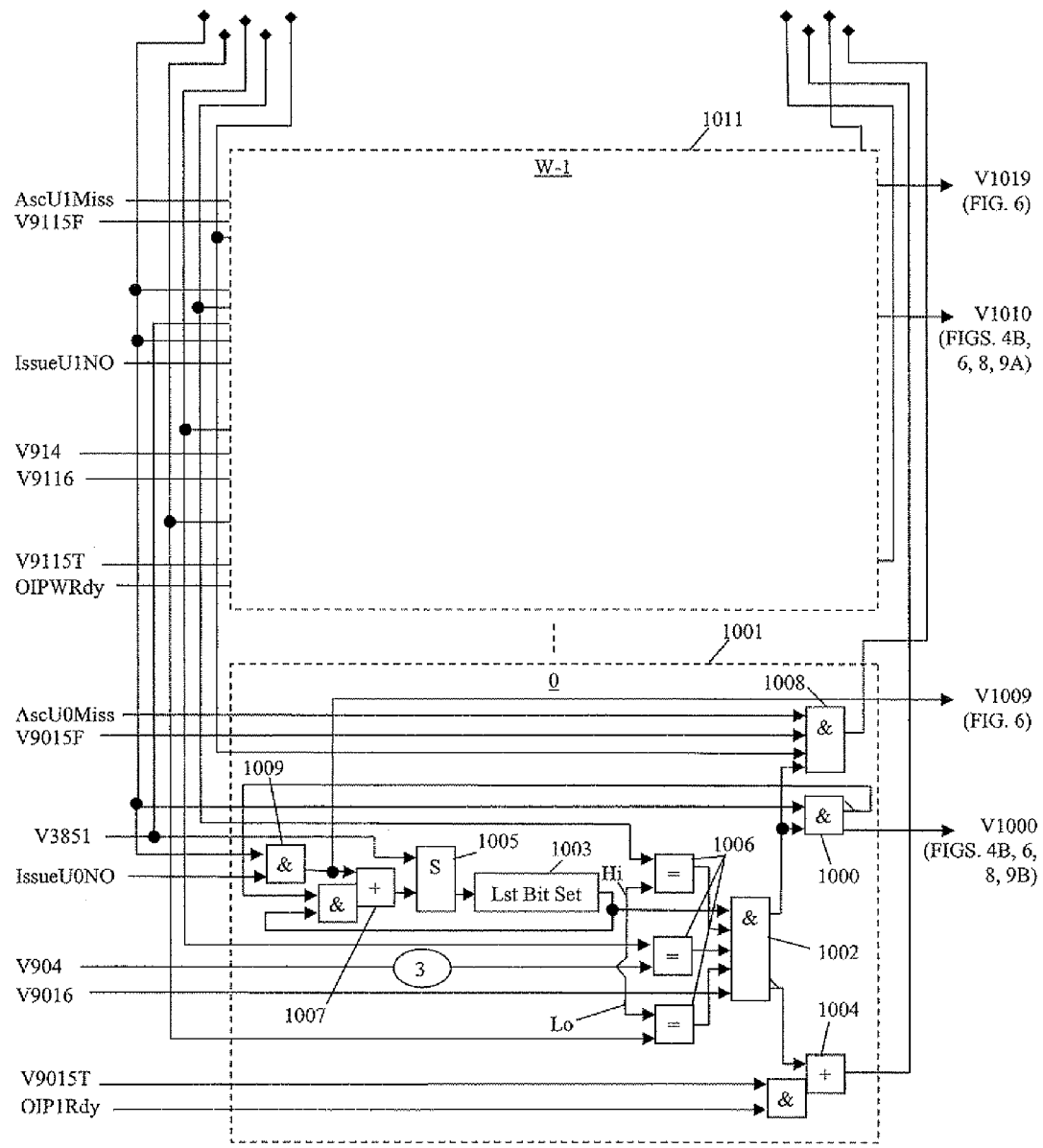

FIG. 10, consisting of edge matched FIGS. 10A and 10B, is a block diagram of the registers and other logic to control updating and interrupting the current vectors of architectural registers (ARs) 200, . . . and 220, . . . . The logic in block 1001 is for one update-issue/interrupt-control for either issuing updates to the currently active output-vector of AR 200 or interrupting the processor 100 because the next update of the vector can not be issued for lack of a page in memory for the next to be updated element of the vector. Identical logic is for each update-issue/interrupt-control 0, . . . , W−1 (blocks 1001, . . . , 1011) and an only partly different version of the logic is for each of update-issue/interrupt-control W, . . . , W+R−1 (blocks 1921, . . . , 1031), all for issuing updates to the vectors of ARs 200, . . . for having output vectors and 220, . . . for having input vectors. The logic of FIG. 10 is not used in connection with ARs 240, . . . having no preferred regular vector capability.

AND gate 1063 receives a set input from each of OR gates 1004, . . . , 1024, . . . and a set input from each of connection IssueUEnbl and vector-parameters-ready register 1070 to provide a set output. A set output from AND gate 1063 causes the issue unit to issue the next instruction that is otherwise ready to be issued because any zero or more vector updates to as many vectors to also be issued with the issue of the next instruction are allowing the issue. Gate 1063 must set to issue each instruction issued. If gate 1063 can not set because one or more to be also issued vector updates are not allowing any to issue for lack of a mapped page for each vector's element in memory that would be updated, then OR gate 1065 sets. The output from OR 1065 is connected to the interrupt unit of processor 100 to cause processor 100 to interrupt the current process being executed at the instruction (and any accompanying vector updates) next to be issued. If neither gate 1063 nor 1065 can set, it is because the signal on connection IssueUEnlb to enable both is not set, and perhaps an interrupt signal is needed from another source (i.e., an interrupt signal from the associative unit for a LOAD, STORE, POP or PUSH instruction needing a page not able to be mapped). Connection IssueUEnbl is from the issue unit of processor 100 and is set if the issue unit has the next instruction to issue, if the instruction's functional unit is ready to receive the operands of the instruction, and if the operands are assured of arriving into the functional unit's input registers before the next interrupt (i.e., the connection being set signals that conditions exist to permit the issue of the next instruction short of any additional conditions to also exist, that all accompanying vector updates have met their conditions to issue). As well as being into gate 1063 to enable an instruction to issue, connection IssueUEnbl is an enable into each of AND gates 1008, . . . , 1028, . . . . Each of the R+W outputs from gates 1008, . . . , 1028, . . . into (R+W)-way OR 1065 causes an interrupt when set. The setting of each of AND gates 1008, . . . , 1028, . . . is further explained farther on. VecPrmRdy register 1070 is set and remains set into AND gate 1063 to cause issue of the next instruction to indicate that there is no already issued vector-POP instruction not having its vector parameters popped from the stack in memory and received into their registers (i.e., the update selector parameter for selecting which next to be issued instructions cause the respective vector to be updated when issued) for the thereby activated vector.

OR gate 1072 outputs into freely clocked 1-bit register 1070 and when set, sets the register. Also, register 1070 is set at system boot time and with each return from interrupt. Connection IssueUPop from the issue unit is one of two inputs into AND gate 1073; the connection sets when a vector-POP instruction is next to be issued. AND 1063 outputs to the issue unit to allow the next instruction to issue, and it also outputs into AND gate 1073 as that gate's other input. Additionally, AND 1063 outputs into each of AND gates 1000, . . . , 1020, . . . , into each of AND gates 1009, . . . , and into each of AND gates 1023, . . . , indicating to each, when set, that some instruction becomes issued the next clockcycle. Thus, AND 1073 sets to indicate that the next-issuing some instruction is a vector-POP, and its FALSE output into AND 1075 conversely clears. This clears the output of AND 1075 which, when set, holds vector-parameters-ready register 1070 set because AND 1075 outputs into OR 1072 which outputs into register 1070. AND gate 1075 being set holds the register set because the output from register 1070 inputs into the one other input of the gate. Therefore, when AND 1073 sets for the next-issued instruction being a vector-POP, vector-parameters-ready register 1070 clears and remains clear until the one other input into OR 1072 sets (except a system boot or return-from-interrupt occurs first). The other input into OR 1072 is from connection IssueUPopT2 which is from the issue unit and sets at time T2 of any executing vector-POP instruction. T2 is just after the second access of cache 102 to supply the last of the popped vector's parameters into their registers for the thereby activated vector. The resetting of register 1070 indicates that the vector-POP instruction is not only fully issued but all its parameters (its results) are in place for the next-issued instruction possibly updating the vector.

No instruction can issue following the issue of any vector POP instruction until the parameters of the vector popped off the stack are retained for the vector-capable architectural register 200, . . . , 220, . . . designated by the instruction, namely the respective ones of the address 900, . . . (including page-ID 902, . . . ), stride 903, . . . and update 904, . . . , and additionally if designating output-vector AR 200, . . . , then AR-last 4010, . . . and last-bit-set register 1003, . . . .

If the associative unit's table 112 (including table extending into memory) does not contain an entry matching a vector's address with a physical page, the unit provides a set and remain set signal on the respective (to AR to which vector is assigned) connection AscU0Miss, . . . , AscU1Miss, AscU2Miss, . . . , AscU3Miss into the top input of respective AND gate 1008, . . . , 1028, . . . . The signal from associative 106 remains set until either another vector is assigned to the AR or there is an interrupt. In any case whether another vector is assigned or not, the signals AscU0Miss, . . . , AscU1Miss, AscU2Miss, . . . , AscU3Miss are clear after boot time and after a return-from-interrupt. The FALSE output from respective gate 9015, . . . of blocks 901, . . . , 911, 921, . . . , 931 provides the second input into gate 1008, . . . , 1028, . . . indicative, when set, that there is currently no mapped page for setting-up a physical address in all the $2^B$ I-banks of memory 110 and the respective I-port 108 for the next-to-be-updated element of the vector respective of any set second input. The third input to gate 1008, . . . , 1028, . . . is already given as IssueUEnbl, and the fourth input to the gate is from the TRUE output of respective AND gate 1002, . . . , 1022, . . . which also is into respective AND gate 1000, . . . , 1020, . . . . When set, the output from AND gate 1008, . . . , 1028, . . . indicates that the vector for the respective AR 200, . . . , 220, . . . must cause an interrupt before issuing of the next to be issued instruction.

When set, the TRUE output from AND 1002, . . . , 1022, . . . indicates that the vector assigned to the respective AR 200, . . . , 220, . . . is to be updated simultaneously with the issue of the next instruction, if it is issued. If the instruction is not issued for any reason, then the vector is not updated. When set, AND 1008, . . . , 1028, . . . indicates that, as just concerns the instruction (not as concerns vector updates), the instruction is ready to be issued (third input being set), that the vector of the respective AR 200, . . . , 220, . . . is to be updated with the issue of the instruction if it is issued (fourth input being set), that all previously mapped pages for the vector are exhausted (none for the next updated element; second input being set), and that associative tried and could not map the needed page (first input being set). Thus, when one or more of AND gates 1008, . . . , 1028, . . . is set, an interrupt is necessary and neither the instruction nor the one or more updates should issue, so that they are the first to attempt to issue upon returning from interrupt. The output of OR gate 1065 causes the interrupt unit of processor 100 to interrupt the process with the next instruction to be issued but did not to be the first to attempt to issue upon returning to the process, the one or more vectors each of whose AR's respective AND gate 1008, . . . , 1028, . . . was set needing to have a page mapped into physical memory from mass storage. Thus, the vector-condition for not issuing a vector update instruction causes an interrupt and keeps the otherwise updating instruction from issuing before the interrupt and a return-from-interrupt to meet the condition.

The outputs of AND gate 1063 (issue instruction) and of respective AND gate 1002, . . . , 1022, . . . (update vector) being inputted into AND gate 1000, . . . , 1020 as already mentioned, the TRUE output from AND 1000, . . . , 1020, . . . is set on connection V1000, . . . , V1010, V1020, . . . , V1030 to cause the vector respective of AR 200, . . . , 220, . . . to be updated as the instruction issues. To update the output-vector of the AR 200, . . . , the TRUE output of respective gate 1000, . . . is applied via respective connection V1000, . . . , V1010 to registers and other accompanying logic of respective block 401, . . . , 411 and 601, . . . , 611 and FIG. 7 to clear the set last bit of whichever future or arrived result to the AR has it (the only set last bit at any one time) and thereby setting that result's element bit per update of the vector. Also, the TRUE output of gate 1000, . . . is applied via respective connection V1000, . . . , V1010 to respective block 801, . . . , 811 to add +1 to the count of issued elements of the output-vector not yet sent to the AR's output I-port, the count being in respective register 8050, . . . . Finally for output vectors, the TRUE output of gate 1000, . . . is applied via the connection to respective block 901, . . . , 911 to add the vector's stride value to the virtual address to update it to equal the address of vector's next possible element of the next possible update of the vector, the address being in respective register 900, . . . of blocks 901, . . . , 911.

To update the input-vector of the AR 220 . . . , the output of gate 1020, . . . is applied via respective connection V1020, . . . , V1030 to respective block 921, . . . , 931 to add the vector's stride value to the virtual address to update it to equal the address of vector's next possible element of the next possible update of the vector, the address being in respective register 900, . . . of blocks 921, . . . , 931. Finally for input vectors, the output from AND gate 1020, . . . is sent to the respective input I-port of the AR 220, . . . to cause the I-port to output and hold the vector's next to be updated element on respective 64-bit connection IIP1Data, . . . , IIPRData from the I-port into respective block 221, . . . , 231 for having the vector's next element ready to enter the AR when and if the vector is next updated.

Each updated element enters the AR with each update of the vector, except when the normal result of the updating instruction is to the AR (the updated input-vector's AR), in which case the element is discarded as the instruction issues to update the vector and the normal output gets the value of the issue-order-code for results to the AR that the discarded element would otherwise have gotten. For this exception, AND gate 1023, . . . , like AND 1020, has inputs from each of AND gates 1063 and the respective 1022, . . . . Gate 1023, . . . is also inputted from the issue unit via respective connection IssueU2OOF, . . . , IssueU3OOF which is clear when the exception will occur with the issue of the next issued instruction. The set output from AND gate 1023, . . . clock-gates respective AR 220, . . . , via respective connection V1023, . . . , V1033, to receive the next element of the updated respective input-vector. If the exception is occurring, the output from gate 1023, . . . does not set for the update although the vector is updated to the next element by the output from respective gate 1020, . . . signaling the respective input I-port to proceed to outputting the next element from its respective buffer 120. A connection (not shown) of connection V1023, . . . , V1033 to respective select 222, . . . and select 427, . . . is such that when AND gate 1023, . . . is set, the respective IIP1Data, . . . , IIPRData input is selected through respective 2-way select 222, . . . and the respective V522, . . . , V532 input is selected through respective 2-way select 427, . . . .

Gate 1002, . . . , 1022, . . . receives the output of each of the three (top, center and bottom) comparators of respective compare-sets 1006, . . . , 1026, . . . . Each comparator sets if its two 1-bit inputs are equal (both set or both clear). If each of the three comparators of a set 1006, . . . , 1026, . . . is set, then the next to be issued instruction is an update instruction of the vector of the respective AR 200, . . . , 220, . . . . Each comparator of a set 1006, . . . , 1026, . . . outputs into the respective AND gate 1002, . . . , 1022, . . . , allowing the gate to set only if the next issued instruction updates the vector of respective AR 200, . . . , 220, . . . . The top comparator of set 1006, . . . , 1026, . . . is inputted by the high bit of a particular 3 bits of the encoding of next issued instruction (possibly an instruction which, when issued, updates one or more vectors) from 3-bit connection IssueU3Bits and by the high bit of the 3-bit update-selector parameter from respective connection V904, . . . , V914, V924, . . . , V934. The center comparator of set 1006, . . . , 1026, . . . is inputted by the middle bit of the 3 bits from connection IssueU3Bits and by the middle bit of the 3 bits from respective connection V904, . . . , V914, V924, . . . , V934. The bottom comparator of set 1006, . . . , 1026, . . . is inputted by the low bit of the 3 bits from connection IssueU3Bits and by the low bit of the 3 bits from respective connection V904, . . . , V914, V924, . . . , V934. The 3 bits of connection V904, . . . , V914, V924, . . . , V934 are from the 3 of respective update register 904, . . . of blocks 901, . . . , 911, 921, . . . , 931 to hold the update selector parameter of the vector currently assigned to respective AR 200, . . . , 220, . . . . Connection IssueU3Bits supplies 3 bits of the next issued instruction, namely a particular bit of each of three register-designator-fields of the next instruction to be issued for the typical instruction to access two input registers and one output register. For example, each particular bit may be the lowest bit of its field, since the lowest bit distinguishes even and odd ARs which is useful because evens and odds are distributed most evenly among each of the three ranges of all ARs, ARs 200, ..., ARs 220, ... and ARs 240, .... Preferably, all 3 bits are of the same bit order within their designators. Also preferably, each is the $2^0$ bit of its designator. Via respective connection V9016, ..., V9116, V9216, ..., V9316, gate 1002, ..., 1022, ... also receives an input from respective comparator 9016, ... indicating that the stride value in respective register 903, ... is not zero and thus, the vector currently assigned to respective AR 200, ... 220, ... is active (not a null-vector).

Each architectural register's active vector's 3-bit update-selector-parameter value in the register's respective update register 904, ... specifies the vector's typical update instruction(s) as any designating three registers of some combination of either evenness or oddness for each.

Only in the case of output-vectors of registers 200, ..., a LstBitSet register 1003, ... provides an input into respective gate 1002, ... (in the case of register 220, ... there is no LstBitSet register nor its input into a gate 1022, ... ). For its input logic, the LstBitSet register 1003, ... also supplies an input to the bottom or only AND of respective AND-OR gate 1007, ... which provides its output into the bottom input of 1-bit 2-way respective select 1005, .... A set select 1005, ... sets the freely cloked respective LstBitSet register 1003, .... The top input of select 1005, ... is from 1-bit connection V3851, to deliver the last-bit vector-parameter value from load/store unit's output register 385. The only time the top input of select 1005, ... is selected is T2 time of a vector-POP instruction designating the respective AR 200, ... (as if the selection input of select 1005, ... is via respective connection IssueUPop0T2, ..., IssueUPop1T2 from the issue unit; being set selects the top input). The FALSE output of gate 1000, ... provides the second input to the ANDed input into respective gate 1007, .... A set last-bit-set register 1003, ... holds itself set until respective AND gate 1000, ... sets to cause its FALSE output to clear and clear the register. Thus, a register clears when its respective AR's output-vector is updated.

Last-bit-set register 1003, ... being set indicates there is a set last-bit somewhere for a future or arrived result for the respective AR 200, ..., whereas a clear last-bit means there is not one set anywhere, future or arrived. A set Lst-bit-set register 1003, ... is cleared when the last issued result to the respective AR 200, ... becomes an element of the output-vector assigned to the AR; a clear register 1003 is set when the next result is issued to its AR whereupon that result carries a set last-bit only until and if it becomes (is updated to) an element. Simultaneous clearing (a previously issued result becoming an element) and setting (with the issue of another result) of a set register 1003 leaves it set for there continuing to be a set last bit. Thus, the register is not a last-bit but continually reflects, parallel in time, if one exists wherever it might be, with an arrived or still future result. This is an important input into AND gate 1002, ... because an instruction otherwise updating the respective vector does not do so if there is no result having a set last-bit to become an element. AND gate 1009, ... outputs unANDed into respective AND-OR gate 1007, ..., setting to set the respective register 1003, ... as an instruction is issued with a result for the respective AR 200, .... Each such issuing produces the new result for the AR with its last-bit set; any former result either having lost its set last-bit to become an element or losing it as the new one sets. AND gate 1009, ... is inputted by a set signal on respective connection IssueU0NO, ..., IssueU1NO from the issue unit indicating that the respective AR register 200, ... is designated by the next to be issued instruction to receive the instruction's result. AND 1009, ... also receives the output from AND gate 1063, which is set to issue an instruction. AND 1009, ... also outputs via respective connection V1009, ..., V1019 into respective OR gate 602, ... and FIG. 7 to cause each newly issued result to respective AR 200, ... to have a set last-bit as the newly issued instruction's operands reserve the two input registers respective 362, ..., 372 and respective 363, ..., 373 of the functional unit 364, ..., 374 to execute the instruction. All the inputs into AND gate 1022, ... are already explained because the AND gate has no additional input beyond the four explained when also explaining four inputs into each of AND gates 1002, ..., the four not from one of Lst-bit-Set registers 1003, .... Thus, AND gate 1022, ... which is respective of input-vector AR 220, ... is set if the AR's vector's stride value in stride 903 within respective block 921, ..., 931 is not zero and if the vector's update-selector value in update 904 within respective block 921, ..., 931 detects that the next to be issued instruction updates the vector.

The physical address ready signal (set) from the TRUE output of respective gate 9015, ... is applied as one input to the lone AND of AND-OR gate 1004, ..., 1024, .... The other input to the lone AND of gate 1004, ..., 1024, ... is the Ready signal from the I-port of the respective AR 200, ..., 220, ... (as for the output I-port of just respective AR 200, ..., the same signal also inputting into respective gate 8043, ... ). In the case of ARs 200, ..., the respective output I-port Ready signal, respective OIP1Rdy, ..., OIPWRdy, signifies that the I-bank to receive the next output data from the respective register 8013, ... is ready to do so, where also stopping issuing of updates for not-ready keeps respective buffer 8010, ... from overfilling while waiting for the I-port to again become ready. In the case of registers 220, ..., the respective input i-port Ready signal (IIP1Rdy, ..., IIPRRdy) signifies that the I-port has already inputted (pre-read) data onto respective connection IIP1Data, ..., IIPRData for entering into the respective architectural register 220, ... as an update is issued. The FALSE output from AND 1002, ..., 1022, ... feeds into the unANDed (top) input of respective gate 1004, ..., 1024, ... to cause the gate's output to be set when the respective AR 200, ... is not to be updated by the next to be issued instruction. Each of gates 1004, ..., 1024, ... outputs a set into AND gate 1063 to contribute to setting the output of the gate for issuing an instruction.

Finally, each of gates 1008, ..., 1028, ... outputs into OR gate 1065 which outputs a set signal to the interrupt unit to have it interrupt the currently executing process to allow system software to service whatever is causing the interrupt before a return from interrupt to again continue the process—again attempt issuing the instruction formerly the last to be next issued, now the first issued after the return.

Vectors in memory are commonly accessed and processed by do-loops of one or more generally identical encodings of a generally identical scalar function. Generally, the scalar function is repeated for each additional element of each of all vectors. In the present invention, all encodings within a do-loop perform the register-to-register (scalar) portion or transformation of operands within ARs into results within ARs of as many iterations of a vector function performed by one complete pass through the do-loop. The register-to-register portion is done with each execution of each encoding of the scalar function. The do-loop is completed and the vector function is finished when the do-loop exits.

Prior vector processing by a general purpose processor accessed regular vectors using LOAD and STORE instructions and vector-addressing support-instructions, all encoded within the do-loop, enough for accessing one element of each vector being a part of each scalar function or iteration of the vector function. Each vector's current element and address thereof was updated for each iteration. Only the next data-element of each vector was accessed and processed by its AR with each execution of the scalar function and its LOAD, STORE and addressing support instructions.

In the present invention, LOAD, STORE, addressing support instructions, and the use of cache to access regular vectors in memory are eliminated from the do-loop. (Irregular vectors are processed using cache 102 as in the prior art with LOAD, STORE and support instructions and caching techniques.) In the present invention for regular vectors, instructions are executed before the do-loop to formulate and save (push onto the stack using scalar-PUSH instructions) addressing and updating parameters and assign (pop off the stack using vector-POP instructions) the generated or updated parameters for accessing and processing regular vectors. Each set of parameter values of each vector to be accessed is assigned to the appropriate one of W output-vector ARs 200, . . . or one of R input-vector ARs 220, . . . , and the one architectural register is accessed by each iteration of the vector function (each encoding of the scalar function of the do-loop) to process successive elements of the vector using the remainder of the instructions after LOAD, STORE and addressing support instructions formerly therein are eliminated. Thus, each execution of instructions before the do-loop defines the addressing (location and size of elements but not the data content nor the number of elements) and assigns one regular vector in memory to a particular AR before beginning accessing of the vector, element by element via the AR.

A single vector POP instruction pops all the parameters of the vector from the stack into the designated register's control and update hardware. Once a vector is assigned to a register, processing can be repeatedly stopped (vector-PUSH instructions), parameters retrieved (scalar-POP instructions) for examination and/or changing (scalar instructions), saved onto the stack again (scalar-PUSH instructions) and restarted (vector-POP instructions) a later time.

A length parameter generally identifies the length of a vector and is held and updated in a register that counts the remaining loops of a do-loop to completely process the vector, else length can be data dependent and be not known before beginning the do-loop and accessing the determining data.

Each regular vector is defined by five parameters: (1) virtual address of the first data-element of the vector, (2) stride between successive elements, (3) size of each element, (4) update-selector to select one or more update-instructions from those of the scalar function and (5) flow-direction of data between the vector's register and memory. Additionally, there is a sixth defining value, the last-bit, acts as a processing state for stopping and restarting output vectors, which determines if the content of an output-vector's register 200, . . . from before the vector is popped active can (set) or can not (clear) become the content of vector's first element. Except possibly for flow direction, the values of these parameters are placed in hardware (by a vector-POP instruction) anytime before the processor begins processing the vector.

The virtual address of the first element of the vector is used by associative 106 to generate a physical address of the first element to thereby access the first element in memory 110. The element size is also used by the I-port and I-banks to access the first element. Finally, for output vectors, a clear last-bit limits the content of the first element to not being that already in the vector's AR. All the parameters are employed to access the next and following elements.

The stride parameter is a signed count defining the addressing spacing and direction (increasing or decreasing addresses) between successive same-sized data-elements of each vector. The element-size parameter is required if elements of different vectors can have different sizes. The update-selector parameter for a currently accessed vector allows scalar programmed synchronization of updating of the vector and allows no additional instruction be used in the scalar function for updating. Update selection is defined at the start of processing, but both selection and updating occur during processing of the scalar function, optionally occurring with each execution of an instruction to process the vector. Each current data value in the vector's register is programmed to become or not become the next element of the vector in memory. Fastest accessing of a vector occurs when each instruction of the scalar function updates the vector; and many encodings of the function each loop of the do-loop (i.e., The scalar function is a single ADD instruction adding an element in each of two input-vector-ARs of each of two input vectors to produce an element of an output vector into the vector's output-vector-AR. Each execution of the instruction updates each of the vectors, and each pass through the do-loop consecutively executes 100 of the instructions. Thus, the time to do the BRANCH instruction for each loop for some number of loops or passes through the loop and the instruction to update the pass count, possibly the same instruction, is amortized over 100 executions of the scalar function's one instruction. The time to execute the 100 ADD instructions is 100 times the time of one cycle of the clock. This is so for any combinations of three stride values, each interleaving well. This is so for any number of elements per vector to the limits of virtual memory. Also, if the number of elements per page is large enough, then associative can search and find pages faster than the three vectors consume them, doing so in parallel with accessing and processing the vectors. Also, for other scalar functions having irregular vectors and regular vectors to process, LOAD and STORE instructions and regular vectors can access memory from within the scalar function as fast the scalar instructions of the function can be issued without the updating of regular vectors having any slowing effect.).

Flow direction of a vector is either memory-to-register as each next element in memory becomes the current element in a register 220, . . . , or register-to-memory as the current element in a register 200, . . . becomes each next element in memory. If there is only one I-port per register, the flow-direction parameter is defined by the choice of which type of register (input or output) is designated for accessing the vector.

The address, stride, size and update-selector (and last-bit if register 200, . . . ) parameters are popped from one or more top most entries of the memory stack when a vector POP instruction designating the vector's register is issued and executed. Each vector POP instruction starts one vector so that the vector can be accessed via the register 200, . . . , 220, . . . designated by the POP instruction. Any time after a vector is popped, a vector PUSH instruction designating the vector's register can push the address, stride, size and update-selector (and last-bit if register 200, . . . ) parameters onto the memory stack.

The pushed stride, size and update-selector values of the vector remain unchanged, but the address value points to the next element in memory to be in the vector's AR from when the vector was stopped when and if the vector is next updated after it is restarted. Thus, each issued update-instruction updates the address parameter of each vector updated in preparation for any stopping and resaving of the vector onto the stack between the issue of any two instructions. (Also, the last-bit parameter of a register 200, . . . changes depending on whether the last generated result to the AR became an element, clear if it became an element, set if not.)

Updating an input-vector to have its first element in the vector's register 220, . . . causes the address parameter in respective register 900, . . . of blocks 921, . . . , 931 to point to the second element in memory. Updating the second element into the register causes the parameter to point to the third element in memory, etc. Similarly, updating an output-vector to have its first element written into memory causes the respective address parameter of blocks 901, . . . , 911 to point to where any second element goes in memory. Updating the second element into memory causes the parameter to point to where any third goes in memory, etc.

The value that is initially a copy of the initial address parameter value is held unchanged during any following updating of the address parameter, except that the copy is updated to cross from one to the next page for the address of next element accessed. Thus, the initially copied value is updated for each accessed page of the vector, whereas the address parameter is updated for each accessed element of the vector.

Each initial and updated value of the copied page-ID 902, . . . value is received by associative unit 106 for mapping each page accessed. After each successful mapping and including the first successful mapping of the initial address parameter, the copied value is updated to be the virtual address of some data in the next page. The particular data's address within the page is not important because only the next page's virtual identification (ID) is needed for finding a physical page mapped after the first of a started or restarted vector, only important because the I-ports and I-banks calculate the first element-address within each next page from the last element-address within the page before.

If a processor has more than one size for pages for mapping virtual addresses into physical memory, associative unit 106 returns an indication of the page-size of each found page for each virtual page ID that it successfully maps. As soon as each page's page-size is received from the associative unit, the copied value's current value is updated to an address within the next page regardless of its (next page's) then unknown sizes and when time to do so, it is sent to the associative to be mapped. The first two pages of each vector are mapped in succession as a vector is getting started. Any third and following pages of a vector are mapped on demand to have two pages mapped, the one being accessed and the next one.

The element select within a page for accessing each element of a vector is found by the respective I-port 108 and by the portion of each I-bank for that port. The element selects are successively produced from a previous element select, going back to the element-select of the vector's second element, which is the vector's first element plus the stride value. Thus for each I-bank and an I-port, each current element select is some function of the previous element select except for the first and the stride value, a function according to memory's interleave. Finally, as for any interleave, the selected element's physical address comprises the concatenated physical page ID of a page and element select within the page.

Each issue of an update-instruction to update the vector of a register 220, . . . for inputting vector data causes another vector data-element to be pre-read from memory before (generally well before) it is needed for processing. Similarly, each issue of an update-instruction to update the vector of a register 200, . . . for outputting vector-data causes another vector-data-element to be post-written into memory after (generally well after) it has been produced. Thus, successive initial physical addresses of all pages of all started and unfinished vectors are successively used by the I-banks and I-ports to access all vector data. All processed elements of each accessed vector in memory are successively pre-read or post-written, with each I-bank independently scheduling its own work-load of accesses of its memory-bank 122 of serially accessed storage devices.

Each vector of an architectural register has a 3-bit update-selector parameter, each bit designating one of two sets of half of all registers, the odd set and the even set. Each next to be issued typical instruction has the lowest-order bit of each of its three register-designators compared to the corresponding bit of each update-selector. If each of all three comparisons for a vector compares two bits of equal value (designator bit value equals update-selector bit value), then the instruction is an update instruction of that vector. Each additional vector having its update-selector parameter also selecting the instruction to update it is also thereby updated, all vectors selected being updated simultaneously with the issue of the selecting and thereby updating instruction.

An update-instruction issues only when all of the vectors to be updated are ready to be updated. Each input vector is ready to be updated when its input I-port's data buffer 120 has its next element ready to be updated into its register 220, . . . so as to not delay the issue or execution of any next instruction to possibly input the updated input-element. Each output vector is ready when its output I-port and necessary I-banks have the next element's physical memory-address and the I-banks are ready to receive any part of an updated element of the output-vector (the I-banks have an empty place into which to receive the element).

The update issue control of block 1001, . . . , 1011, 1021, . . . , 1031 for each currently accessible (active) vector sends an update-issued signal to update the virtual address parameter of register 900, . . . of the vector to point to the one vector-data-element in memory next to reside in the vector's AR. This keeps each virtual address parameter current for being pushed back onto the stack and then again popped from the stack to begin the vector again where it was, no element accessed twice or skipped. The length parameter is kept updated by the decrementing count in some AR not accessing a vector as scalar functions complete being issued, and the last-bit value is kept current for the output-vector. All other vector parameters are static and thus holding them keeps them current.

Access interrupts occur when the address parameter addresses the first element of a page that cannot be mapped without the interrupt occurring first. If the current being accessed was previously found mapped, then an attempt to have the associative unit map the next page occurs using the just updated value that initially was a copy of the initial value of the address parameter. If the next-page's mapping can not be found by the associative unit and an access interrupt is required to get the missing and needed mapping, then the interrupt is delayed and the vector can continue to be processed and updated until the address parameter addresses the first element of the unmapped page. If there is an update-instruction to update the first element that can not be mapped, then it is stopped from issuing. At this point, the I-port and I-banks do not have the unmapped page's physical ID. Thus, while the associative signals the need for an interrupt for a page upon starting to access the previous page, the interrupt occurs upon not only finishing accessing the previous page but upon attempting to access the page that can not be mapped.

In operation of the vector processor of FIGS. 2-10, designation of a vector capable architectural register (input- or output-vector register) by an initial or setup instruction, namely a vector-POP instruction, puts (pops) the vector's parameters into hardware from where setups (virtual address, element size, and stride) are sent to associative 106 and vector setup 113 from where physical address, element size, stride and page size are sent to vector setup 114 of an I-port 108 and to the vector setups 124 for all I-banks 110 for the port).

With each update of a vector, the vector's architectural register's hardware holding the parameters updates the virtual address parameter, thereby keep current the addressing of memory according each vector's kept current and reusable parameters, namely virtual address, stride and element size, and according to a page-ID and page-size of the physical page in memory already mapped and currently next to be accessed. Initial pre-processing instructions update the address processing logic to retrieve successive vector-elements from addressable locations in the memory banks and store the retrieved vector-elements in buffer 120 in response to later processing instructions from the processor.

To access a vector, pre-processing instructions internal to the processor retrieve or generate, format an AR's worth of the vector's parameters into any convenient AR (not otherwise used or made free for use) and then push the content of that AR onto the stack using a scalar-PUSH instruction, repeating this to get all the parameters onto the stack in the proper order and format. If necessary or just convenient, pre-processing instructions also push (scalar-PUSH) the initial content of the vector's AR onto the stack. Later, a scalar-POP instruction writes the saved initial content into a vector-AR of any appropriate choice according to input or output vector capability. A vector-POP pre-processing instruction designating the chosen AR is used to pop the saved parameters into the AR's vector control hardware to activate the vector, namely to pre-read any number of an input-vector's elements from memory but not into the AR leaving to processing instructions to cause each input vector element to enter the AR as a respective covert instruction issues or namely to have addressing ready for an output-vector's elements to be written into memory when following processing instructions cause each output vector element to leave the AR as a respective covert instruction issues.

To stop and save the vector at some point, the current parameter values are pushed from hardware back onto the stack using a vector-PUSH post-processing instruction. With the vector's AR's content still in the AR, the current parameters are examined and possibly modified after being popped from the stack into any convenient AR (one not currently used to access a vector nor the stopped vector's AR sill holding content possibly relevant to the stopped vector) using the necessary number of post-processing scalar-POP instructions. After the parameters are examined and possibly modified using pre-processing scalar instructions, the process begins again, beginning where a scalar-PUSH is first called for. This can be repeated any number of times at any rate versus elements processed one wants or programs into the do loop.

Any data in an AR are pushed onto the memory data-stack in the reverse order expected when later popped from the stack.

A number of vectors accessed from memory not via cache 102 are from as many input I-ports via as many connections IIP1Data, . . . , IIPRData inputted through top input of as many selects 222, . . . for entry to as many ARs 220, . . . .

Elements of preferred regular input-vectors as operands to be in respective ARs to processing scalar instructions are retained in buffer 120 and become available in the ARs and therefore are used, in respective vector-update (a covert accessing instruction) issue order (the order of successive vector-elements in memory of any one vector, which is also the order of successive processing instructions to process the successive vector-elements), from ARs 220, . . . through select pair 280 and 282 and then through any one of select pairs 262, . . . and 263, . . . into inputs associated with instruction-selected functional units 364, . . . 374, which perform functions on one or two input-vector-elements per function to generate one either output vector-element or non-element-result per function.

The results are output from any functional unit doing the desired function to a result register 400, . . . , 420, . . . 440, . . . and perhaps then to respective AR 200, . . . , 220, . . . , 240 . . . generally not in issue order for possible additional processing by the functional units (in which case the results/elements become operands for the additional processing) or for possible output to memory as elements of preferred regular output vectors.

Since the amount of time from operands in to result/element out from the output of a functional unit 364, . . . , 374 to a register 400, . . . , 420, . . . , 440, . . . depends on the amount of time required by the functional unit to execute and produce a result and since different functional units require differing time periods to execute their functions, results/output-vector-elements may not arrive in the order in which their instructions were issued which is desirable for writing elements into memory in issue order as for vector order but is not desirable for having results arrive in RRs as at ARs as available for possible reprocessing as operands as quickly as possible. To allow arrival of results/elements at ARs to be not issue order but also have issue order of output-elements be output-vector order, issue-order values are assigned to each future result/output-vector-element designated for a particular AR 200, . . . from the issue of its instruction. The assigned order-value is carried with the result/element from its issuing to it being sent into memory in issue order, vector order. From the issuing until the no-longer-future result/element arrives in an RR to possibly reside in the AR, the carried order-value held until execution of the function to generate the no-longer-future result is begun. Upon beginning the order-value is placed into future timing chain 500, . . . at an entry point based on the execution time of the respective functional unit. The issue order codes are issued having consecutive numerical order according to issue order and enter the timing chain to travel to end of the chain in a fixed amount of time whereupon the carried with the result/element with respect to being in the RR and possibly being AR. As soon as possible but without losing any, each result/element is sent from either the RR or AR into restore order buffer 8010, . . . that is responsive to the issue order codes to receive them and their results/elements from RR or AR out of issue order but send in issue order as vector order each element from the buffer to the output-vector's AR's output I-port for writing the vector into memory.

A result/element is in RR 400, . . . , 420, . . . , 440, . . . for only one clock-cycle, and only if it was issued after the result/element then residing in respective AR 200, . . . , 220, . . . , 240, . . . does it reside in the AR the next cycle. This is true not only for results/elements to AR 200, . . . but of all results to any AR.

Each AR 200, . . . exclusively has respective future timing chain 500, . . . with separate consecutive order-values for results/elements to that AR. From the RR 400, . . . or respective AR 200, . . . into the respective restore order buffer 8010, . . . , each result/element is written generally out-ororder in time at the buffer address equal to its order-value with the high order order-value bit being written as a circular valid value respective to each pass through the whole buffer. Thus, that written out-of-order in time eventually becomes that in-order in buffer-address. Respective of address, the results/elements are read from the buffer in order in time with those not elements being discarded and those elements being immediately sent to the AR's output I-port for writing into memory as the output-vector therein.

Processing both input and output vector-elements through the ARs 200, ..., 220, ..., 240, ... permit processing non-vector operands/results with vector operand-element/result-element values, doing so before and after any result to AR 200, ... becomes (is updated to) an element.

Non-regular vectors are processed through cache 102 and load/store units to return vector result-elements to cache and main memory in a manner similar to the prior art.

SUMMARY

The present invention employs interleaved I-banks accessed by I-ports, as described in my prior patent application. The interleave may be abbreviated (as described in my prior application), classic or odd. Parallel accessing of different regular vectors requires a different I-port for each vector, and each AR having vector capability has a different particular I-port for accessing its current vector's data in memory.

While it has been assumed that no page size is less than a pagelet size, the invention is applicable for page sizes smaller than the pagelet size as described in my prior patent application. The invention is applicable to processing multiple vector-element sizes using a vector-element-size parameter as described in my prior patent application.

Each access of an I-bank accesses a relatively small element of data not within a larger accessible block in the I-bank. For each input-vector being accessed in parallel (read-accesses), each I-bank finds and readies (partially reads) the next data that the I-bank likely needs to read. Collectively, at least some of a memory's I-banks maintain some larger amount of data likely to be next-read, keeping such data partially read. The readied data being for some number of regular input-vectors each having a different stride value for uniform spacing between each vector data-element and the next element of each vector.

Each AR 200, ... 220, ... having vector capability has exclusive use of one I-port so that each large block of contiguous memory-data is accessed from many I-banks as a simple regular vector of successively accessed vector data-elements having a stride value of +1. Thus, there are as many I-ports as there are registers having vector capability. Two or more functional units (i.e., load/store units) can use a given I-port if they do not access in parallel. As regular vectors of a few hundred smallest data-elements in I-banks, all such blocks are efficiently and naturally accessible via I-ports for all functions.

Irregular vectors are accessed by LOAD and STORE instructions using caching techniques as in the prior art. With the present invention, preferably only data of irregular vectors are cached—preferably regular vectors are accessed according to the present invention in the same do-loop in parallel with the irregular vectors. Yet, accessing via cache using LOAD and STORE instructions being most general, accessing a regular vector remains possible.

The present invention thus provides a vector processor that uses POP and PUSH instructions as the only encoded instructions, thereby processing vectors in a manner similar to a scalar processor using POP and PUSH instructions. The result is a powerful and flexible combined vector and scalar processor capable of accessing regular vectors in memory directly via architectural registers without the use of LOAD and STORE instructions and respective addressing support instructions as previously required. With such LOAD and STORE instructions and respective addressing support instructions eliminated, vector processing requires significantly fewer clock cycles and is thus significantly faster than prior vector processors. The processor of the present invention takes advantage of a memory of interleaved banks for accessing multiple regular-stride vectors element by element simultaneously, thereby processing one element per vector at a time to reside in the architectural registers one at a time per architectural register, all in a manner similar to processing scalar operands and results.

While the memory-to-register and register-to-memory aspects of the present invention have been described in connection with processing regular vectors, as herein defined, the memory-to-register and register-to-memory processing can be extended to some irregular vectors with some modifications. Consider an irregular vector comprising full-word (64-bit) and half-word (32-bit) vector-elements arranged memory in fixed-sized segments such that each segment contains a single vector-element:

[F],D,[H,x],D,[x,H],D,[H,x],D, [F],D,[F],D,[x,H], ... , where each bracketed portion represents a segment, F represents a full-word element, H represents a half-word element, x represents a non-vector-element and D represents a fixed distance between segments. The stride between segments is fixed, and is equal to D plus the segment size. In such a case, the vector could be handled using the memory-to-register and register-to-memory processing of the present invention by using, for example, a map of the vector-element sizes. Thus, if the vector according to the example were accompanied by a map

11100110111101 ...

the processor could, knowing the fixed stride and that the vector consists of half- and full-word elements, could use each successive pair of bit of the map to identify the half- and full-word vectors. A bit-pair of 11 identifies a segment having a full-word vector-element, a bit-pair of 10 identifies a segment having a half-word vector-element followed by a non-vector-element and a bit-pair of 01 identifies a segment having a half-word vector-element preceded by a non-vector-element. Thus, in the example the first two bits identify a full-word vector-element, the next two bits identify a half-word vector-element followed by a non-vector-element, etc. These principles could also be extended to vectors containing more than two sized vector-elements (such as quarter-word—16-bit-elements, etc.) by expanding the size of the map. Additionally, it would be possible that a given segment not contain any vector-elements, in which case the map might carry a corresponding "00" to indicate an empty segment.

While I believe the use of the described segments is possible, those skilled in the art will likely find it most practical to handle irregular vector using the cache techniques of the prior art. Nevertheless, as used in the appended claims, where the term "vector" is not limited to "regular vector" as herein defined, "vector" is intended to include both a regular and an irregular vector.

Although the present invention has been described with reference to preferred embodiments, workers skilled in the art will recognize that changes may be made in form and detail without departing from the spirit and scope of the invention.

The invention claimed is:

1. A computer system comprising:
   a memory having a plurality of addressable storage locations for storing data-elements, and
   a processor responsive to vector defining instructions to issue successive scalar processing instructions in an issue order to execute functions on input data-elements inputted from memory in a vector order to be operands to generate result data-elements arranged in the vector order for storage into memory according to the issue order,
   the processor comprising:
      a plurality of architectural registers, at least two of the architectural registers having input-vector capability to receive input data-elements arranged in vector order from the memory and at least one architectural register having output-vector capability to write result data-elements to the memory, each of the architectural registers being operable to receive result data-elements for use as data-elements as operands by a subsequent processing instruction;
      a plurality of functional units coupled to the architectural registers and responsive to processing instructions for concurrent pipelined execution of selected functions on data-elements as operands to generate result data-elements, at least some of the functional units requiring different periods of execution;
      a plurality of result registers, each result register being coupled to a respective architectural register and to the plurality of functional units to receive result data-elements from a selected functional unit and to send data-elements as operands to selected functional units; and
      issue-order logic responsive to the issuance of successive processing instructions to identify whether a result data-element in a result register is a result of a processing instruction issued earlier or later than a processing instruction that resulted in a result data-element in the respective architectural register, the result register being responsive to the identification from the issue-order logic to selectively transfer a result data-element to a respective architectural register or the memory, the respective architectural register being responsive to the identification from the issue-order logic to selectively transfer a result data-element to memory, and the result registers and respective architectural register being responsive to the identification from the issue-order logic to transfer a result data element required by a respective functional unit from the one of the result register and respective architectural register containing the required result data-element.

2. The computer system of claim 1, wherein the issue-order logic further comprises:
   a timing chain having a plurality of inputs and an output, the timing chain being arranged such that a signal inputted to a respective input is delayed for a respectively different time delay to the output, the timing chain being operable in response to the successive processing instructions to insert a code into the timing chain at an input whose time delay to the output is representative of the execution period of the functional unit that generates the result data-element, the code corresponding to the position of the corresponding instruction in the issue order, the transfer of result data-elements from the result registers and respective architectural registers being in response to the code from the timing chain.

3. The computer system of claim 2, wherein the issue-order logic further comprises:
   a result-control register to control sending result data-elements from a result register and respective architectural register to memory and to functional units, and
   the timing chain additionally contains an element code identifying whether or not a corresponding result data-element is a data-element to be written to memory, the result-control register being responsive to the element code to inhibit a result data-element that is to be further processed from being written to memory.

4. The computer system of claim 2, wherein the processor further comprises:
   a restore-order buffer associated with each architectural register having output-vector capability, each restore-order buffer being arranged to store at least as many result data-elements as may be generated during a time period based on a difference between the longest and shortest execution periods of the plurality of functional units, the restore-order buffer being responsive to the timing chain to organize stored result data-elements in issue order.

5. The computer system of claim 4, wherein each restore-order buffer is selectively coupled to the respective architectural register and to the respective result register to receive a next result data-element from either the respective architectural register or result register.

6. The computer system of claim 4, wherein each restore-order buffer is coupled to a respective port of the memory to write successive result data-elements to respective addressable storage locations in the memory.

7. The computer system of claim 1, wherein the memory further comprises:
   a plurality of input ports responsive to pre-processing instructions and vector-defining parameters to pre-read successive data-elements of one or more input vectors from the storage locations having addresses defined at least in part by vector-defining parameters, at least one input port being coupled to a respective one of the architectural registers having input-vector capability, each input port further comprising
      an input buffer for storing pre-read data-elements,
   at least one output port, each output port being coupled to a respective one of the at least one architectural register having output-vector capability, each output port further comprising
      an output buffer for storing post-written data-elements,
   the respective output port being operable to write successive data-elements from the respective output buffer to the memory for storage at locations having addresses defined at least in part by pre-processing instructions and vector-defining parameters,
      whereby the processor designates at least one architectural register to receive data-elements as operands and an architectural register to receive result data-elements from a functional unit, each architectural register receiving data-elements as operands supplying successive data-elements as operands to designated functional units, the functional units executing functions on the data-elements as operands to generate successive result data-elements, and successive result data-elements are ordered to the issue order of the successive processing instructions for storage into the respective output buffer and writing to memory.

8. The computer system of claim 7, wherein the processor further comprises:
a restore-order buffer associated with each architectural register having output-vector capability for storing at least as many result data-elements as may be generated during a time period based on a difference between the longest and shortest execution periods of the plurality of functional units, the restore-order buffer being selectively coupled to the respective architectural register having output-vector capability and to the respective result register to store result data-elements and responsive to the issue-order logic to organize stored result data-elements in issue order, the restore-order buffer being coupled to a respective output port of the memory to serially write successive result data-elements to the respective output buffer.

9. The computer system of claim 7, further comprising:
an associative unit coupled to the processor and the memory to receive virtual addressing information from the processor to supply respective physical addressing information to the input ports and output ports, and
a table for converting virtual addresses to physical addresses.

10. The computer system of claim 7, wherein each port further comprises:
vector setup apparatus responsive to vector-defining parameters, including stride, to provide successive addresses for addressing the storage locations.

11. The computer system of claim 1, wherein there are at least three architectural registers having input-vector capability arranged to receive input data-elements in serial order from the memory, a second functional unit being coupled to one of the three architectural register having input-vector capability and to the result register and respective architectural register receiving result data-elements from the first-named functional unit to perform a function on respective data-elements from the one of the three architectural register as first operands and the result data-elements from the first-named functional unit as second operands to generate respective result data-elements.

12. The computer system of claim 1, wherein at least one of the plurality of architectural registers has no vector capability, the at least one architectural register having no vector capability receiving operands from the memory and transferring the operands to a selected functional unit while data-elements are transferred as operands from another architectural register to the selected functional unit, whereby the selected functional unit execute on operands and respective data-elements as operands to generate respective result data-elements.

13. The computer system of claim 1, further comprising:
a cache selectively coupled to the memory to read cache-lines containing data-elements from the memory and to write cache-lines containing data-elements to the memory, each cache-line containing data-elements arranged such that at least some data-elements of a cache-line may be vector data-elements of a vector, the cache being further selectively coupled to at least one of the functional units to transfer vector data-elements from a cache-line to the at least one functional unit and to receive result data-elements from the at least one functional unit to a cache-line;
the processor
i) operating the cache to load and store data-elements from the memory in one or more cache-lines, processing the data-elements from a cache-line to a designated functional unit for execution of functions, and process result data-elements from designated functional units to cache-lines for storing to the memory, or
ii) by-passing the cache by operating designated architectural registers having input-vector capability to read data-elements of regular vectors from the memory for execution by designated functional units and operating designated architectural registers having output-vector capability to write result data-elements to the memory in the issue order of the processing instructions.

14. The computer system of claim 13, wherein the processor is capable of processing both regular and irregular vectors through the cache.

15. The computer system of claim 13, wherein
if the instructions are selected from the group consisting of POP and PUSH instructions, the processor operates designated architectural registers having input-vector capability to receive input data-elements directly from the memory and operates designated architectural registers having output-vector capability to send result data-elements directly to the memory, the processing instructions updating data-elements in the architectural registers to be data-elements in the memory while also executing functions by designated functional units to produce the result data-elements from the input data-elements,
if the instructions are selected from the group consisting of LOAD and STORE instructions, the processor operates the cache to access input data-elements in memory through the cache for processing instructions executing designated functions of designated functional units to produce the result data-elements from the input data-elements.

16. The computer system of claim 13, wherein the issue-order logic further comprises:
a timing chain having a plurality of inputs and an output, the timing chain being arranged such that a signal inputted to a respective input is delayed for a respectively different time delay to the output, the timing chain being operable in response to the successive processing instructions to insert a code into the timing chain at an input whose time delay to the output is representative of the execution period of the functional unit that generates the result data-element, the code corresponding to the position of the corresponding instruction in the issue order, the transfer of result data-elements from the result registers and respective architectural registers being in response to the code from the timing chain.

17. The computer system of claim 16, wherein the timing chain additionally contains an element code identifying whether or not the corresponding result data-element is a data-element to be written to memory, the result-control register being responsive to the element code to inhibit a result data-element that is to be further processed from being written to memory.

18. The computer system of claim 16, wherein the processor further comprises:
a restore-order buffer associated with each architectural register having output-vector capability, each restore-order buffer being arranged to store at least as many result data-elements as may be generated during a time period based on a difference between the longest and shortest execution periods of the plurality of functional units, the restore-order buffer being responsive to the timing chain to organize stored result data-elements in issue order.

19. The computer system of claim 18, wherein each restore-order buffer is selectively coupled to the respective architectural register and to the respective result register to receive a next result data-element from either the respective architectural register or result register.

20. A computer system comprising:

a memory having a plurality of addressable storage locations for storing data-elements;

a cache selectively coupled to the memory to read cache-lines containing data-elements from the memory and to write cache-lines containing data-elements to the memory, each cache-line containing data-elements arranged such that at least some data-elements of a cache-line may be vector data-elements; and a processor responsive to vector defining instructions to issue successive scalar processing instructions in an issue order to successively process data-elements of first and second vectors to generate result data-elements, the first vector comprising a plurality of successive first data-elements arranged in a vector order and the second vector comprising a plurality of successive second data-elements arranged in the vector order, the processor comprising:

a plurality of functional units, each functional unit being responsive to the scalar processing instructions for pipelined execution of a selected function on respective first and second data-elements as a pair of operands to generate a respective result data-element, at least one of the functional units being selectively coupled to the cache to receive data-elements from the cache and to transfer result data-elements to cache-lines in the cache, at least some of the functional units requiring different periods of execution;

a first architectural register having input-vector capability coupled to the memory to receive successive first data-elements in vector order, a second architectural register having input-vector capability coupled to the memory to receive successive second data-elements in vector order, at least a third architectural register having output-vector capability coupled to the memory to selectively write result data-elements to the memory, at least each of the architectural registers having output-vector capability being coupled to the plurality of functional units to transfer data-elements as operands to selected functional units and to receive result data-elements from a selected functional unit;

a plurality of result registers each coupled to a respective one of the plurality of architectural registers and to the plurality of functional units to receive result data-elements from selected functional units for use as operands by subsequent processing instructions, each result register being responsive to the issuance of successive processing instructions to selectively transfer the result data-elements to the respective architectural register, or to a functional unit for further processing, or to the memory, each result register and at least each of the architectural registers capable of transferring data-elements as operands to functional units being responsive to the issuance of the successive processing instructions to transfer the data-elements as operands to the respective functional unit in the issue order, the processor being selectively operable to either i) operate the cache to load and store data-elements from the memory within one or more cache-lines, process the data-elements from a cache line to a selected functional unit for execution of a function, and process result data-elements from the functional unit to a cache-line for storing to the memory, or ii) by-pass the cache by operating selected architectural registers having input-vector capability to read data-elements from the memory for execution by a selected functional unit and by operating a selected architectural register having output-vector capability to write result data-elements to the memory in the issue order of the processing instructions.

21. The computer system of claim 20, wherein the processor further comprises:

issue-order logic responsive to the issuance of successive processing instructions to identify whether a result data-element in a result register is a result of a processing instruction issued earlier or later than a processing instruction that resulted in a result data-element in the respective architectural register, the result register being responsive to the identification by the issue-order logic to selectively transfer a result data-element to a designated architectural register, a functional unit or the memory, the result registers and respective architectural register being responsive to the identification by the issue-order logic to transfer a result data-element required by a respective functional unit from the one of the result register and respective architectural register containing the required result-data-element.

22. The computer system of claim 21, wherein the issue-order logic further comprises:

a timing chain having a plurality of inputs and an output, the timing chain being arranged such that a signal inputted to a respective input is delayed for a respectively different time delay to the output, the timing chain being operable in response to the successive processing instructions to insert a code into the timing chain at an input whose time delay to the output is representative of the execution period of the functional unit that generates the result data-element, the code corresponding to the position of the corresponding instruction in the issue order, the transfer of result data-elements from the result registers and respective architectural registers being in response to the code from the timing chain.

23. The computer system of claim 22, wherein the timing chain additionally contains an element code identifying whether or not a corresponding result data-element is a data-element to be written to memory, the result-control register being responsive to the element code to inhibit a result data-element that is to be further processed from being written to memory.

24. The computer system of claim 22, wherein the processor further comprises:

a restore-order buffer associated with each architectural register having output-vector capability, each restore-order buffer being arranged to store at least as many result data-elements as may be generated during a time period based on a difference between the longest and shortest execution periods of the plurality of functional units, the restore-order buffer being responsive to the timing chain to organize stored result data-elements in issue order.

25. The computer system of claim 24, wherein each restore-order buffer is selectively coupled to the respective architectural register and to the respective result register to receive a next result data-element from either the respective architectural register or result register.

26. The computer system of claim 24, wherein each restore-order buffer is coupled to a respective port of the memory to write successive result data-elements to respective addressable storage locations in the memory.

27. The computer system of claim 20, wherein the memory further comprises:
   a plurality of input ports responsive to pre-processing instructions and vector-defining parameters to pre-read successive data-elements of one or more input vectors from the storage locations, at least one input port being coupled to a respective one of the architectural registers having input-vector capability, each input port further comprising
      an input buffer for storing pre-read data-elements,
   at least one output port, each output port being coupled to a respective one of the at least one architectural register having output-vector capability, each output port further comprising
      an output buffer for storing post-written data-elements,
   the respective output port being operable to write successive data-elements from the respective output buffer to the memory for storage at locations having addresses defined at least in part by pre-processing instructions and vector-defining parameters,
      whereby the processor is responsive to instructions to designate at least one architectural register to receive data-elements as operands and an architectural register to receive result data-elements from a functional unit, each architectural register receiving data-elements as operands supplying successive data-elements as operands to designated functional units, the functional units executing functions on the data-elements operands to generate successive result data-elements, and successive result data-elements are ordered to the issue order of the successive processing instructions for storage into the respective output buffer and writing to memory.

28. The computer system of claim 27, wherein the processor further comprises:
   a restore-order buffer associated with each architectural register having output-vector capability for storing at least as many result data-elements as may be generated during a time period based on a difference between the longest and shortest execution periods of the plurality of functional units, the restore-order buffer being selectively coupled to the respective architectural register having output-vector capability and to the respective result register to organize stored result data-elements in issue order, the restore-order buffer being coupled to a respective output port of the memory to write successive result data-elements to the respective output buffer.

29. A computer process for processing at least first and second regular vectors each comprising a plurality of successive data-elements in vector order to generate and store a result vector in a memory, the result vector comprising a plurality of successive result data-elements, the process comprising steps of:
   (a) writing successive data-elements of the first and second regular vectors from memory to respective first and second architectural registers without use of a cache;
   (b) issuing a plurality of successive scalar processing instructions in an issue order;
   (c) executing functions in accordance with the processing instructions on data-elements from the respective first and second architectural registers to generate respective result data-elements;
   (d) assigning issue-order codes to the result data-elements based on the issue order of the processing instructions generating the result data-elements;
   (e) selectively either executing a further function on successive result data-elements in accordance with further processing instructions or writing successive result data-elements to a third architectural register or to the memory without use of a cache; and
   (f) if a result data-element was transferred to third architectural register by step (e) for further processing, transferring the result data-element having an issue-order code corresponding to an issue-order code required by the further function from the first-named function or the third architectural register to the further function.

30. The computer process of claim 29, wherein different functions require different execution periods, and step (f) further comprises steps of:
   (g) writing each result data-element to a result register upon generation by the function, and
   (h) selectively transferring the result data-element required by the further function from the result register or the third architectural register to the further function for further processing.

31. The computer process of claim 30, wherein step (e) further comprises a step of:
   inhibiting transfer to the memory of a result data-element in the result register or the architectural register that is to be further processed.

32. The computer system of claim 4, wherein the restore-order buffer is responsive to the identification from the issue-order logic to store the respective result data-element at a buffer address based on the respective timing chain code.

33. The computer system of claim 18, wherein the restore-order buffer is responsive to the identification from the issue-order logic to store the respective result data-element at a buffer address based on the respective timing chain code.

34. The computer system of claim 24, wherein the restore-order buffer is responsive to the identification from the issue-order logic to store the respective result data-element at a buffer address based on the respective timing chain code.

35. The computer process of claim 29, wherein the step of writing result data-elements to memory further comprises steps of:
   writing result data-elements to a restore-order buffer at addresses based on the issue-order code, and
   writing the result data-elements to memory from the restore-order buffer based on the addresses of the result data-elements in the restore-order buffer.

* * * * *

UNITED STATES PATENT AND TRADEMARK OFFICE
CERTIFICATE OF CORRECTION

PATENT NO. : 7,660,967 B2  
APPLICATION NO. : 12/022421  
DATED : February 9, 2010  
INVENTOR(S) : Maurice L. Hutson Page 1 of 2

It is certified that error appears in the above-identified patent and that said Letters Patent is hereby corrected as shown below:

Substitute the attached Figures 6 and 7 for the corresponding Figures 6 and 7 of the originally issued patent.

Figures 6 and 7 should appear as follows:

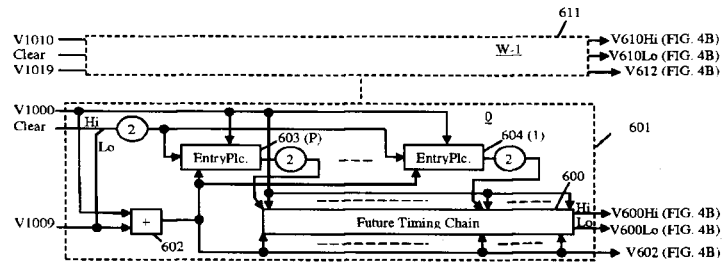

FIG. 6

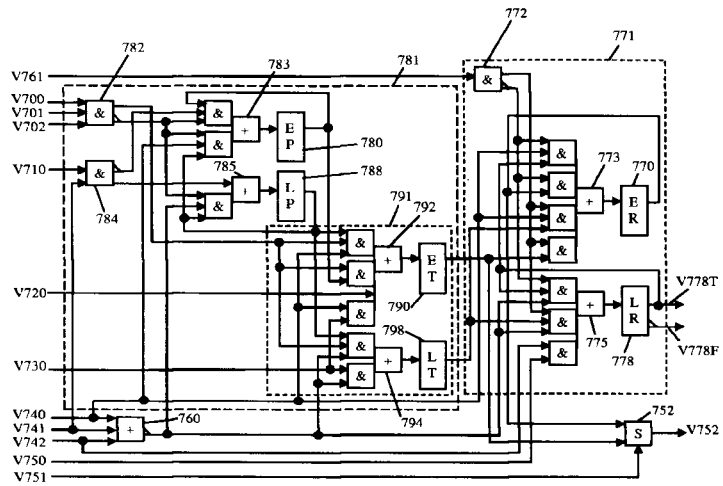

FIG. 7

Col. 7, line 38, read "$(X+Y) \cdot 2^B$" for "$(X+Y)-2^B$";  
Col. 19, line 65, read "its" for "it";

Signed and Sealed this  
Twenty-sixth Day of June, 2012

David J. Kappos  
*Director of the United States Patent and Trademark Office*

CERTIFICATE OF CORRECTION (continued)
U.S. Pat. No. 7,660,967 B2

Col. 21, line 23, read "V3851" for "V3853";
Col. 24, line 5, read "RR" for "KR";
Col. 24, line 58, read "Each" for "Bach";
Col. 25, line 20, read "LT 798" for "LT 790";
Col. 26, lines 8,9, read "V740 is set (for updating respective output vector)" for "AND 784 is not set (because no instruction is issuing into this entry place)";
Col. 26, lines 36-37, read "LT 798" for "LT 794";
Col. 31, line 11, read "8010" for "1080";
Col. 37, line 63, read "$\pm$" for "+";
Col. 39, line 25, read "1021" for "1921";
Col. 43, line 25, read "clocked" for "cloked";
Col. 46, line 39, read "as fast as the" for "as fast the";